(12) United States Patent
Mochizuki

(10) Patent No.: US 12,395,252 B2
(45) Date of Patent: Aug. 19, 2025

(54) ACTIVE ANTENNA SYSTEM AND METHOD THEREOF

(71) Applicant: NEC Corporation, Tokyo (JP)

(72) Inventor: Takuji Mochizuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 392 days.

(21) Appl. No.: 18/077,511

(22) Filed: Dec. 8, 2022

(65) Prior Publication Data

US 2023/0188226 A1 Jun. 15, 2023

(30) Foreign Application Priority Data

Dec. 14, 2021 (JP) ................. 2021-202676

(51) Int. Cl.
| | |
|---|---|
| *H04B 17/12* | (2015.01) |
| *H01Q 3/40* | (2006.01) |
| *H04B 1/40* | (2015.01) |
| *H04B 17/21* | (2015.01) |
| *H04L 25/03* | (2006.01) |

(52) U.S. Cl.
CPC .............. *H04B 17/12* (2015.01); *H04B 1/40* (2013.01); *H04B 17/21* (2015.01)

(58) Field of Classification Search
None
See application file for complete search history.

(56) References Cited

U.S. PATENT DOCUMENTS

| | | | | |
|---|---|---|---|---|
| 6,963,742 | B2* | 11/2005 | Boros .................. | H04B 7/0615 455/67.11 |
| 6,983,173 | B2* | 1/2006 | Miyatani .............. | H01Q 3/2605 455/193.1 |
| 7,110,794 | B1* | 9/2006 | Iinuma ................. | H01Q 3/2605 455/562.1 |
| 7,643,852 | B2* | 1/2010 | Noll ..................... | H04B 7/0848 455/66.1 |
| 8,045,926 | B2* | 10/2011 | Martikkala .......... | H04B 17/327 455/63.4 |
| 8,615,204 | B2* | 12/2013 | Husted .................. | H04B 17/11 455/88 |
| 8,712,475 | B2* | 4/2014 | Noll ..................... | H04B 7/0848 455/67.11 |
| 8,965,433 | B2* | 2/2015 | Liao ..................... | H04B 17/12 455/509 |

(Continued)

FOREIGN PATENT DOCUMENTS

| | | |
|---|---|---|
| WO | 2011/074031 A1 | 6/2011 |
| WO | 2019/176388 A1 | 9/2019 |
| WO | 2021/019885 A1 | 2/2021 |

OTHER PUBLICATIONS

JP Office Action for JP Application No. 2021-202676, mailed on Jun. 17, 2025 with English Translation.

*Primary Examiner* — Tuan A Tran
(74) *Attorney, Agent, or Firm* — Sughrue Mion, PLLC

(57) ABSTRACT

A controller performs an intra-subunit transmission calibration to compensate for relative differences in amplitude and phase among multiple transmitter RF chains within each subunit of an active antenna system (AAS). The controller further performs inter-subunit transmission calibration to compensate for relative differences in amplitude and phase among multiple representative transmitter RF chains, each included in a respective one of the multiple subunits.

20 Claims, 37 Drawing Sheets

(56) References Cited

U.S. PATENT DOCUMENTS

| | | | | |
|---|---|---|---|---|
| 9,025,575 | B2* | 5/2015 | McGowan | H04W 72/541 |
| | | | | 370/336 |
| 9,054,415 | B2* | 6/2015 | Goransson | H04B 17/21 |
| 9,094,254 | B2* | 7/2015 | Da Silveira | H04B 17/12 |
| 9,113,346 | B2* | 8/2015 | Pivit | H01Q 3/267 |
| 9,461,730 | B2* | 10/2016 | Wilhelmsson | H04B 15/00 |
| 9,648,630 | B2* | 5/2017 | McGowan | H04W 72/541 |
| 9,825,716 | B2* | 11/2017 | Zhu | H04B 7/024 |
| 10,128,894 | B1* | 11/2018 | O'Brien | H04B 17/12 |
| 10,164,334 | B2* | 12/2018 | Kareisto | G01S 7/40 |
| 10,615,890 | B1* | 4/2020 | Wu | H04B 17/14 |
| 10,644,813 | B2* | 5/2020 | McGowan | H01Q 1/246 |
| 10,749,254 | B2* | 8/2020 | Arnett | H04B 17/14 |
| 11,025,350 | B2* | 6/2021 | Wilson | H04B 17/345 |
| 11,121,731 | B2* | 9/2021 | Ravi | H03L 7/24 |
| 11,838,065 | B2* | 12/2023 | Yu | H04B 17/11 |
| 12,191,897 | B2* | 1/2025 | Ravi | H04B 1/0483 |
| 2010/0075594 | A1* | 3/2010 | Kim | H04L 25/0242 |
| | | | | 455/7 |
| 2012/0020396 | A1* | 1/2012 | Hohne | H01Q 3/267 |
| | | | | 375/224 |
| 2012/0220331 | A1* | 8/2012 | Luo | H04B 17/14 |
| | | | | 455/517 |
| 2012/0252366 | A1 | 10/2012 | Aoki et al. | |
| 2020/0067184 | A1* | 2/2020 | Arnett | H04B 17/11 |
| 2020/0274629 | A1* | 8/2020 | Wilson | H04B 7/0413 |

* cited by examiner

ACTIVE ANTENNA SYSTEM AND METHOD THEREOF

INCORPORATION BY REFERENCE

This application is based upon and claims the benefit of priority from Japanese patent application No. 2021-202676, filed on Dec. 14, 2021, the disclosure of which is incorporated herein in its entirety by reference.

TECHNICAL FIELD

The present disclosure relates to an active antenna system, and in particular to its calibration.

BACKGROUND ART

Massive Multi-Input Multi-Output (MIMO) and Multi-User MIMO (MU-MIMO) using Active Antenna Systems (AAS) are important technologies to improve network capacity in wireless communication systems such as Fifth Generation (5G) cellular systems. An AAS supports full digital beamforming. An AAS can be applied, for example, to a base station in a 5G cellular system, specifically a Radio Unit (RU). For example, but not limited to, when an AAS is used as an RU, the AAS performs low Physical layer signal processing and beamforming in the digital domain.

An AAS includes an antenna array, multiple radio frequency (RF) chains, and a digital front end. Each RF chain includes a transmitter (or transmit) RF chain and a receiver (or receive) RF chain. One transmitter RF chain includes a transmitter, one or more power amplifiers (e.g., high power amplifier (HPA)), and one or more RF filters (e.g., bandpass filters). The transmitter includes, for example, a digital-to-analog converter (DAC), a baseband filter (e.g., low-pass filter), and an IQ modulator. Meanwhile, one receiver RF chain includes a receiver, one or more low-noise amplifiers (LNAs), and one or more RF filters (e.g., bandpass filters). The receiver includes, for example, an analog-to-digital converter (ADC), a baseband filter (e.g., low-pass filter), and an IQ demodulator.

To obtain accurate directivity in beamforming, multiple elements (or multiple RF chains) of an antenna array need to have the same phase and amplitude response. If there is a mismatch in the amplitude and phase relationship among the elements of the antenna array, this will cause relative changes in amplitude and phase among the radiated or received signals and affect the radiation pattern characteristics. Relative differences in amplitude (or gain) and phase among RF chains can result from, for example, thermal effects, aging of components, and manufacturing tolerances. To solve this problem, calibration of multiple antenna elements (or multiple RF chains) is required.

Discussions and proposals for calibration of an AAS can be found, for example, in two international applications by the inventor of the present application (see Patent Literature 1 and 2). Patent Literature 1 discloses a method for calibrating multiple RF chains across multiple AASs when these multiple AASs are connected and used as a single active antenna system. Patent Literature 2 provides a configuration and method for simultaneously and collectively calibrating multiple transmitters (or multiple transmitter RF chains) of an AAS.

PATENT LITERATURE

Patent Literature 1: WO 2019/176388 A1
Patent Literature 2: WO 2021/019885 A1

SUMMARY

The inventor has devised a product architecture in which subunits, each having multiple antenna elements and multiple RF chains, are manufactured and combined to form a single AAS. In one example, these multiple subunits are installed (or assembled) in a single antenna system enclosure. The subunits can be referred to as modules or cards. Calibration appropriate to the configuration of such an AAS product is required.

One of the objects to be attained by example embodiments disclosed herein is to provide an apparatus, a method, and a program that enable calibration suitable for the AAS product architecture described above. It should be noted that this object is merely one of the objects to be attained by the example embodiments disclosed herein. Other objects or problems and novel features will be made apparent from the following description and the accompanying drawings.

In a first aspect, an active antenna system includes first and second subunits and a controller. The first subunit includes a first set of antenna elements, a first set of transmitter Radio Frequency (RF) chains coupled to the first set of antenna elements, a first set of receiver RF chains coupled to the first set of antenna elements, and a first digital front end coupled to the first set of transmitter RF chains and the first set of receiver RF chains. Similarly, the second subunit includes a second set of antenna elements, a second set of transmitter RF chains coupled to the second set of antenna elements, a second set of receiver RF chains coupled to the second set of antenna elements, and a second digital front end coupled to the second set of transmitter RF chains and the second set of receiver RF chains. The controller is configured to perform a first transmission calibration, a second transmission calibration, and a third transmission calibration. The first transmission calibration compensates for relative differences in amplitude and phase among the transmitter RF chains in the first set of transmitter RF chains. The second transmission calibration compensates for relative differences in amplitude and phase among the transmitter RF chains in the second set of transmitter RF chains. The third transmission calibration compensates for relative differences in amplitude and phase between a first representative transmitter RF chain in the first set of transmitter RF chains and a second representative transmitter RF chain in the second set of transmitter RF chains.

In a second aspect, a method performed by a controller of an active antenna system includes the following steps:
(a) performing a first transmission calibration to compensate for relative differences in amplitude and phase among a plurality of transmitter radio frequency (RF) chains in a first subunit of the active antenna system;
(b) performing a second transmission calibration to compensate for relative differences in amplitude and phase among a plurality of transmitter RF chains in a second subunit of the active antenna system; and
(c) performing a third transmission calibration to compensate for relative differences in amplitude and phase between a first representative transmitter RF chain in the plurality of transmitter RF chains of the first subunit and a second representative transmitter RF chain in the plurality of transmitter RF chains of the second subunit.

In a third aspect, a program includes a set of instructions (software codes) that, when loaded into a computer (e.g., a controller of an active antenna system), causes the computer to perform the method of the second aspect described above.

BRIEF DESCRIPTION OF DRAWINGS

The above and other aspects, features, and advantages of the present invention will become more apparent from the following description of certain example embodiments when taken in conjunction with the accompanying drawings, in which.

EXAMPLE EMBODIMENT

Specific example embodiments will be described hereinafter in detail with reference to the drawings. The same or corresponding elements are denoted by the same symbols throughout the drawings, and duplicated explanations are omitted as necessary for the sake of clarity.

Each of the example embodiments described below may be used individually, or two or more of the example embodiments may be combined with one another as appropriate. These example embodiments include novel features different from each other. Accordingly, these example embodiments contribute to attaining objects or solving problems different from one another and also contribute to obtaining advantages different from one another.

As used in this specification, "if" may be interpreted as meaning "when", "at or around the time", "after", "upon", "in response to determining", "in accordance with a determination", or "in response to detecting", depending on the context. These expressions may be interpreted to mean the same thing, depending on the context.

First Example Embodiment

Figure 1:
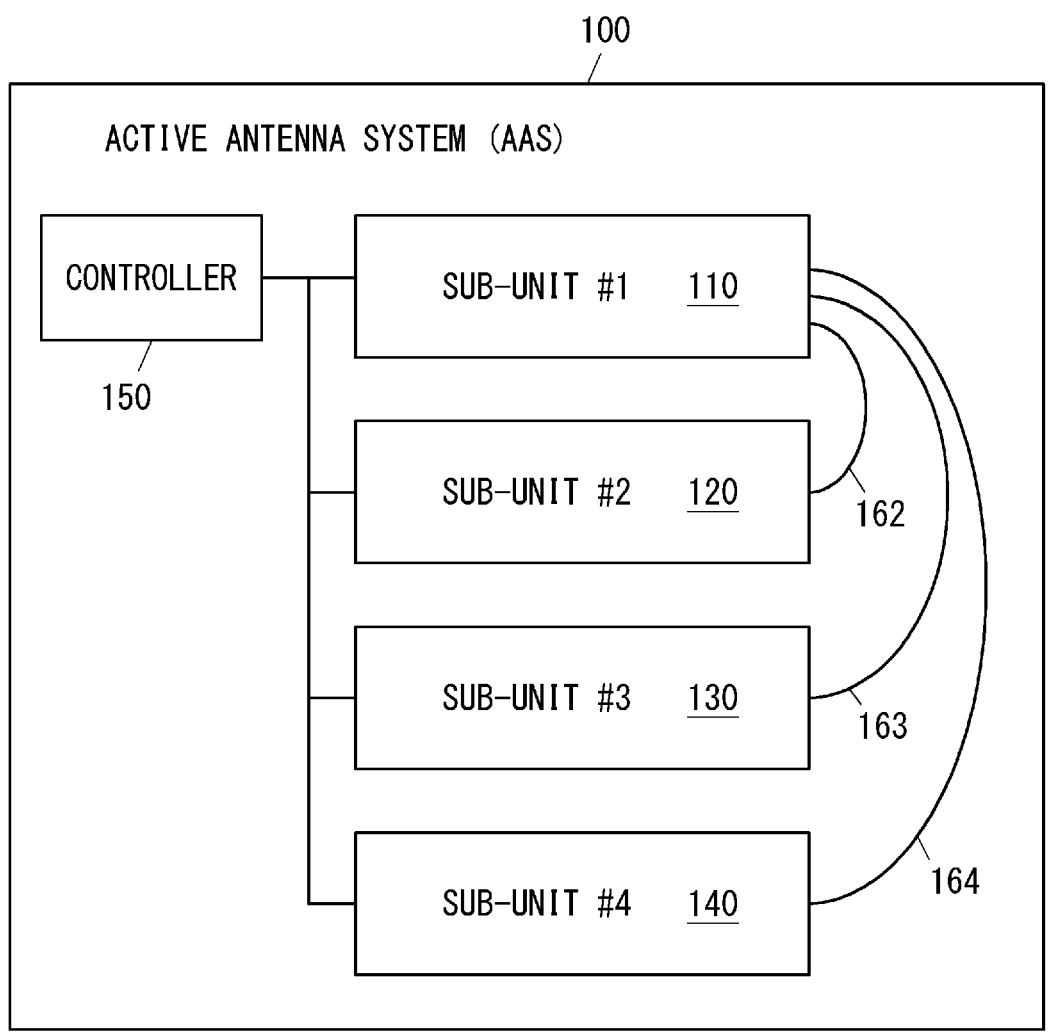
FIG. 1 is a diagram showing an example configuration of an active antenna of an example embodiment.

FIG. 1 shows a configuration example of an AAS 100 in this example embodiment. The AAS 100 may be used for a base station in a 5G cellular system, specifically as a Radio Unit (RU). The AAS 100 includes a plurality of subunits and a controller 150. A subunit may be referred to as a module or a card. Each subunit has a plurality of antennas (or antenna elements), a plurality of transmitter RF chains, a plurality of receiver RF chains, and a digital front end (DFE).

One transmitter RF chain includes a transmitter, one or more power amplifiers (e.g., HPA), and one or more RF filters (e.g., bandpass filters). The transmitter includes, for example, a plurality of DACs, a plurality of baseband filters (e.g., low-pass filters), and an IQ modulator. On the other hand, one receiver RF chain includes a receiver, one or more power amplifiers (e.g., LNAs), and one or more RF filters (e.g., bandpass filters). The receiver includes, for example, multiple ADCs, multiple baseband filters (e.g., low-pass filters), and an IQ demodulator. The DFE may perform, for example, but not limited to, low physical layer signal processing and digital radio signal processing. The low physical layer signal processing includes, for example, fast Fourier Transform (FFT) and inverse FFT (IFFT). The digital radio signal processing may include, for example, digital pre-distortion (DPD), crest factor reduction (CFR), digital up conversion (DUC), digital down conversion (DDC), and baseband channel filtering for transmission and reception.

By way of example, not limitation, the AAS 100 may have four subunits 110, 120, 130, and 140, as shown in FIG. 1. Each subunit may have 16 transmitter RF chains, 16 receiver RF chains, and 16 or more antenna elements. In this case, the AAS 100 may operate as an active phased array antenna with 64 or more antenna elements.

One particular subunit (e.g., subunit 110) is connected to the other subunits (e.g., subunits 120, 130, and 140) via RF lines (e.g., RF lines 162, 163, and 164). Each RF line may include a coaxial cable, coaxial connector, or distributed constant line or any combination thereof. These RF lines are used for inter-subunit calibration as described below.

The controller 150 performs first-stage transmission calibration and second-stage transmission calibration to compensate for relative differences in amplitude and phase among all the transmitter RF chains of the plurality of subunits (e.g., subunits 110, 120, 130, and 140). The first-stage transmission calibration may also be referred to as intra-subunit transmission calibration, while the second-stage transmission calibration is also referred to as inter-subunit transmission calibration. Similarly, the controller 150 performs first-stage reception calibration and second-stage reception calibration to compensate for relative differences in amplitude and phase among all the receiver RF chains of the plurality of subunits (e.g., subunits 110, 120, 130, and 140). The first-stage reception calibration is also referred to as intra-subunit reception calibration, while the second-stage reception calibration is also referred to as inter-subunit reception calibration.

In some implementations, the plurality of subunits 110, 120, 130, and 140 may be implemented on their respective circuit boards. The AAS 100 may have a single enclosure housing the plurality of subunits 110, 120, 130, and 140 and the controller 150. The first subunit 110 may be connected to the other subunits 120, 130, and 140 with the RF lines 162, 163, and 164 within this enclosure.

Figure 2A:
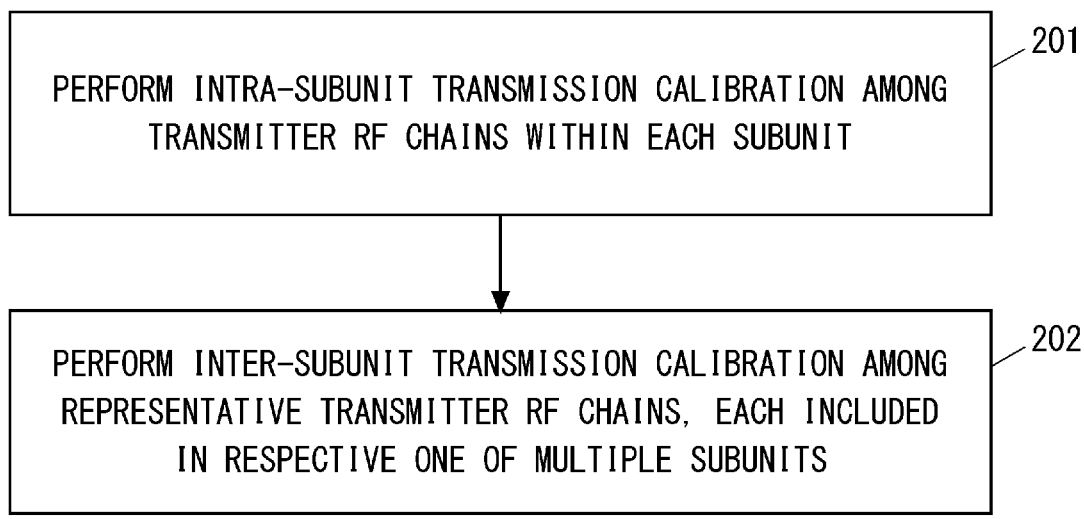
FIG. 2A is a flowchart showing an example of a transmission calibration procedure for an active antenna system according to an example embodiment.

FIG. 2A shows an example of a transmission calibration method or procedure. Step 201 is an intra-subunit transmission calibration and step 202 is an inter-subunit transmission calibration.

In step 201, the controller 150 performs transmission calibration among the transmitter RF chains within each subunit. Specifically, the controller 150 compensates for relative differences in amplitude and phase among the multiple transmitter RF chains within the first subunit (e.g., subunit 110). Similarly, the controller 150 corrects for relative differences in amplitude and phase among the multiple transmitter RF chains in the second subunit (e.g., subunit 120). If there are more than three subunits, the controller 150 performs the same transmission calibration for each of the third and subsequent subunits (e.g., subunits 130 and 140). The controller 150 is able to perform multiple first-stage transmission calibrations of multiple subunits independently. In other words, the multiple first-stage transmission calibrations of the multiple subunits may be performed simultaneously or at different times.

In the intra-subunit transmission calibration (step 201), the controller 150 may control a subunit in such a manner that the transmitters of a plurality of transmitter RF chains in the subunit transmit calibration signals and the receiver of any one receiver RF chain in the subunit receives these calibration signals. The calibration signal may be, for example, a multi-tone signal consisting of multiple known OFDM subcarriers superimposed on each other. The controller 150 may control all the transmitter RF chains in the subunit (except those in failure) to transmit calibration signals. Based on the reception results of the calibration signals, the controller 150 may calculate a correction factor (or offset or weight) to be applied to each transmitter RF chain to compensate for relative differences in amplitude and phase among the multiple transmitter RF chains in the subunit.

One transmitter RF chain in the subunit may be used (or chosen) as a reference transmitter RF chain. The reference transmitter RF chain is used as a reference in determining the correction factor for each transmitter RF chain except the reference transmitter RF chain to correct for relative differences in amplitude and phase. The correction factor for each transmitter RF chain may be the ratio of transmission line characteristics (or frequency response) of that transmitter RF chain to transmission line characteristics (or frequency response) of the reference transmitter RF chain. The correction factor may be referred to as a calibration factor, calibration weight, or offset.

As an example, consider the case where the AAS 100 has four subunits 110, 120, 130, and 140, each subunit having 16 transmitter RF chains. For transmission calibration within subunit #i (where i is an integer from 1 to 4), the calibration weight $W1_{i,n}^{TX}$ of transmitter RF chain #n (where n is an integer from 1 to 16) may be calculated by the following Equation (1):

$$W1_{i,n}^{TX} = \frac{TX_{i,Ref}}{TX_{i,n}}, i = 1, \ldots, 4; n = 1, \ldots, 16 \qquad (1)$$

where $TX_{i,Ref}$ is the amplitude and phase characteristics of the reference transmitter RF chain of subunit #i and $TX_{i,n}$ is the amplitude and phase characteristics of the transmitter RF chain #n of subunit #i. If transmitter RF chain #1 is chosen as the reference transmitter RF chain, then the calibration weight $W1_{i,1}^{TX}$ of transmitter RF chain #1 is equal to 1 and may be referred to as $W1_{i,Ref}^{TX}$. For example, the calibration weight $W1_{i,n}^{TX}$ may be added as an offset in the digital domain to the signal of the corresponding transmitter RF chain #n of subunit #i. This allows the 16 transmitter RF chains in subunit #i to be regarded as if they have the same amplitude and phase characteristics, i.e., the amplitude and phase characteristics $TX_{i,Ref}$ of the reference transmitter RF chain. Thus, the relative amplitude differences and relative phase differences among the 16 transmitter RF chains in subunit #i are compensated for. As noted above, the calibration weight $W1_{i,1}^{TX}$ for the reference transmitter RF chain is equal to 1, so the multiplication process of this weight may be omitted.

The characteristics (or frequency response) of passive components (e.g., a circulator and an RF filter) and lines located between a signal branch point for calibration (e.g., splitter) and a connection point of the corresponding antenna element in each transmission RF chain, as well as the characteristics of the antenna element itself, are measured at a factory before shipment of the AAS 100, and if there are virtually no factors that could cause these characteristics to vary, representative fixed values based on these measurements are preset and stored in the AAS 100. These measured and stored characteristics may be recorded or stored in a memory of the controller 150 or corresponding subunit. These measured and stored characteristics may be used for the intra-subunit calibration described above. Specifically, in Equation (1), instead of $TX_{i,n}$, a value obtained by multiplying $TX_{i,n}$ by $TX_{i,n,\ const}$ may be used. Similarly, in Equation (1), instead of $TX_{i,Ref}$, a value obtained by multiplying $TX_{i,Ref}$ by $TX_{i,Ref,\ const}$ may be used. $TX_{i,n,\ const}$ is the sum of the characteristics of the passive components and lines between the signal branch point of the transmitter RF chain #n of subunit #i and the connection point of the corresponding antenna element with the characteristics of the antenna element itself. Meanwhile, $TX_{i,Ref,\ const}$ is the sum of the characteristics of the passive components and lines between the signal branch point of the reference transmitter RF chain of subunit #i and the connection point of the corresponding antenna element with the characteristics of the antenna element itself. As mentioned above, if the variation of the amplitude-phase-frequency characteristics of the passive components up to the antenna among the transmitter RF chains is small and its temperature-dependent variation is flat and small, the amplitude-phase frequency characteristics up to the antenna in each chain can be added in advance as a fixed value.

After completion of the first-stage transmission calibration on a subunit-by-subunit basis, the controller 150 performs an inter-subunit transmission calibration (step 202). Specifically, the controller 150 compensates for relative differences in amplitude and phase among multiple representative transmitter RF chains, each included in a respective one of the multiple subunits. In the configuration example of FIG. 1, the controller 150 corrects for relative differences in amplitude and phase among four representative transmitter RF chains, chosen respectively from the four subunits 110, 120, 130, and 140. The representative transmitter RF chain for each subunit may be the same as the reference transmitter RF chain in the first stage transmission calibration.

In inter-subunit transmission calibration (step 202), the controller 150 may control the multiple representative transmitter RF chains of the multiple subunits to transmit calibration signals and the receiver of any one receiver RF chain of any one subunit to receive these calibration signals. In the configuration example in FIG. 1, calibration signals transmitted from the three representative transmitter RF chains in the second through fourth subunits 120, 130, and 140 are supplied to the first subunit 110 via the RF lines 162, 163, and 163. Thus, the receiver of one receiver RF chain in the first subunit 110 is used to receive these calibration signals. The receiver in any subunit that receives the calibration signals in the inter-subunit transmission calibration may be the same as or different from the receiver used to receive the calibration signals during the intra-subunit transmission calibration of that subunit.

The controller 150 may calculate a correction factor (or offset or weight) applied to each representative transmitter RF chain to compensate for relative differences in amplitude and phase among the plurality of representative transmitter RF chains based on the reception results of the calibration signals. In other words, the controller 150 may calculate a correction factor (or offset) to be applied to each representative transmitter RF chain to correct for relative differences in amplitude and phase among the subunits. One of the multiple representative transmitter RF chains may be used (or selected) as a reference representative transmitter RF chain. The correction factor for each representative transmitter RF chain may be the ratio of the transmission line characteristics (or frequency response) of that representative transmitter RF chain to the transmission line characteristics (or frequency response) of the reference representative transmitter RF chain.

As an example, consider the case where the AAS 100 has four subunits 110, 120, 130, and 140. In inter-subunit transmission calibration, the calibration weight $W2_i^{TX}$ of the representative transmitter RF chain of subunit #i (where i is an integer from 1 to 4) may be calculated by the following Equation (2):

$$W2_i^{TX} = \frac{TX_{Ref,Rep}}{TX_{i,Rep}}, i = 1, \ldots, 4 \qquad (2)$$

where $TX_{Ref,Rep}$ is the amplitude and phase characteristics of the reference representative transmitter RF chain, and $TX_{i,Rep}$ is the amplitude and phase characteristics of the representative transmitter RF chain of subunit #i. If the representative transmitter RF chain of subunit #1 (i.e., subunit 110) is chosen as the reference representative transmitter RF chain, then the calibration weight $W2_1^{TX}$ of subunit #1 is equal to 1 and may be referred to as $W2_{Ref}^{TX}$. For example, after completion of the inter-subunit transmission calibration, the calibration weight $W2_i^{TX}$ may be added as an offset in the digital domain to the signals of all the transmitter RF chains in the corresponding subunit #i. This results in all (e.g., 64) transmitter RF chains in all four subunits to be regarded as if they have identical amplitude and phase characteristics. Thus, the relative amplitude differences and relative phase differences among all the transmitter RF chains of the four subunits is compensated. As noted above, the calibration weight $W2_{Ref}^{TX}$ of the reference representative transmitter RF chain is equal to 1, so the multiplication process of this weight may be omitted.

Equation (2) may be transformed as follows. For the sake of illustration, consider the case where the representative transmitter RF chain of subunit #1 is the reference representative transmitter RF chain. In this case, the calibration weight $W3_i^{TX}$ defined in Equation (3) below may be used instead of the calibration weight $W2_i^{TX}$ in Equation (2):

$$W3_i^{TX} = \frac{W2_i^{TX}}{W2_{Ref}^{TX}}, i = 2, \ldots, 4 \qquad (3)$$

That is, $W3_i^{TX}$ is obtained by the ratio of the calibration weight $W2_i^{TX}$ of a non-reference representative transmitter RF chain obtained by inter-subunit transmission calibration to the calibration weight $W2_{Ref}^{TX}$ (or $W2_1^{TX}$) obtained by the same inter-subunit calibration. In other words, by dividing the calibration weight $W2_i^{TX}$ of a subunit by the calibration weight $W2_{Ref}^{TX}$ of the reference subunit #1, as in Equation (3), it is possible to obtain $W2_i^{TX}$ in Equation (2) and $W3_i^{TX}$ in Equation (3), which is equivalent to Equation (2) $W2_i^{TX}$.

The following explains that $W3_i^{TX}$ in Equation (3) is equivalent to $W2_i^{TX}$ in Equation (2). In other words, it explains that the relational equation shown in Equation (4) can be derived:

$$W3_i^{TX} = \frac{W2_i^{TX}}{W2_{Ref}^{TX}} (i=2,\ldots,4) = \frac{TX_{Ref,Rep}}{TX_{i,Rep}} \quad (4)$$

The calibration weight $W2_i^{TX}$ for each subunit is obtained by the following Equation (5):

$$W2_i^{TX} = \frac{1}{TX\ Cal\ Actual \times \frac{TX\ Chain\ Pre\text{-}obtained}{TX\ Cal\ Pre\text{-}obtained}} = \frac{TX\ Cal\ Pre\text{-}obtained}{TX\ Cal\ Actual \times TX\ Chain\ Pre\text{-}obtained} = \frac{1}{TX_{i,Rep}} \quad (5)$$

where "TX Cal Pre-obtained" is the amplitude-phase-frequency characteristic pre-measured through a TX calibration network of the transmitter, obtained during AAS internal calibration in product testing performed in a factory prior to shipment. Meanwhile, "TX Chain Pre-obtained" is the amplitude-phase-frequency characteristic of the main signal transmission system up to the antenna of each transmitter TX chain, obtained during AAS internal calibration in product testing performed in a factory prior to shipment. The ratio of "TX Chain Pre-obtained" to "TX Cal Pre-obtained" may be written to a memory in the AAS 100 as a pre-stored correction factor by calibration. On the other hand, "TX Cal Actual" is obtained as a result of calibration measured via the TX calibration network of that transmitter under field operation, including the aspect of amplitude and phase variation of the TX system, with successive updates. Consequently, $W2_i^{TX}$ is expressed as the rightmost side of Equation (5), i.e., the inverse of the estimated amplitude-phase-frequency characteristic $TX_{i,Rep}$ of the representative transmitter in each subunit, including its antenna, which is estimated through calibration and updated periodically.

Similarly, the calibration weight $W2_{Ref}^{TX}$ of the reference representative transmitter RF chain is obtained by the following Equation (6):

$$W2_{Ref}^{TX} = \frac{1}{TX\ Ref\ Cal\ Actual \times \frac{TX\ Ref\ Chain\ Pre\text{-}obtained}{TX\ Ref\ Cal\ Pre\text{-}obtained}} = \frac{TX\ Ref\ Cal\ Pre\text{-}obtained}{TX\ Ref\ Cal\ Actual \times TX\ Ref\ Chain\ Pre\text{-}obtained} = \frac{1}{TX_{Ref,Rep}} \quad (6)$$

where "TX Ref Cal Pre-obtained" is the amplitude-phase-frequency characteristic pre-measured through a TX calibration network of the reference representative transmitter, obtained during AAS internal calibration in product testing performed in a factory prior to shipment. Meanwhile, "TX Ref Chain Pre-obtained" is the amplitude-phase-frequency characteristic of the main signal transmission system up to the antenna of the reference representative transmitter TX chain, obtained during AAS internal calibration in product testing performed in a factory prior to shipment. The ratio of "TX Ref Cal Pre-obtained" to "TX Ref Chain Pre-obtained" may be written to a memory in the AAS 100 as a pre-stored correction factor by calibration. On the other hand, "TX Ref Cal Actual" is obtained as a result of calibration measured via the TX calibration network of the reference representative transmitter under field operation, including the aspect of amplitude and phase variation of the TX system, with successive updates. Consequently, $W2_{Ref}^{TX}$ is expressed as the rightmost side of Equation (6), i.e., the inverse of the estimated amplitude-phase-frequency characteristic $TX_{Ref,Rep}$ of the representative transmitter of the reference subunit, including its antenna, which is estimated through calibration and updated periodically.

From the above, it can be seen that by dividing $W2_i^{TX}$ in Equation (5) by $W2_{Ref}^{TX}$ in Equation (6), the following relationship in Equation (7) can be obtained, as well as the relationship in Equation (4):

$$W3_i^{TX} = \frac{W2_i^{TX}}{W2_{Ref}^{TX}} = (1/TX_{i,Rep})/(1/TX_{Ref,Rep}) = \frac{TX_{Ref,Rep}}{TX_{i,Rep}} = W2_i^{TX} \quad (7)$$

By using the correction factors obtained from the intra-subunit transmission calibrations (step 201) and the inter-subunit transmission calibration (step 202), the controller 150 can remove (or compensate for, or correct for) mismatches in amplitude and phase relationships among all the transmitter RF chains in the multiple subunits. In some implementations, the controller 150 may calculate the correction factor to be applied to each transmitter RF chain by multiplying the correction factor obtained from the intra-subunit transmission calibration with the correction factor obtained from the inter-subunit transmission calibration. This calculation is suitable when the representative transmitter RF chain for each subunit is the same as the reference transmitter RF chain in the first stage transmission calibration. The controller 150 may control the DFE of each subunit to add the corresponding phase and amplitude difference as an offset in the digital domain based on the obtained correction factor.

As an example, consider the case where the AAS 100 has four subunits 110, 120, 130, and 140, each subunit having 16 transmitter RF chains. The controller 150 may calculate the total calibration weight $Wtotal_{i,n}^{TX}$ to be applied to the signal of transmitter RF chain #n in subunit #i by the following Equation (8):

$$Wtotal_{i,n}^{TX} = W2_i^{TX} \times W1_{i,n}^{TX},\ i=1,\ldots,4;$$
$$n=1,\ldots,16. \quad (8)$$

where $W1_{i,n}^{TX}$ is the calibration weight for the transmission RF chain #n in subunit #i, obtained by the intra-subunit calibration and calculated by Equation (1). Meanwhile, $W2_i^{TX}$ is the calibration weight for subunit #i, obtained in the inter-subunit calibration and calculated using Equation (2) or Equation (3). For example, the total calibration weight $Wtotal_{i,n}^{TX}$ may be added as an offset in the digital domain to the signal of the corresponding transmitter RF chain #n in subunit #i. This allows the total of 64 transmitter RF chains in the four subunits to be regarded as if they have identical amplitude and phase characteristics. Thus, the relative amplitude and phase differences among the 64 transmitter RF chains of the four subunits are compensated for.

Alternatively, the controller 150 may calculate the total calibration weight $Wtotal_{i,n}^{TX}$ to be applied to the signals of the transmitter RF chain #n in subunit #i by the following Equation (9):

$$Wtotal_{i,n}^{TX} = W3_i^{TX} \times W1_{i,n}^{TX}, \; i=1,\ldots,4; \; n=1,\ldots,16. \quad (9)$$

where $W1_{i,n}^{TX}$ is the calibration weight for the transmission RF chain #n in subunit #i, obtained by the intra-subunit calibration and calculated by Equation (1). Meanwhile, $W3_i^{TX}$ is the calibration weight for subunit #i, obtained in the inter-subunit calibration and calculated using Equation (4) or Equation (7). For example, the total calibration weight $Wtotal_{i,n}^{TX}$ may be added as an offset in the digital domain to the signal of the corresponding transmitter RF chain #n in subunit #i. This allows the total of 64 transmitter RF chains in the four subunits to be regarded as if they have identical amplitude and phase characteristics. Thus, the relative amplitude and phase differences among the 64 transmitter RF chains of the four subunits are compensated for.

Figure 2B:
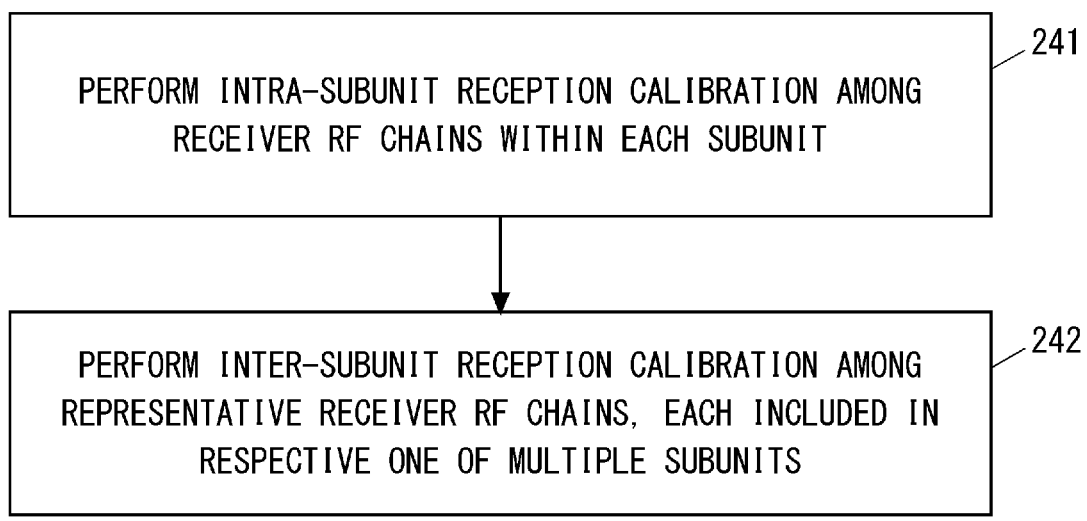
FIG. 2B is a flowchart showing an example of a reception calibration procedure for an active antenna system according to an example embodiment.

FIG. 2B shows an example of a reception calibration method or procedure. Step 241 is an intra-subunit reception calibration and step 242 is an inter-subunit reception calibration. The intra-subunit and inter-subunit reception calibrations may be performed in a manner similar to the intra-subunit and inter-subunit transmission calibrations described above.

In step 241, the controller 150 performs reception calibration among the reception RF chains within each subunit. Specifically, the controller 150 compensates for relative differences in amplitude and phase among the multiple receiver RF chains within the first subunit (e.g., subunit 110). Similarly, the controller 150 corrects for relative differences in amplitude and phase among the multiple receiver RF chains in the second subunit (e.g., subunit 120). If there are more than three subunits, the controller 150 performs the same reception calibration for each of the third and subsequent subunits (e.g., subunits 130 and 140). The controller 150 is able to perform multiple first-stage reception calibrations of multiple subunits independently. In other words, the multiple first-stage reception calibrations of the multiple subunits may be performed simultaneously or at different times.

In the intra-subunit reception calibration (step 241), the controller 150 controls a subunit in such a manner that the transmitter of one transmitter RF chain in the subunit transmits a calibration signal and the receivers of a plurality of receiver RF chains in the subunit receive this calibration signal. The controller 150 may control all the receiver RF chains in the subunit (except those in failure) to receive the calibration signal. Based on the results of receiving the calibration signal, the controller 150 may calculate a correction factor (or offset or weight) to be applied to each receiver RF chain to compensate for relative differences in amplitude and phase among the multiple receiver RF chains in the subunit.

One receiver RF chain in the subunit may be used (or chosen) as a reference receiver RF chain. The reference receiver RF chain is used as a reference in determining the correction factor for each receiver RF chain except the reference receiver RF chain to correct for relative differences in amplitude and phase. The correction factor for each receiver RF chain may be the ratio of transmission line characteristics (or frequency response) of that receiver RF chain to transmission line characteristics (or frequency response) of the reference receiver RF chain. The correction factor may be referred to as a calibration factor, calibration weight, or offset.

After completion of the first-stage reception calibration on a subunit-by-subunit basis, the controller 150 performs an inter-subunit reception calibration (step 242). Specifically, the controller 150 compensates for relative differences in amplitude and phase among multiple representative receiver RF chains, each included in a respective one of the multiple subunits. In the configuration example of FIG. 1, the controller 150 corrects for relative differences in amplitude and phase among four representative receiver RF chains, chosen respectively from the four subunits 110, 120, 130, and 140. The representative receiver RF chain for each subunit may be the same as the reference receiver RF chain in the first stage reception calibration.

In the inter-subunit transmission calibration (step 242), the controller 150 may control the multiple subunits in such a manner that any one transmitter in any one transmitter RF chain of any one subunit transmits a calibration signal, and the multiple representative receiver RF chains of the multiple subunits receive this calibration signal. In the configuration example in FIG. 1, the calibration signal output from one of the transmitters in the first subunit 110 is fed to the three representative transmitter RF chains in the second through fourth subunits 120, 130, and 140 via the RF lines 162, 163, and 163. The transmitter of any of the subunits transmitting the calibration signal in the inter-subunit transmission calibration may be the same as or different from the transmitter used to transmit the calibration signal during the intra-subunit reception calibration of that subunit.

The controller 150 may calculate a correction factor (or offset or weight) applied to each representative receiver RF chain to compensate for relative differences in amplitude and phase among the plurality of representative receiver RF chains based on the reception results of the calibration signal. In other words, the controller 150 may calculate a correction factor (or offset) to be applied to each representative receiver RF chain to correct for relative differences in amplitude and phase among the subunits. One of the multiple representative receiver RF chains may be used (or selected) as a reference representative receiver RF chain. The correction factor for each representative receiver RF chain may be the ratio of the transmission line characteristics (or frequency response) of that representative receiver RF chain to the transmission line characteristics (or frequency response) of the reference representative receiver RF chain.

By using the correction factors obtained from the intra-subunit reception calibrations (step 241) and the inter-subunit reception calibration (step 242), the controller 150 can remove (or compensate for, or correct for) mismatches in amplitude and phase relationships among all the receiver RF chains in the multiple subunits. In some implementations, the controller 150 may calculate the correction factor to be applied to each receiver RF chain by multiplying the correction factor obtained from the intra-subunit reception calibration with the correction factor obtained from the inter-subunit reception calibration. This calculation is suitable when the representative receiver RF chain for each subunit is the same as the reference receiver RF chain in the first stage reception calibration. The controller 150 may control the DFE of each subunit to add the corresponding phase and amplitude difference as an offset in the digital domain based on the obtained correction factor.

The calculation of correction factors or calibration weights in the reception calibrations may be performed in the same manner as the calculation of correction factors or calibration weights in the transmission calibrations described with reference to Equations (1) through (9).

The calibrations described with reference to FIG. 2A and FIG. 2B may be performed at the time the AAS 100 is manufactured (prior to product shipment). In addition, the calibrations described with reference to FIG. 2A and FIG. 2B may be performed as appropriate while the AAS 100 is in operation.

As an example, not a limitation, the intra-subunit transmission and reception calibrations in step 201 of FIG. 2A and step 241 of FIG. 2B may be performed according to the method described in International Publication WO 2021/019885 A1 (Patent Literature 2).

Adopting the AAS architecture with multiple subunits described with reference to FIG. 1 and the two-stage calibration described with reference to FIGS. 2A and 2B can bring the following advantages, for example. In one example, the first stage calibration and the second stage calibration can be performed independently and separately. This can contribute to improving the first pass yield of the AAS 100 during pre-shipment inspection. Specifically, the first pass yield during inspection of each subunit can be improved. In addition, by stocking manufactured subunits for which the first-stage transmission and reception calibration has been completed and then assembling the AAS 100 with these subunits as needed, the first pass yield of the AAS 100 during equipment inspection can also be improved. Furthermore, separating the first-stage calibration and second-stage calibration would alleviate the time constraints of calibrations performed while the AAS 100 is in operation.

Second Example Embodiment

Figure 3:
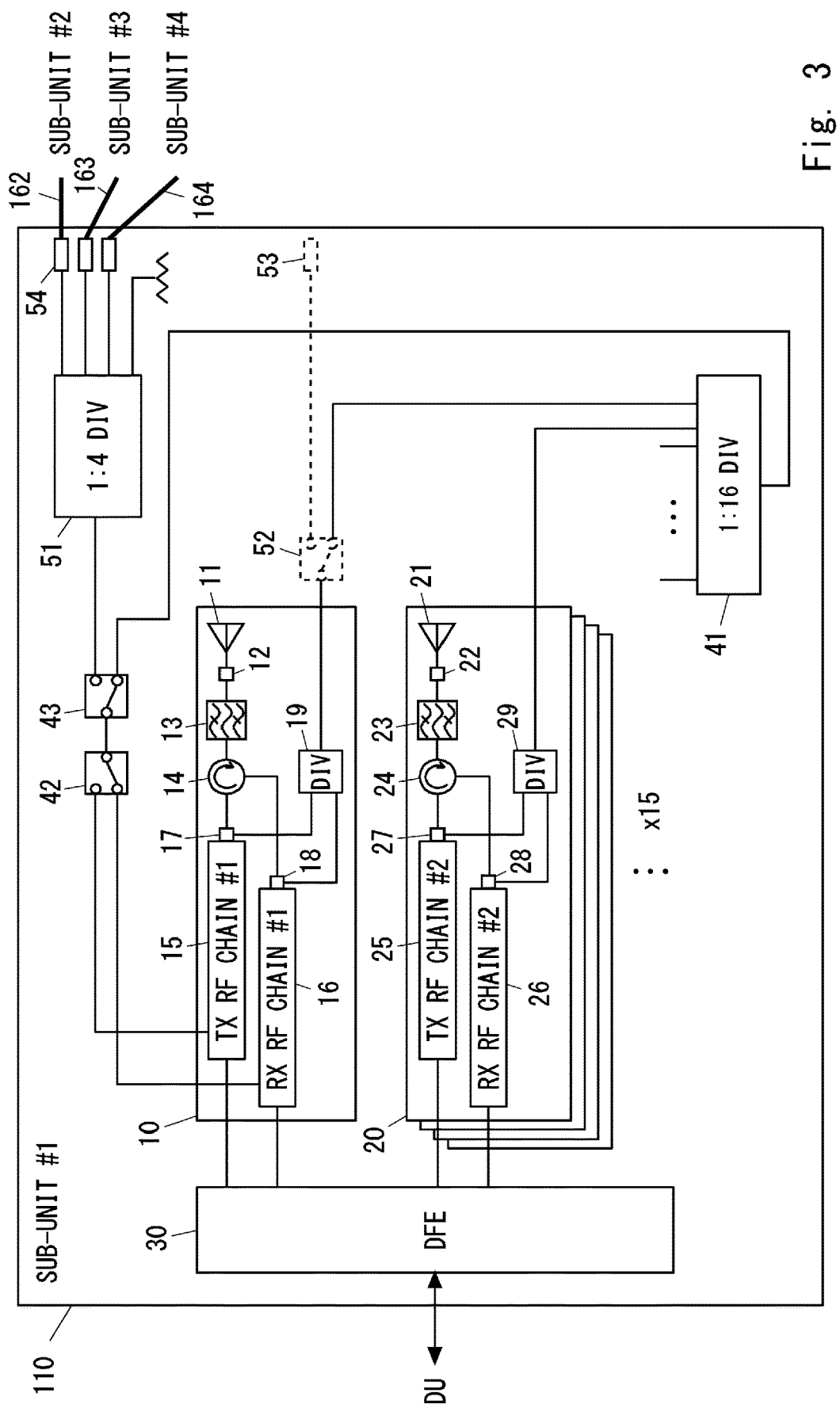
FIG. 3 shows a configuration example of a subunit in an active antenna system according to an example embodiment.
Figure 4:
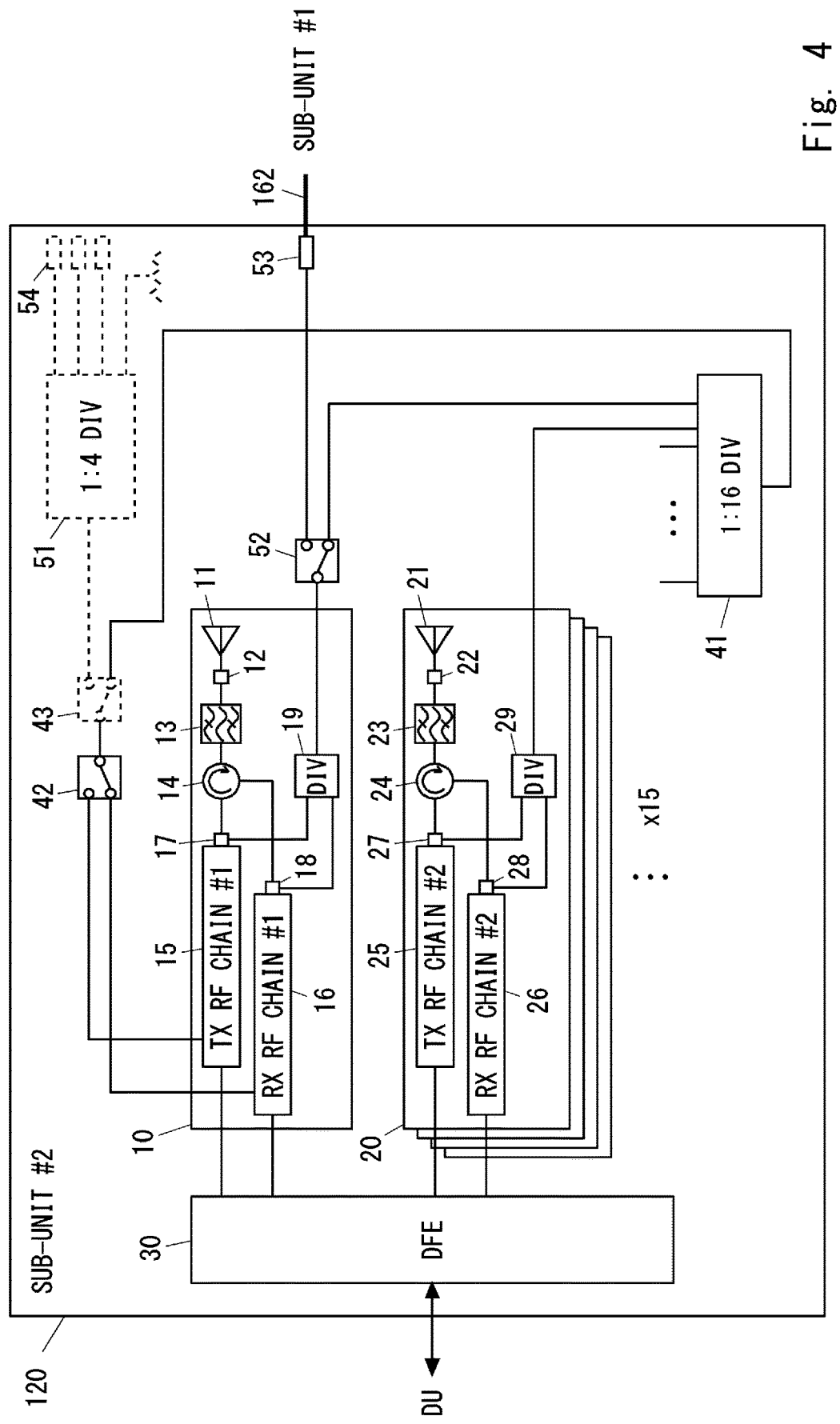
FIG. 4 shows a configuration example of a subunit in an active antenna system according to an example embodiment.

This example embodiment provides a specific example of the configuration and calibration method of the AAS 100 described in the first example embodiment. FIG. 3 shows an example configuration of the first subunit 110 and FIG. 4 shows an example configuration of the second subunit 120. If the AAS 100 has three or more subunits, the configuration of the third and subsequent subunits (e.g., subunits 130 and 140) may be identical to that of the second subunit 120. As shown in FIG. 3 and FIG. 4, all subunits may have the same configuration, except for the connection relationship between the subunits and the RF lines 162-164.

Referring to FIG. 3, the subunit 110 includes multiple transceiver RF chains. In the example in FIG. 3, the number of transceiver RF chains in the subunit 110 is 16. A transceiver RF chain 10 is configured to provide a calibration signal during intra-subunit reception calibration to a receiver RF chain 16 in the transceiver RF chain 10 and to receiver RF chains 26 in the other 15 transceiver RF chains 20. In addition, the transceiver RF chain 10 is configured to receive calibration signals from a transmitter RF chain 15 in the transceiver RF chain 10 and from transmitter RF chains 25 in the other 15 transceiver RF chains 20 during intra-subunit transmission calibration. The transceiver RF chain 10 is also configured to provide a calibration signal to representative receiver RF chains of other subunits (e.g., subunits 120, 130, and 140) during inter-subunit reception calibration. Similarly, the transceiver RF chain 10 is configured to receive calibration signals from representative transmitter RF chains of other subunits (e.g., subunits 120, 130, and 140) during inter-subunit transmission calibration.

The transceiver RF chain 10 includes the transmitter RF chain 15 and the receiver RF chain 16. The transmitter RF chain 15 is connected to a DFE 30 and also connected to one or more antenna elements 11 via RF passive components such as a circulator 14 and RF filter 13 (e.g., bandpass filter). The reference sign 12 represents a connection point (e.g., Transceiver Array Boundary (TAB) connector) to the antenna element(s) 11. A splitter 17 is located at the output end of the transmitter RF chain 15 and splits an output signal of the transmitter RF chain 15 for transmission calibration and feeds it to a calibration signal path via a divider 19. A splitter (or combiner) 18 is located at the input end of the receiver RF chain 16 and feeds a calibration signal from the calibration signal path to the receiver RF chain 16 for reception calibration.

Each of the 15 transceiver RF chains 20 has components similar to those of the transceiver RF chains 10. Specifically, each transceiver RF chain 20 includes the transmitter RF chain 25 and receiver RF chain 26. The transmitter RF chain 25 is connected to the DFE 30 and also connected to one or more antenna elements 21 via RF passive components such as a circulator 24 and RF filter 23 (e.g., bandpass filter). The reference sign 22 represents a connection point (e.g., TAB connector) to the antenna element(s) 21. A splitter 27 is located at the output end of the transmitter RF chain 25 and splits an output signal of the transmitter RF chain 25 for transmission calibration and feeds it to the calibration signal path via a divider 29. A splitter (or combiner) 28 is located at the input end of the receiver RF chain 26 and feeds a calibration signal from the calibration signal path to the receiver RF chain 26 for reception calibration.

However, the transmitter RF chain 15 of the transceiver RF chain 10 requires a switch to select the output destination of its transmitter between the path directed to the antenna element 11 and the signal path including a switch 42 for calibration. Similarly, the receiver RF chain 16 of the transceiver RF chain 10 requires a switch to select its receiver input between the path connected to the antenna element 11 and the signal path including the switch 42 for calibration. In contrast, each of the other 20 transceiver RF chains does not require such a switch.

The switch 42, a switch 43, and a 16-way divider network 41 are used as the signal path for intra-subunit transmission calibration and reception calibration. In intra-subunit transmission calibration, the 16-way divider network 41 operates to provide calibration signals from the 16 transmitter RF chains (15, 25) to the receiver in the receiver RF chain 16 via the switches 42 and 43. In addition, in intra-subunit reception calibration, the 16-way divider network 41 operates to receive a calibration signal from the transmitter in the transmitter RF chain 15 via the switches 42 and 43 and feed it to the 16 receiver RF chains (16, 26).

The switches 42 and 43 and a 4-way divider network 51 are used as a signal path for inter-subunit transmission calibration and reception calibration. In inter-subunit transmission calibration, the 4-way divider network 51 operates to receive calibration signals from the representative transmitter RF chains of the other three subunits 120, 130, and 140 via the RF lines 162, 163, and 164, and supply them to the receiver in the receiver RF chain 16 via the switches 42 and 43. In addition, in inter-subunit reception calibration, the 4-way divider network 51 operates to receive a calibration signal from the transmitter in the transmitter RF chain 15 via the switches 42 and 43 and feed it to the representative receiver RF chains in the other three subunits 120, 130, and 140. The 4-way divider network 51 may be connected to the RF lines 162, 163, and 164 via RF connectors 54 (e.g., coaxial connectors).

The subunit 110 does not necessarily require a switch 52 and an RF connector 53, and thus these may be omitted. If the switch 52 is provided in the subunit 110, the switch 52 may always select the line to the 16-way divider network 41.

The DFE 30 may perform, for example, but not limited to, low physical layer signal processing and digital radio signal processing. The low physical layer signal processing includes, for example, FFT and IFFT. The digital radio signal processing includes, for example, DPD, CFR, DUC, and DDC. Although not illustrated, the DFE 30 is communicatively coupled to the controller 150. The controller 150 controls the DFE 30 for intra-subunit and inter-subunit calibration. The controller 150 also controls the DFE 30 of each subunit to multiply a calibration weight of each transmitter RF chain obtained by transmission calibration with the transmission signal of that transmitter RF chain. In this way, the controller 150 matches the amplitude-phase characteristics among all the transmitters in all the subunits. Similarly, the controller 150 controls the DFE 30 of each subunit to multiply a calibration weight of each receiver RF chain obtained by reception calibration with the received signal of that receiver RF chain. In this way, the controller 150 matches the amplitude phase characteristics among all the receivers of all the subunits. The DFE 30 may have an interface to communicate with a digital baseband unit (e.g., Distributed Unit (DU) of 5G gNB).

Referring to FIG. 4, the subunit 120 has the same configuration as the subunit 110 shown in FIG. 3. However, for inter-subunit transmission calibration and reception calibration, the transceiver RF chain 10 can be connected to the RF line 162 via a switch 52. In inter-subunit transmission calibration, the transmitter RF chain 15 of the transceiver RF chain 10 acts as the representative transmitter RF chain and provides a calibration signal to the first subunit 110 via the RF line 162. In inter-subunit reception calibration, the receiver RF chain 16 of the transceiver RF chain 10 acts as the representative receiver RF chain and receives a calibration signal from the first subunit 110 via the RF line 162.

The subunit 120 does not necessarily require the switch 43, the 4-way divider network 51, and the multiple RF connectors 54, and thus these may be omitted. If the switch 43 is provided in the subunit 120, the switch 43 may always select the line to the 16-way divider network 41.

Figure 5A:
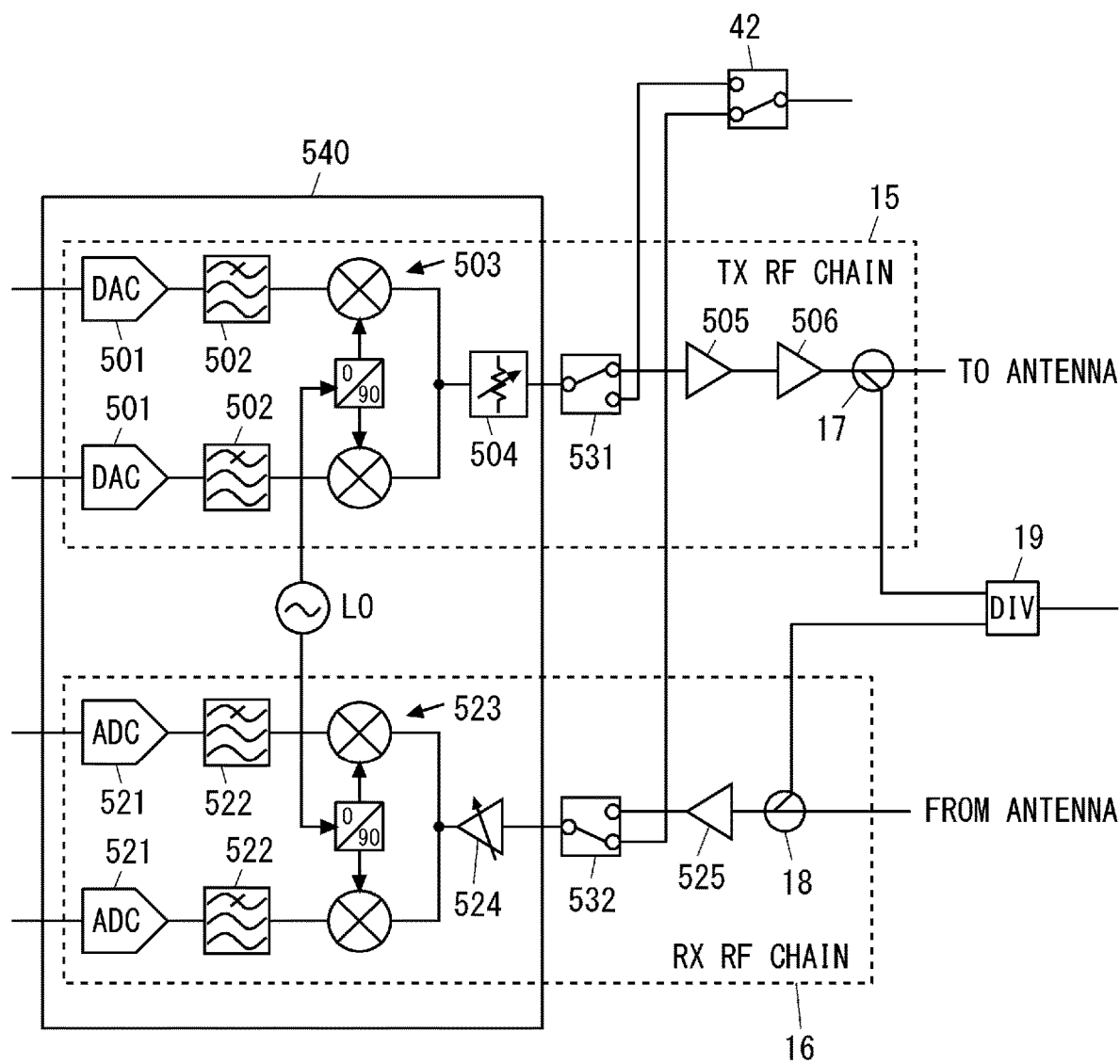
FIG. 5A shows a configuration example of a transmitter RF chain and a receiver RF chain in an active antenna system according to an example embodiment.

FIG. 5A shows a non-limiting example of the configuration of the transmitter RF chain 15 and receiver RF chain 16 in the transceiver RF chain 10. In this example, the transmitter RF chain 15 includes two DACs 501, two low-pass filters 502, an IQ modulator 503, a variable attenuator 504, a driver amplifier 505 and a high-power amplifier (HPA) 506. Meanwhile, the receiver RF chain 16 includes two ADCs 521, two low-pass filters 522, an IQ demodulator 523, a variable gain amplifier 524, and an LNA 525. As an example, not a limitation, the elements from the DAC 501 to the variable attenuator 504 in the transmitter RF chain 15 and the elements from the ADC 521 to the variable gain amplifier 524 in the receiver RF chain 16 may be implemented as one transceiver integrated circuit (IC) 540.

Additionally, in the example in FIG. 5A, a switch 531 is located in the transmitter RF chain 15 and a switch 532 is located in the receiver RF chain 16. The switch 531 enables a calibration signal output from the transmitter (including the DAC 501, low-pass filter 502, IQ modulator 503) to be fed to the path for calibration during intra-subunit and inter-subunit reception calibration. Meanwhile, the switch 532 allows calibration signals to be fed from the path for calibration to the receiver (including the ADC 521, low-pass filter 522, and IQ demodulator 523) during intra-subunit and inter-subunit transmission calibration.

Figure 5B:
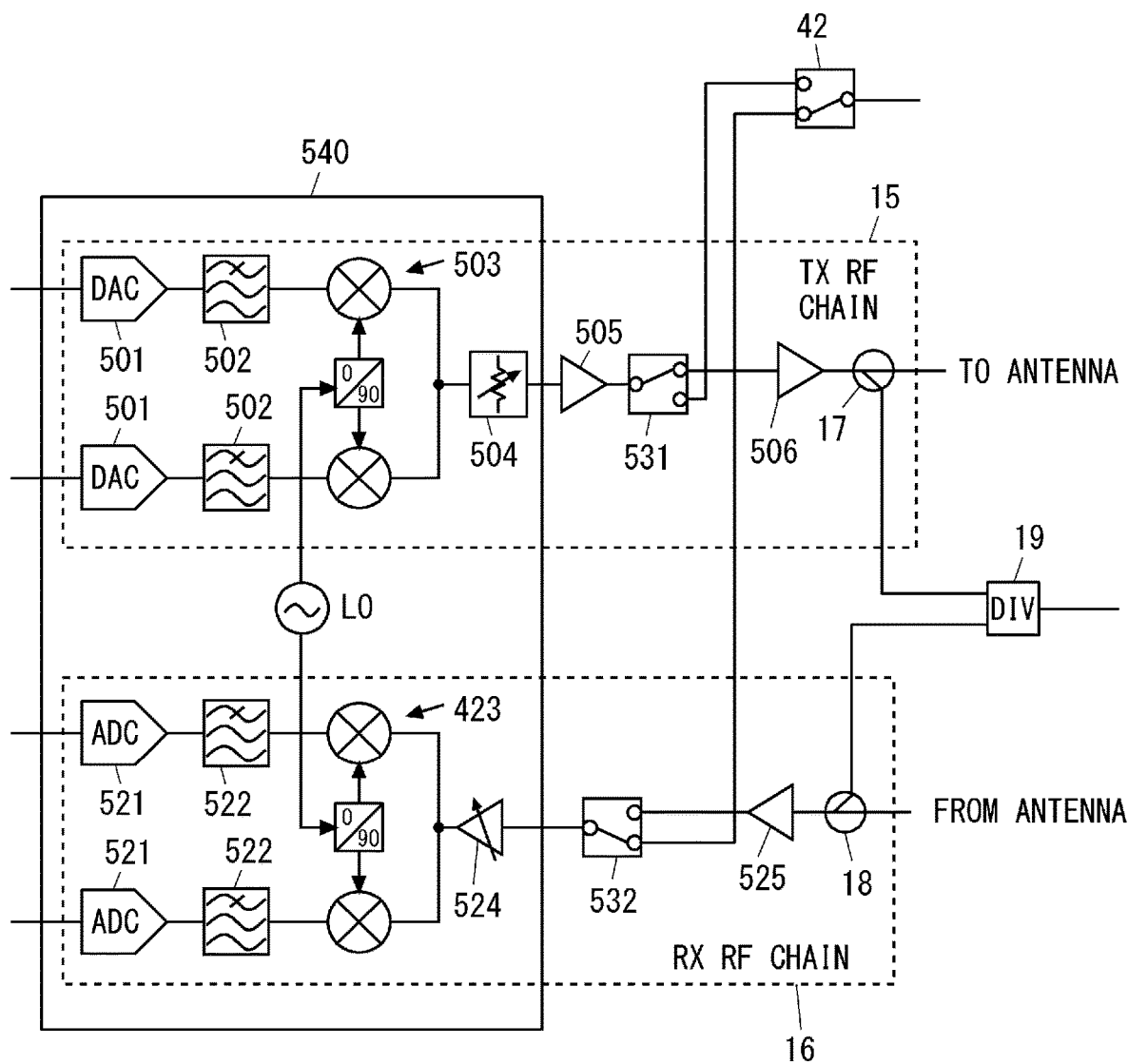
FIG. 5B shows a configuration example of a transmitter RF chain and a receiver RF chain in an active antenna system according to an example embodiment.

FIG. 5B shows another non-limiting example of the configuration of the transmitter RF chain 15 and receiver RF chain 16 of the transceiver RF chain 10. FIG. 5B differs from FIG. 5A in that the switch 531 is located at the output of the driver amplifier 505. According to the configuration in FIG. 5B, the calibration signal for intra-subunit and inter-subunit reception calibration is amplified by the gain of the driver amplifier 505 before being sent to the path for calibration (i.e., switch 42). This can contribute to an improved signal to noise ratio (SNR) of the calibration signal for intra-subunit and inter-subunit reception calibration.

Figure 6:
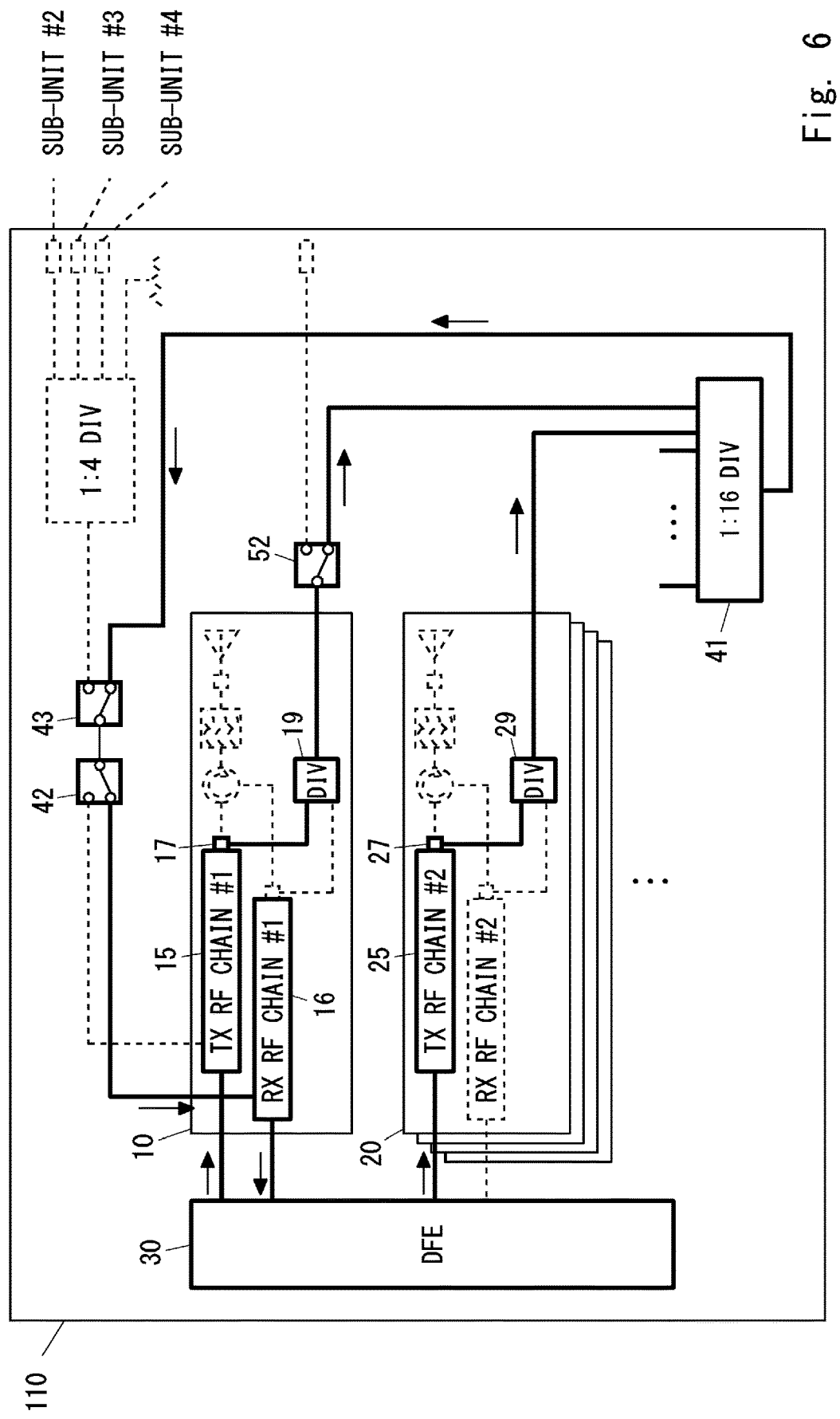
FIG. 6 shows an example of a signal path in an intra-subunit transmission calibration of an active antenna system according to an example embodiment.

The following paragraphs describe the calibration in the configuration of the subunits 110, 120, 130, and 140 described in FIGS. 3, 4, 5A, and 5B. The path shown in FIG. 6 with bold lines represents the signal path used during intra-subunit transmission calibration of the first subunit 110. In this case, following the control of the controller 150, a calibration signal generated by the DFE 30 is sent to the 16 transmitter RF chains 15 and 25 and received by the receiver in the receiver RF chain 16 through the 16-way divider network 41. The DFE 30 detects the received calibration signals. Based on the reception results of the calibration signals, the controller 150 calculates a correction factor (or offset or weight) to be applied to each transmitter RF chain. The correction factor may be referred to as a calibration factor, calibration weight, or offset. The signal paths used during intra-subunit transmission calibration of the other subunits 120, 130, and 140 are similar to that in FIG. 6.

For example, for intra-subunit transmission calibration, the controller 150 may calculate the calibration weights according to the specific example described in the first example embodiment with reference to Equation (1). As described in the first example embodiment, the characteristics (or frequency response) of the passive components (e.g., circulator 14 and RF filter 13) and lines existing between the splitters 17 and 18 and the connection point 12 of the antenna element 11 in the transceiver RF chain 10 may be measured at a factory before shipment of the AAS 100. Similarly, the characteristics of the passive components and lines located between the splitters 27 and 28 and the connection point 22 of the antenna element 21 in each of the other transceiver RF chains 20 may be measured at the factory prior to shipment of the AAS 100. These measured characteristics may be stored in a memory of the controller 150 or corresponding subunit and used for calibration.

Figure 7:
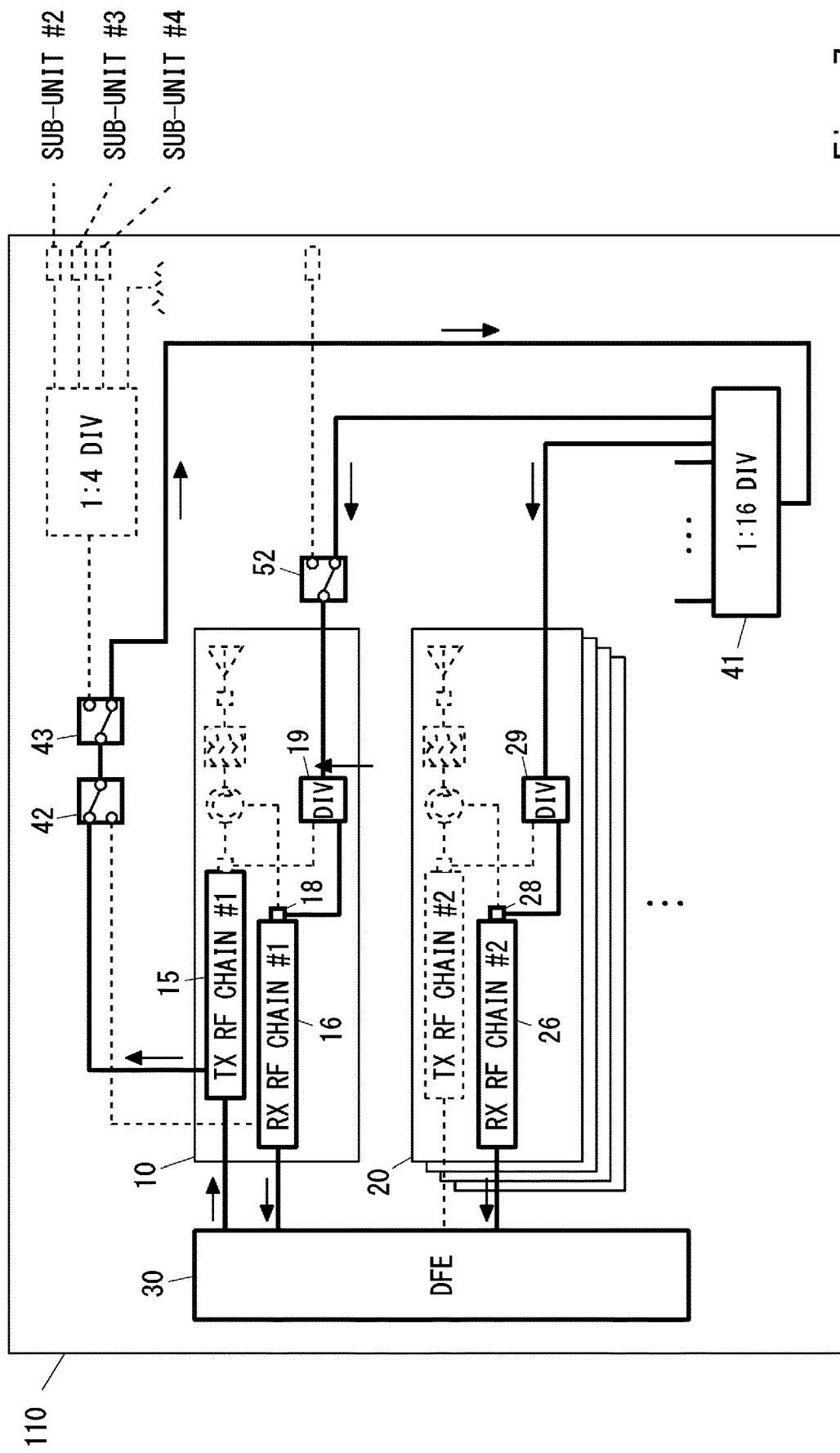
FIG. 7 shows an example of a signal path in an intra-subunit reception calibration of an active antenna system according to an example embodiment.

The path shown in FIG. 7 with bold lines indicates the signal path used during intra-subunit reception calibration of the first subunit 110. In this case, according to the control of the controller 150, a calibration signal is generated by the DFE 30, sent to the calibration path by the transmitter in the transmitter RF chain 15, and then received by the 16 receiver RF chains 16 and 26 via the 16-way divider network 41. The DFE 30 detects the received calibration signals. Based on the reception results of the calibration signals, the controller 150 calculates a correction factor (or offset or weight) to be applied to each receiver RF chain. The signal paths used during intra-subunit reception calibration of the other subunits 120, 130, and 140 are similar to that in FIG. 7. The correction factors may be referred to as calibration factors, calibration weights, or offsets. For example, the controller 150 may calculate the calibration weights in intra-subunit reception calibration in a manner similar to the transmission calibration case described in the first example embodiment with reference to Equation (1).

Figure 8:
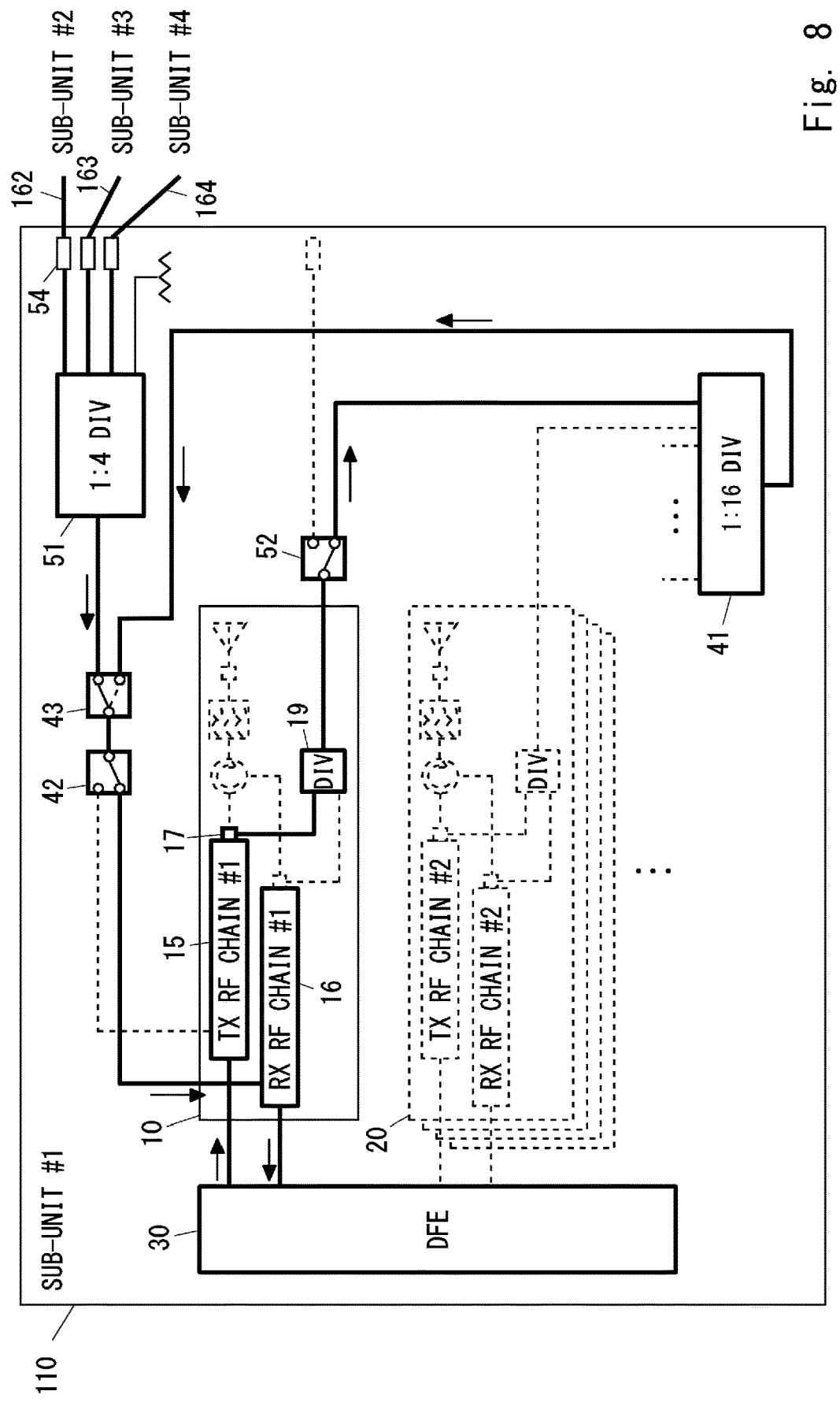
FIG. 8 is a flowchart showing an example of an inter-subunit transmission calibration procedure for an active antenna system according to an example embodiment.

The path shown in FIG. 8 with a bold line represents the signal path of the first subunit 110 used during inter-subunit transmission calibration. In this case, following the control of the controller 150, a calibration signal generated by the DFE 30 is sent to the transmitter RF chain 15 (i.e., the representative transmitter RF chain of the subunit 110) and received by the receiver of the receiver RF chain 16 via the 16-way divider network 41. In addition, the switch 43 is switched to select the 4-way divider network 51, and calibration signals transmitted from the representative transmitter RF chains of the second through fourth subunits 120, 130, and 140 are received by the receiver of the receiver RF chain 16 through the 4-way divider network 51. The DFE 30 detects the received calibration signals. Based on the reception results of the calibration signals, the controller 150 calculates correction factors (or offsets or weights) to remove (or compensate for or correct) mismatches in the amplitude and phase relationships among the four representative transmitter RF chains.

Figure 9:
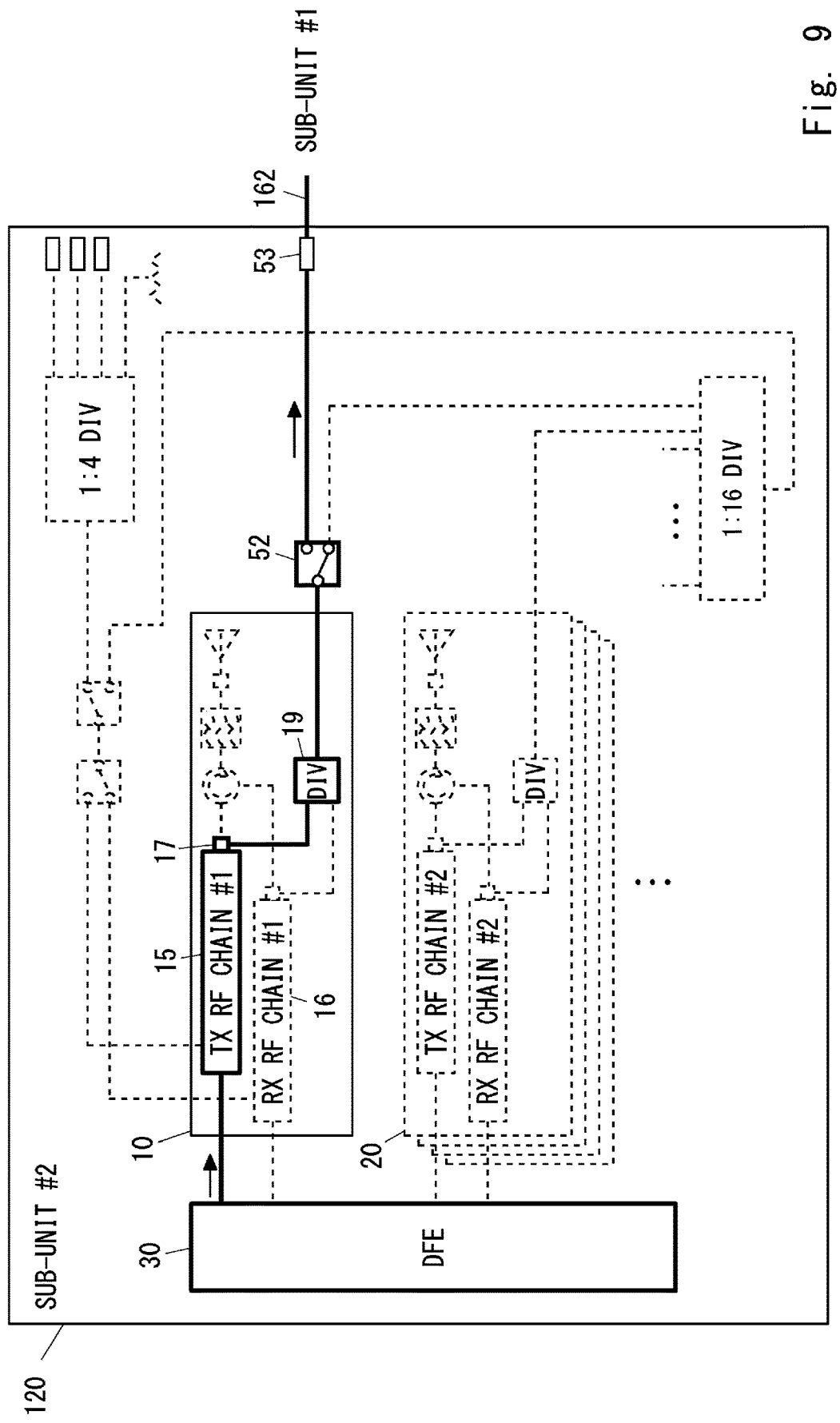
FIG. 9 is a flowchart showing an example of an inter-subunit transmission calibration procedure for an active antenna system according to an example embodiment.

The path shown in FIG. 9 with bold lines represents the signal path of the second subunit 120 used during inter-subunit transmission calibration. In this case, a calibration signal generated by the DFE 30 of the subunit 120 is sent to the transmitter RF chain 15 (i.e., the representative transmitter RF chain of the subunit 120) and output to the RF line 162, according to the control of the controller 150. The signal paths of the third and fourth subunits 130 and 140 used during inter-subunit transmission calibration are similar to that in FIG. 9.

The correction factors may be referred to as calibration factors, calibration weights, or offsets. For example, in inter-subunit transmission calibration, the controller 150 may calculate the calibration weights according to any of the specific examples described in the first example embodiment with reference to Equations (2) through (7). In addition, the controller 150 may calculate the total calibration weights according to any of the specific examples described in the first example embodiment with reference to Equations (8) through (9).

Figure 10:
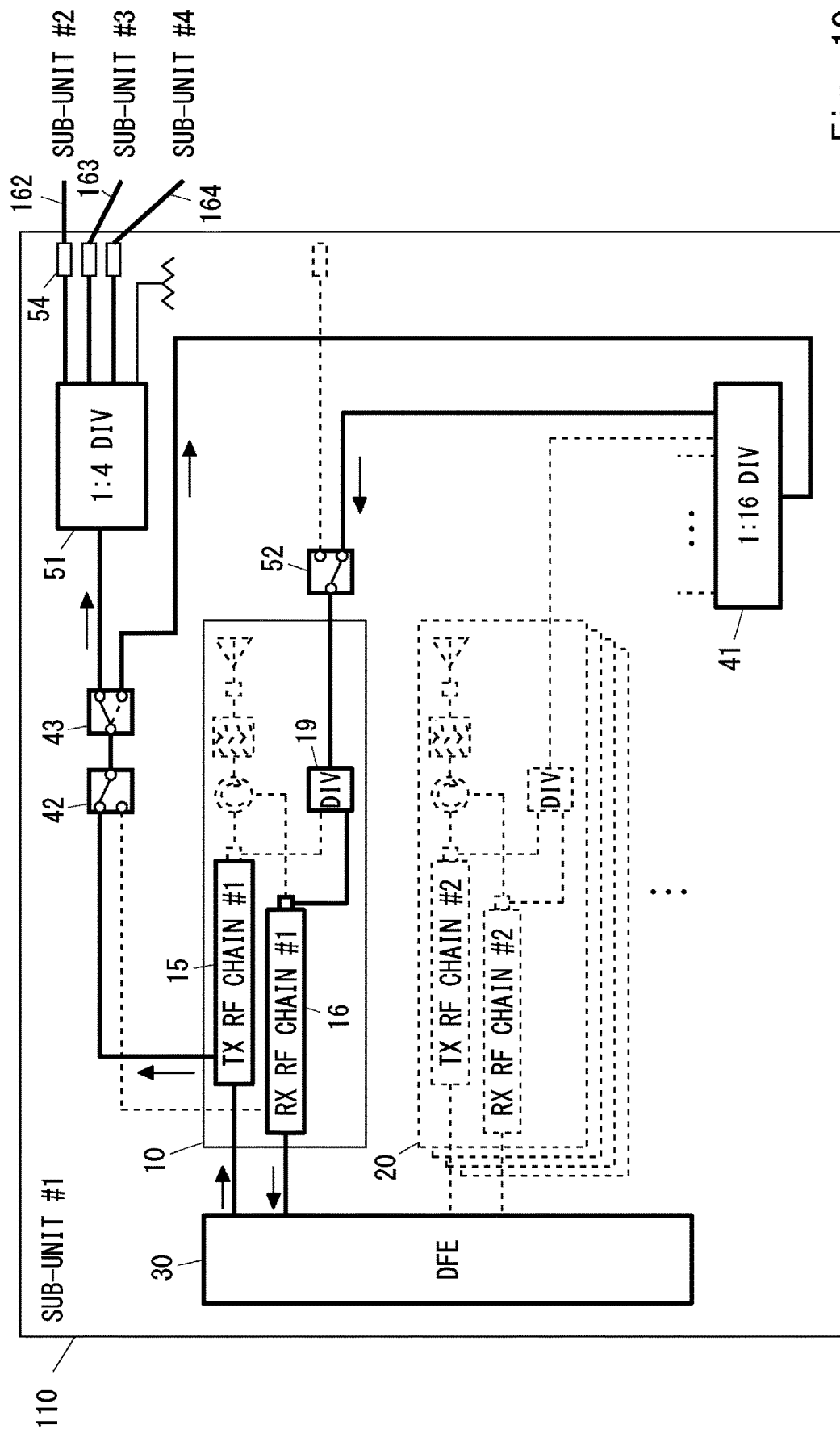
FIG. 10 is a flowchart showing an example of an inter-subunit reception calibration procedure for an active antenna system according to an example embodiment.

The path shown in FIG. 10 with bold lines represents the signal path of the first subunit 110 used during inter-subunit reception calibration. In this case, following the control of the controller 150, a calibration signal is generated by the DFE 30, sent to the path for calibration by the transmitter in the transmitter RF chain 15, and received by the receiver RF chain 16 (i.e., the representative receiver RF chain of the subunit 110) via the 16-way divider network 41. In addition, the switch 43 is switched to select the 4-way divider network 51, and the calibration signal is sent to the representative receiver RF chains of the second through fourth subunits 120, 130, and 140.

Figure 11:
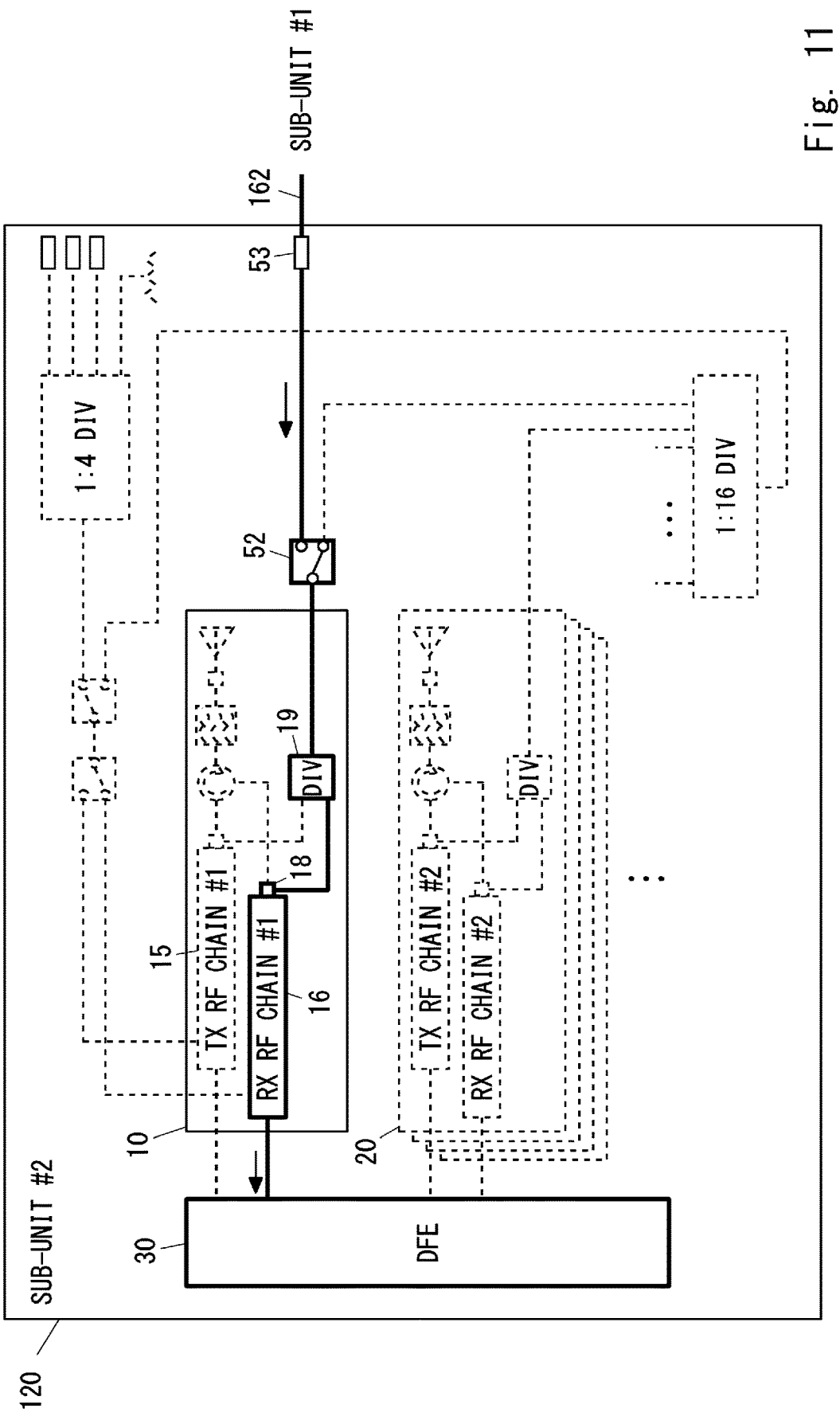
FIG. 11 is a flowchart showing an example of an inter-subunit reception calibration procedure for an active antenna system according to an example embodiment.

The path shown in FIG. 11 with bold lines indicates the signal path of the second subunit 120 used during inter-subunit reception calibration. In this case, the receiver RF chain 16 (i.e., the representative receiver RF chain of the subunit 120) receives the calibration signal from the first subunit 110, according to the control of the controller 150. The signal paths of the third and fourth subunits 130 and 140 used during inter-subunit reception calibration are similar to that in FIG. 11.

In the examples in FIG. 10 and FIG. 11, the DFE 30 of each subunit detects the received calibration signal. Based on the results of the calibration signal reception, the controller 150 calculates correction factors (or offsets or weights) to remove (or compensate for or correct) mismatches in the amplitude and phase relationships among the four representative receiver RF chains.

For example, the controller 150 may calculate the calibration weights in inter-subunit reception calibration in a manner similar to the case of transmission calibration described in the first example embodiment with reference to equations (2) through (7). The controller 150 may also calculate the total calibration weights in reception calibration in a manner similar to the transmission calibration case described in the first example embodiment with reference to equations (8) through (9).

As shown in FIG. 8, in the inter-subunit transmission calibration of this example embodiment, the calibration signal transmitted from the representative transmitter RF chain 15 of the first subunit 110 does not pass through a line outside the circuit board of the first subunit 110, but is input within that circuit board to the receiver of the receiver RF chain 16. Similarly, as shown in FIG. 10, in the inter-subunit reception calibration of this example embodiment, the transmission calibration signal sent from the transmitter in the transmitter RF chain 15 of the first subunit 110 is provided to the representative receiver RF chain 16 of the first subunit 110 within the circuit board of the first subunit 110, rather than through a line outside the circuit board of the first subunit 110.

Third Example Embodiment

Figure 12:
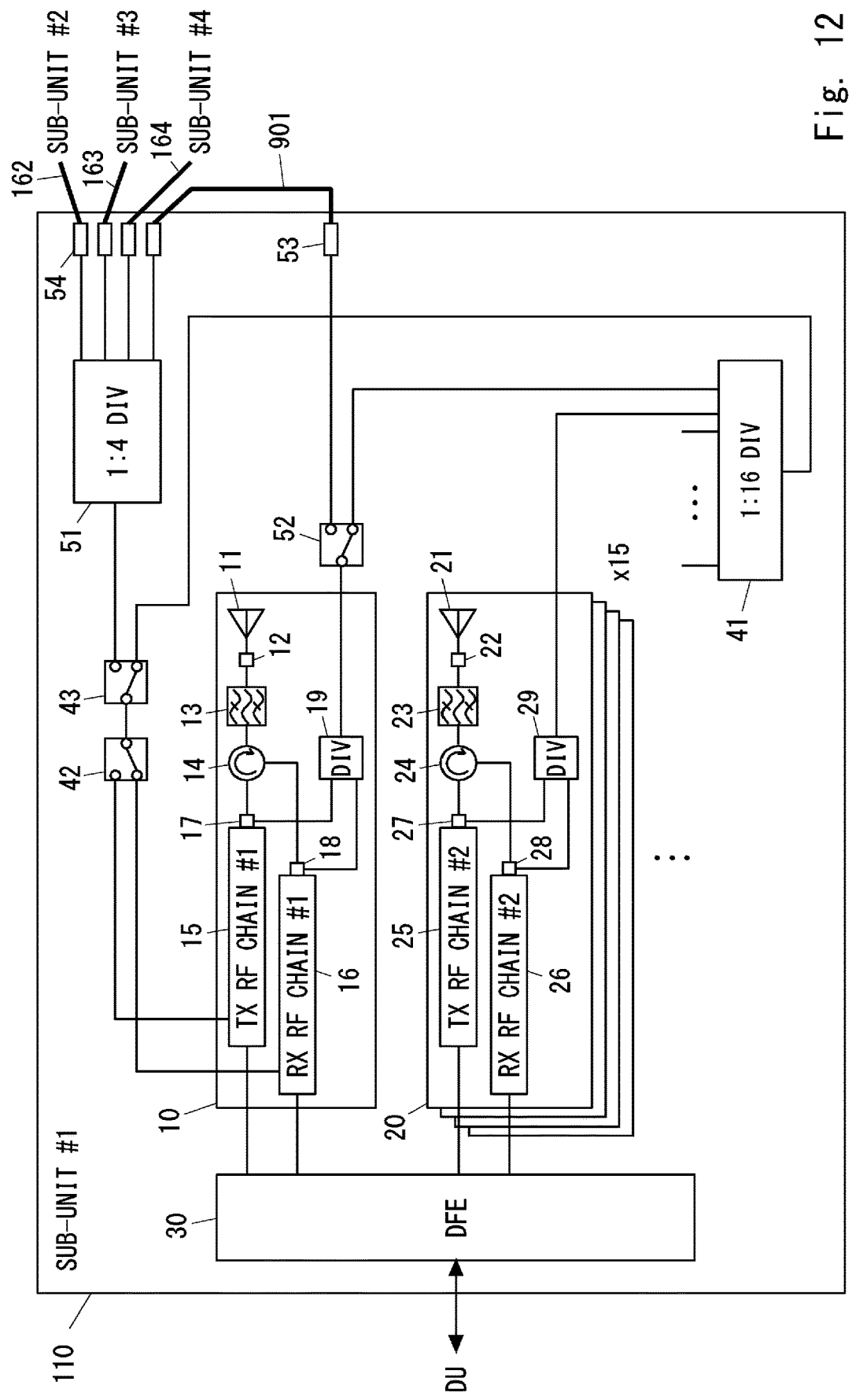
FIG. 12 shows a configuration example of a subunit in an active antenna system according to an example embodiment.
Figure 13:
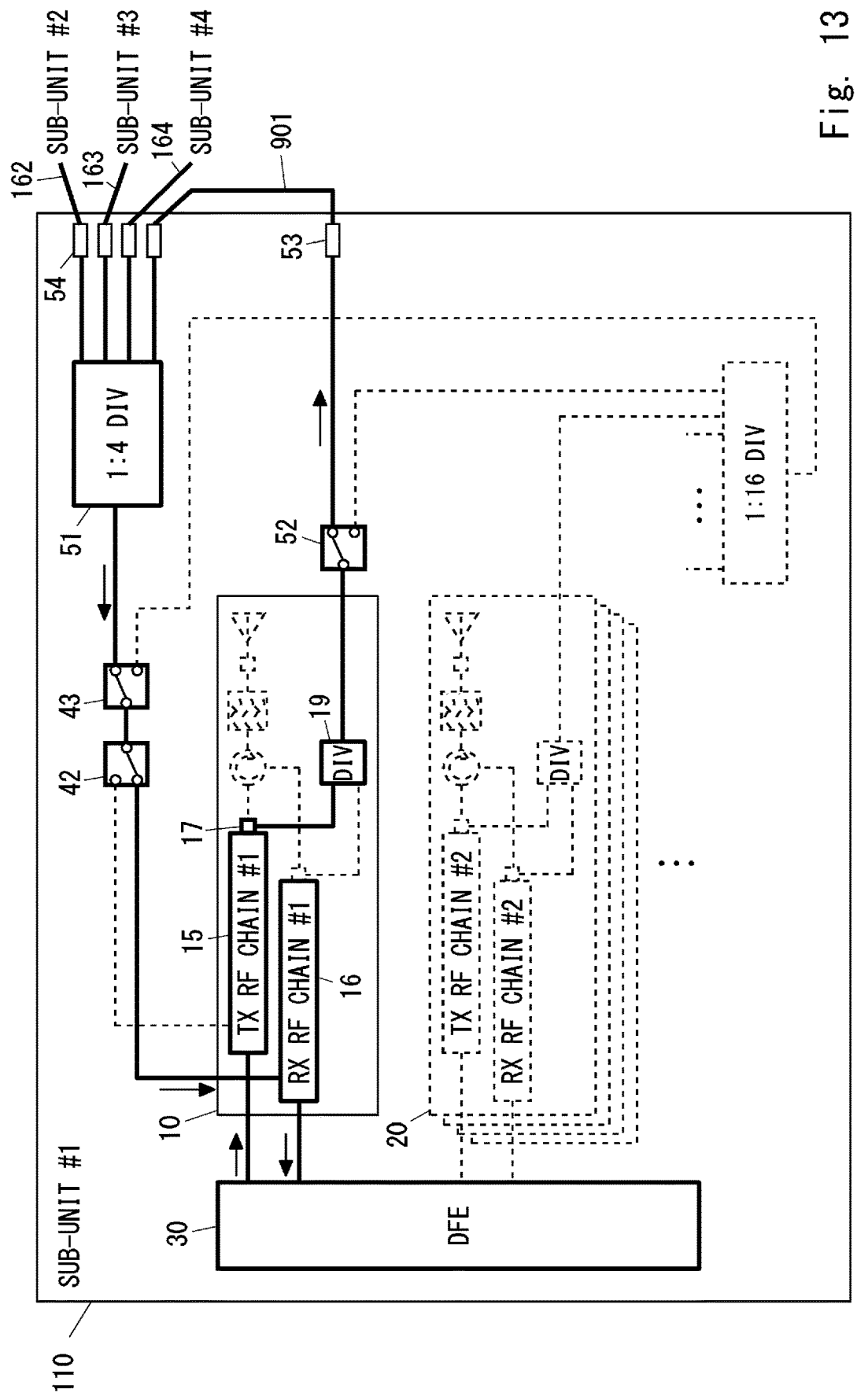
FIG. 13 is a flowchart showing an example of an inter-subunit transmission calibration procedure for an active antenna system according to an example embodiment.
Figure 14:
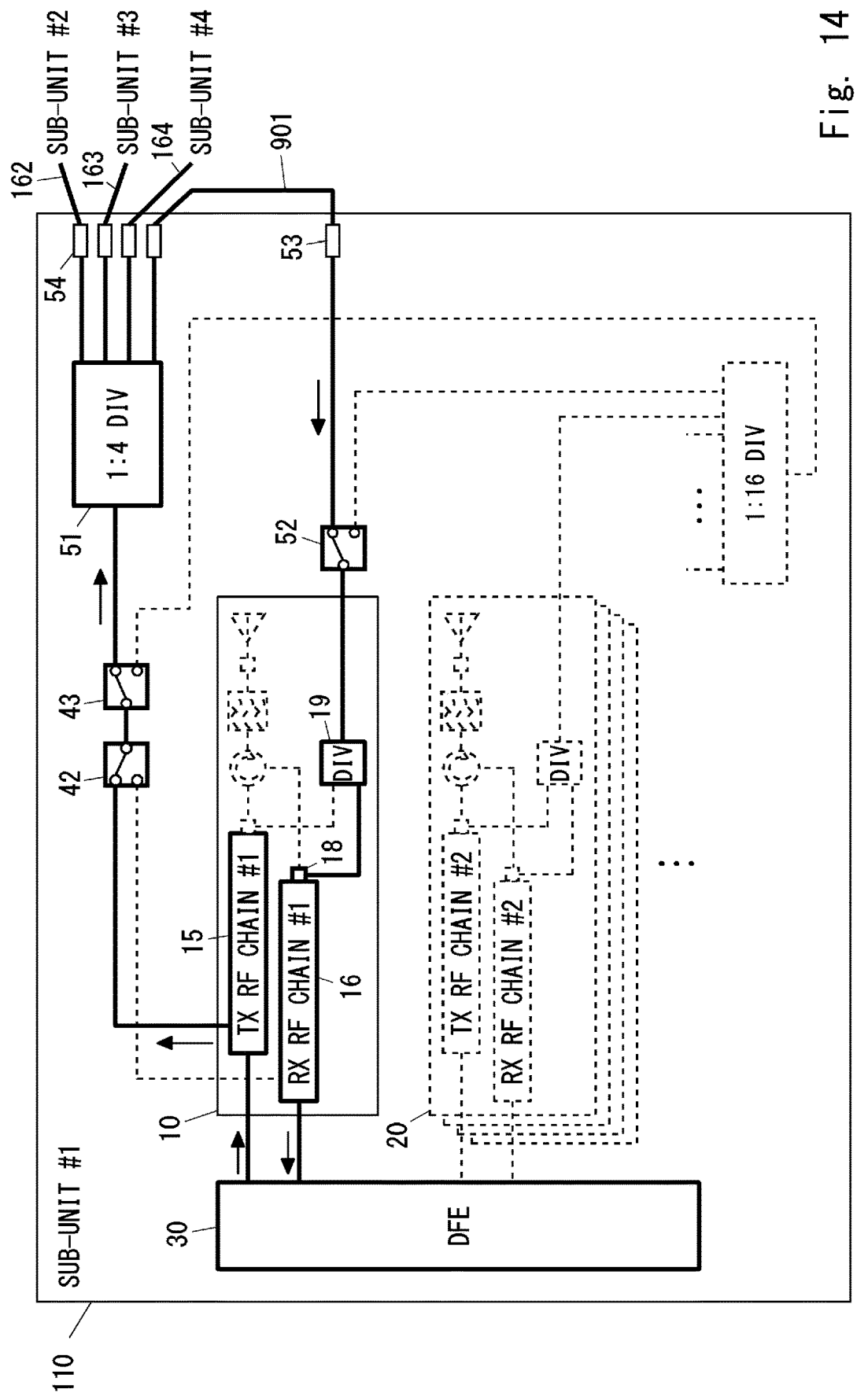
FIG. 14 is a flowchart showing an example of an inter-subunit reception calibration procedure for an active antenna system according to an example embodiment.

This example embodiment provides other specific examples of the configuration and calibration method of the AAS 100 described in the first embodiment. FIG. 12 shows an example configuration of the first subunit 110. The configuration shown in FIG. 12 is identical to that shown in FIG. 3. However, in the example in FIG. 12, an RF line 901 is provided. This allows, as shown in FIG. 13, during inter-subunit transmission calibration, the calibration signal transmitted from the representative transmitter RF chain 15 of the first subunit 110 is output to the line 901 outside the circuit board of the first subunit 110 and then folded back inside that circuit board and input to the receiver in receiver RF chain 16. Similarly, as shown in FIG. 14, during inter-subunit reception calibration, the calibration signal transmitted from the transmitter in the transmitter RF chain 15 of the first subunit 110 is sent out on the line 901 outside the circuit board of the first subunit 110 and then folded back into that circuit board and fed to the representative receiver RF chain 16 of the first subunit 110.

Fourth Example Embodiment

Figure 15:
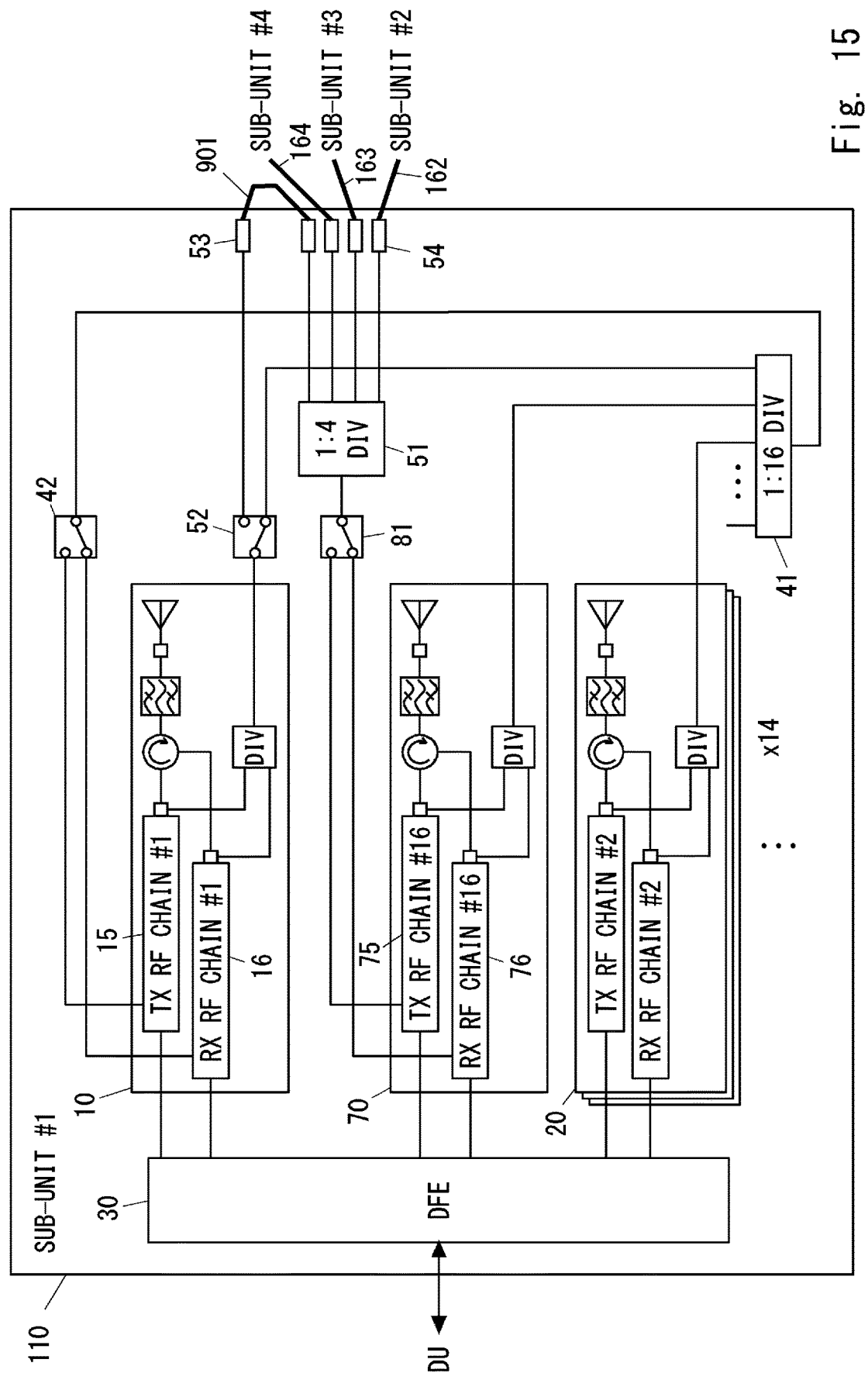
FIG. 15 shows a configuration example of a subunit in an active antenna system according to an example embodiment.
Figure 16:
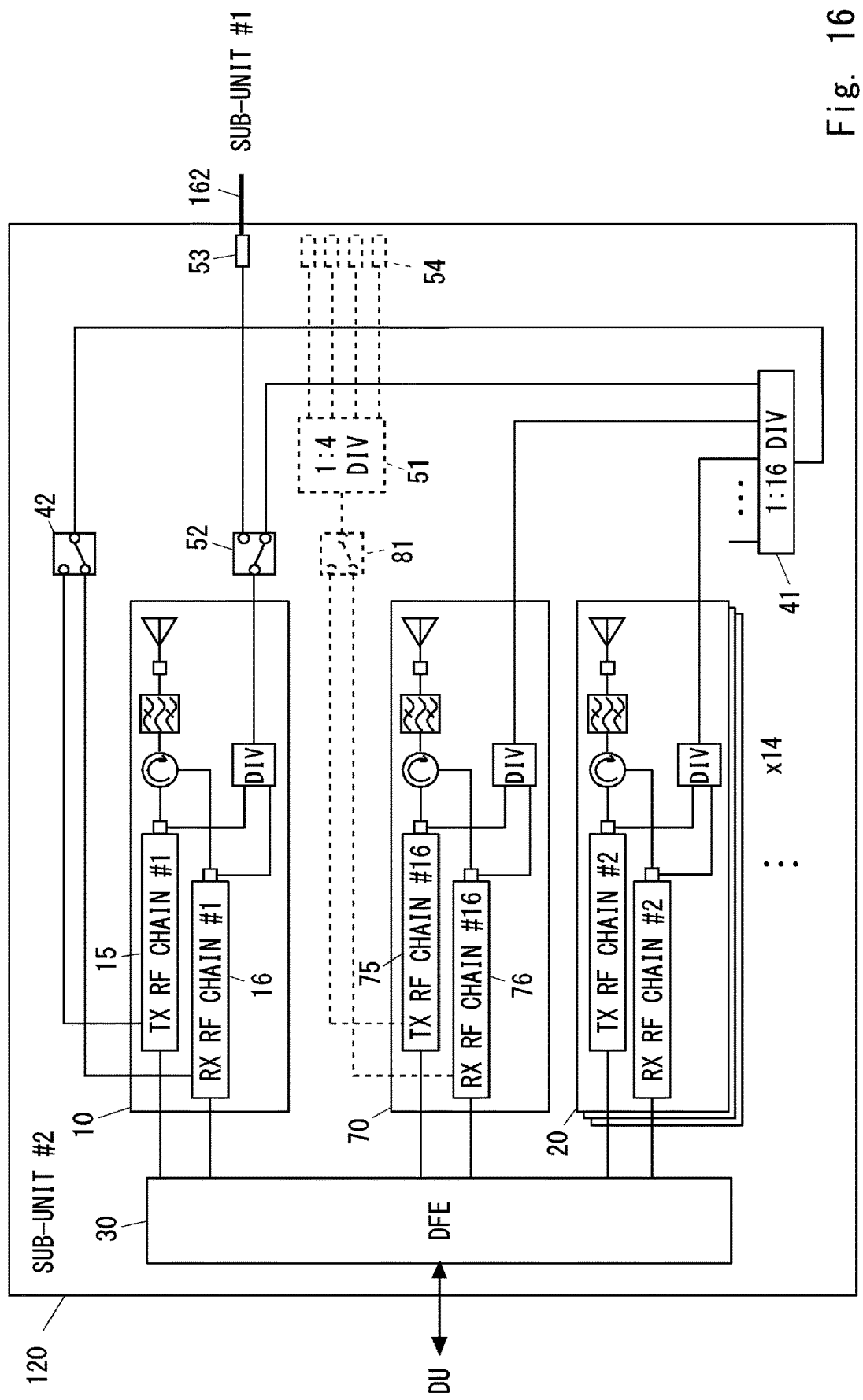
FIG. 16 shows a configuration example of a subunit in an active antenna system according to an example embodiment.

This example embodiment provides yet another specific example of the configuration and calibration method of the AAS 100 described in the first embodiment. FIG. 15 shows an example configuration of the first subunit 110 and FIG. 16 shows an example configuration of the second subunit 120. If the AAS 100 has three or more subunits, the configuration of the third and subsequent subunits (e.g., subunits 130 and 140) may be identical to that of the second subunit 120. As shown in FIGS. 15 and 16, all the subunits may have the same configuration, only the connection relationship to the RF lines 162-164 may be different.

Comparing FIG. 15 with FIG. 12, FIG. 15 differs from FIG. 12 in that the 4-way divider network 51 for inter-subunit calibration is connected via a switch 81 to a different transceiver RF chain 70 than the transceiver RF chain 10. The configuration of the transceiver RF chain 70 may be identical to the configuration of the transceiver RF chain 10. The configuration of the transceiver RF chains 10 and 70 shown in FIG. 15 may be identical to the configuration of the transceiver RF chain 10 described with reference to FIGS. 3, 5A, and 5B.

Referring to FIG. 16, the subunit 120 has the same configuration as the subunit 110 shown in FIG. 15. However, for inter-subunit transmission calibration and reception calibration, the transceiver RF chain 10 can be connected to the RF line 162 via the switch 52. The subunit 120 does not necessarily require the switch 81, 4-way divider network 51, and multiple RF connectors 54, and thus these may be omitted.

Figure 17:
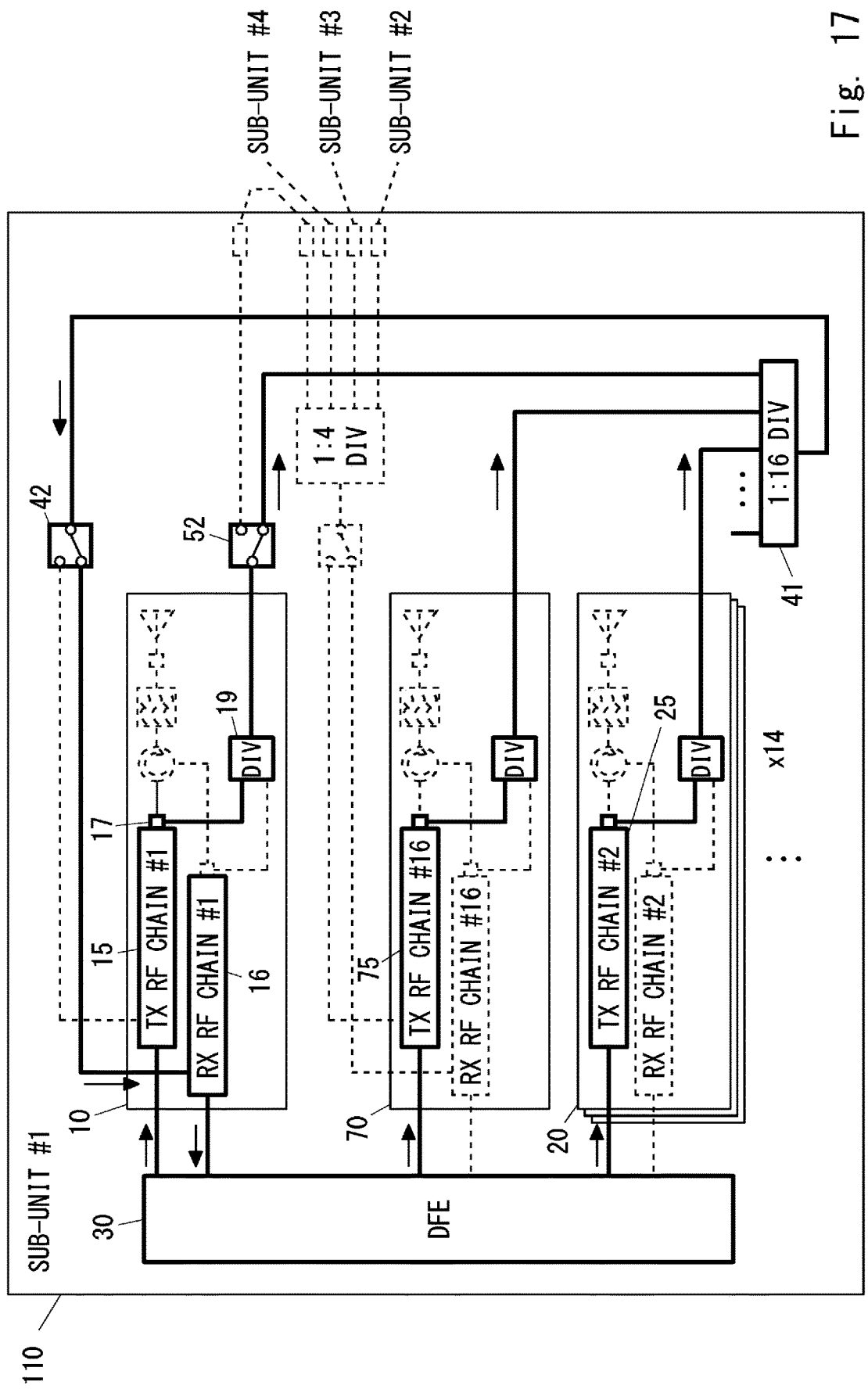
FIG. 17 shows an example of a signal path in an intra-subunit transmission calibration of an active antenna system according to an example embodiment.

The following paragraphs describe the calibration in the configuration of the subunits 110, 120, 130, and 140 described in FIGS. 15 and 16. The path shown in FIG. 17 with bold lines represents the signal path used during intra-subunit transmission calibration of the first subunit 110. The signal path shown in FIG. 17 is identical to that shown in FIG. 6. Specifically, following the control of the controller 150, a calibration signal generated by the DFE 30 is sent to the 16 transmitter RF chains 15, 25 and 75 and received by the receiver in the receiver RF chain 16 through the 16-way divider network 41. The DFE 30 detects the received calibration signals. Based on the reception results of the calibration signals, the controller 150 calculates a correction factor (or offset or weight) to be applied to each transmitter RF chain. The signal paths used during intra-subunit transmission calibration of the other subunits 120, 130, and 140 are similar to that in FIG. 17.

The correction factors may be referred to as calibration coefficients, calibration weights, or offsets. For example, in intra-subunit transmission calibration, the controller 150 may calculate the calibration weights according to the specific example described in the first example embodiment with reference to Equation (1).

Figure 18:
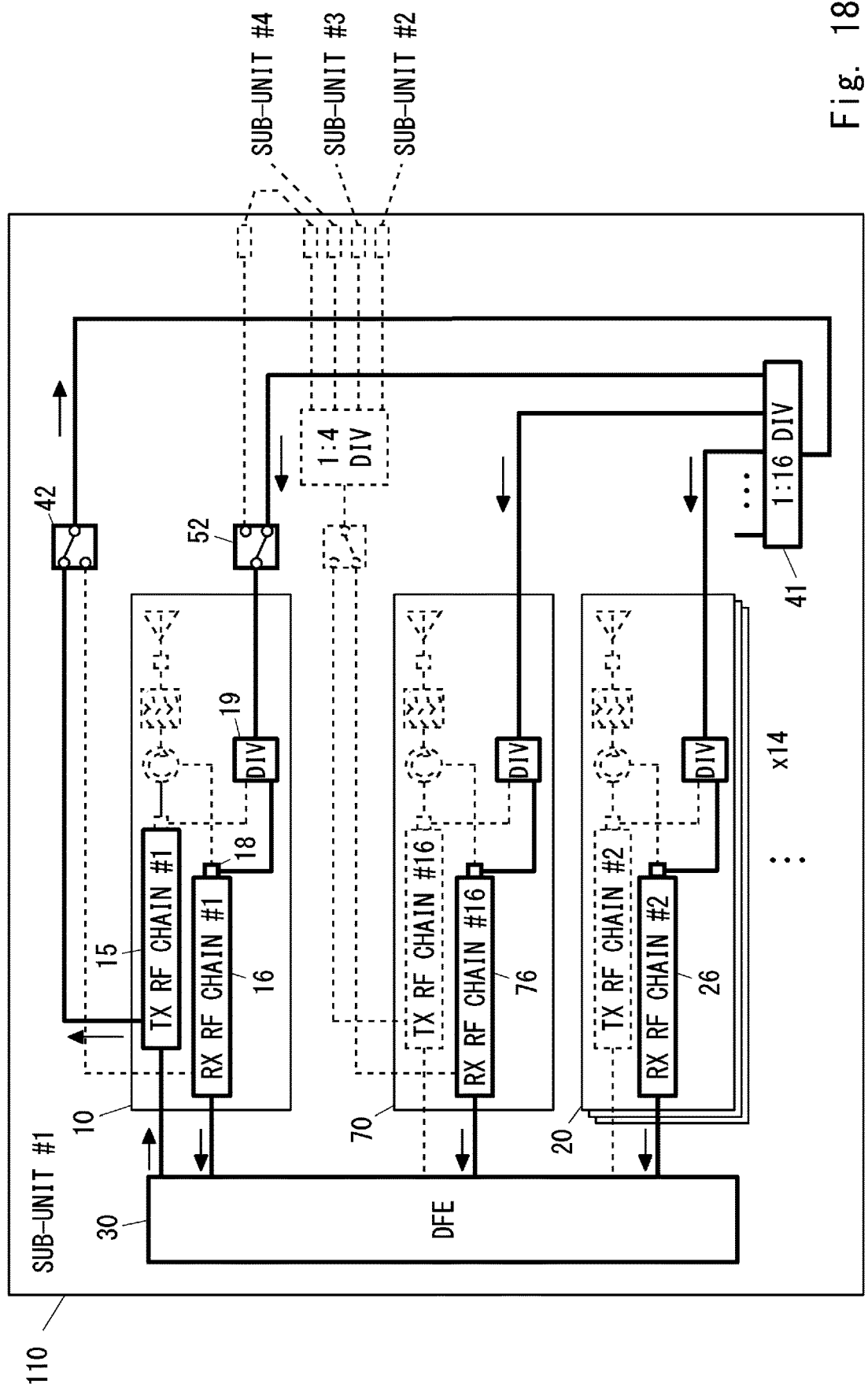
FIG. 18 shows an example of a signal path in an intra-subunit reception calibration of an active antenna system according to an example embodiment.

The path shown in FIG. 18 with bold lines represents the signal path used during intra-subunit reception calibration of the first subunit 110. The signal path shown in FIG. 18 is identical to that shown in FIG. 7. Specifically, according to the control of the controller 150, a calibration signal is generated by the DFE 30, sent to the calibration path by the transmitter in the transmitter RF chain 15, and then received by the 16 receiver RF chains 16, 26 and 76 via the 16-way divider network 41. The DFE 30 detects the received calibration signals. Based on the reception results of the calibration signals, the controller 150 calculates a correction factor (or offset or weight) to be applied to each receiver RF chain. The signal paths used during intra-subunit reception calibration of the other subunits 120, 130, and 140 are similar to that in FIG. 18.

The correction factors may be referred to as calibration factors, calibration weights, or offsets. For example, the controller 150 may calculate the calibration weights in intra-subunit reception calibration in a manner similar to the transmission calibration case described in the first example embodiment with reference to Equation (1).

Figure 19:
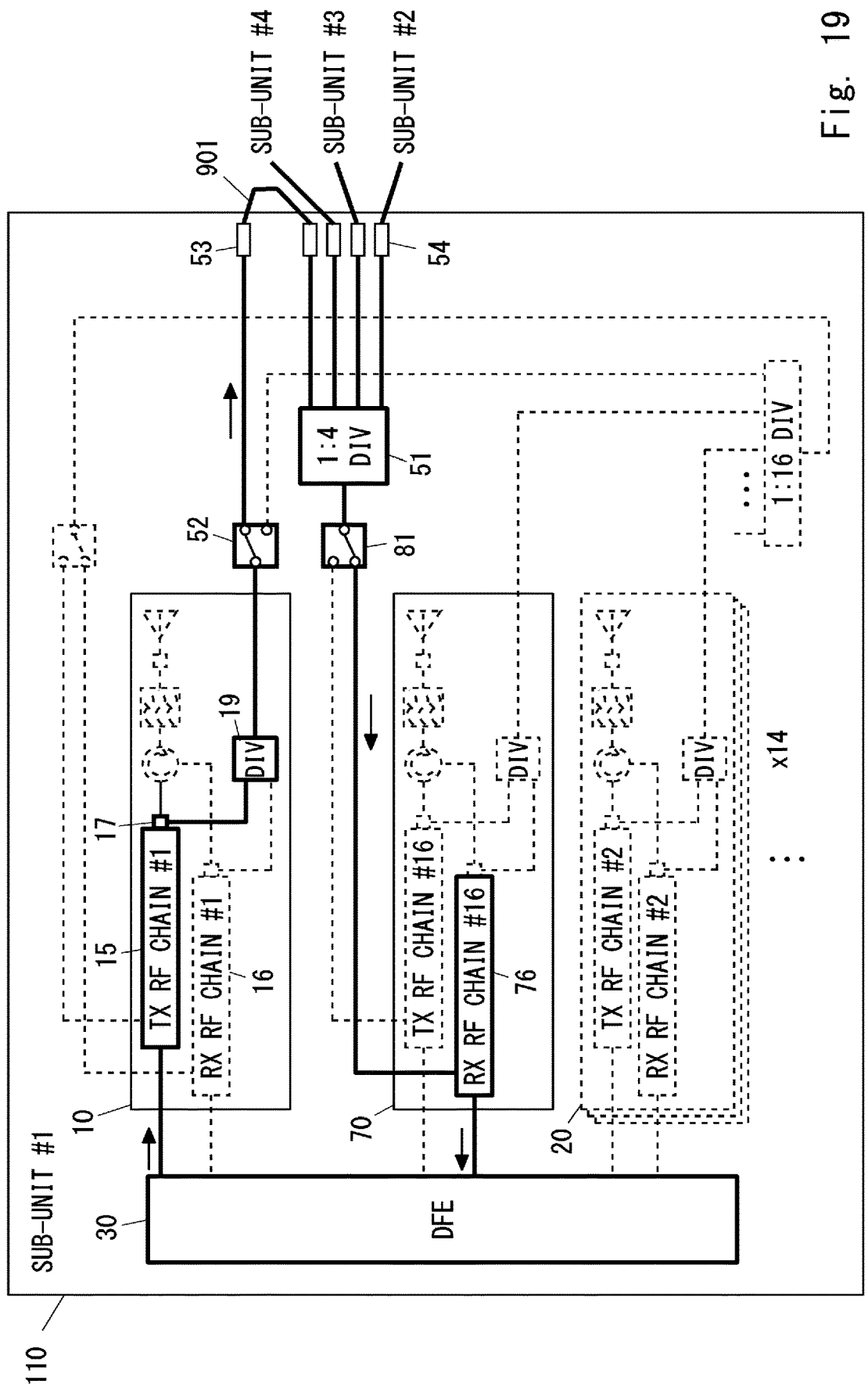
FIG. 19 shows an example of a signal path in an inter-subunit transmission calibration of an active antenna system according to an example embodiment.

The path shown in FIG. 19 with bold lines represents the signal path of the first subunit 110 used during inter-subunit transmission calibration. The signal path shown in FIG. 19 is basically identical to that shown in FIG. 13. The calibration signal transmitted from the representative transmitter RF chain 15 of the first subunit 110 is sent out to the line 901 outside the circuit board of the first subunit 110 and then folded back into that circuit board. FIG. 19 differs from FIG. 13, however, in that the folded calibration signal is input to the receiver in the receiver RF chain 76 instead of the receiver in the receiver RF chain 16. Similarly, the calibration signals from the representative transmitter RF chains of the second through fourth subunits 120, 130, and 140 are also input to the receiver of the receiver RF chain 76 via the 4-way divider network 51. The DFE 30 detects the received calibration signals. Based on the reception results of the calibration signals, the controller 150 calculates correction factors (or offsets or weights) to remove (or compensate for or correct) mismatches in amplitude and phase relationships among the four representative transmitter RF chains.

Figure 20:
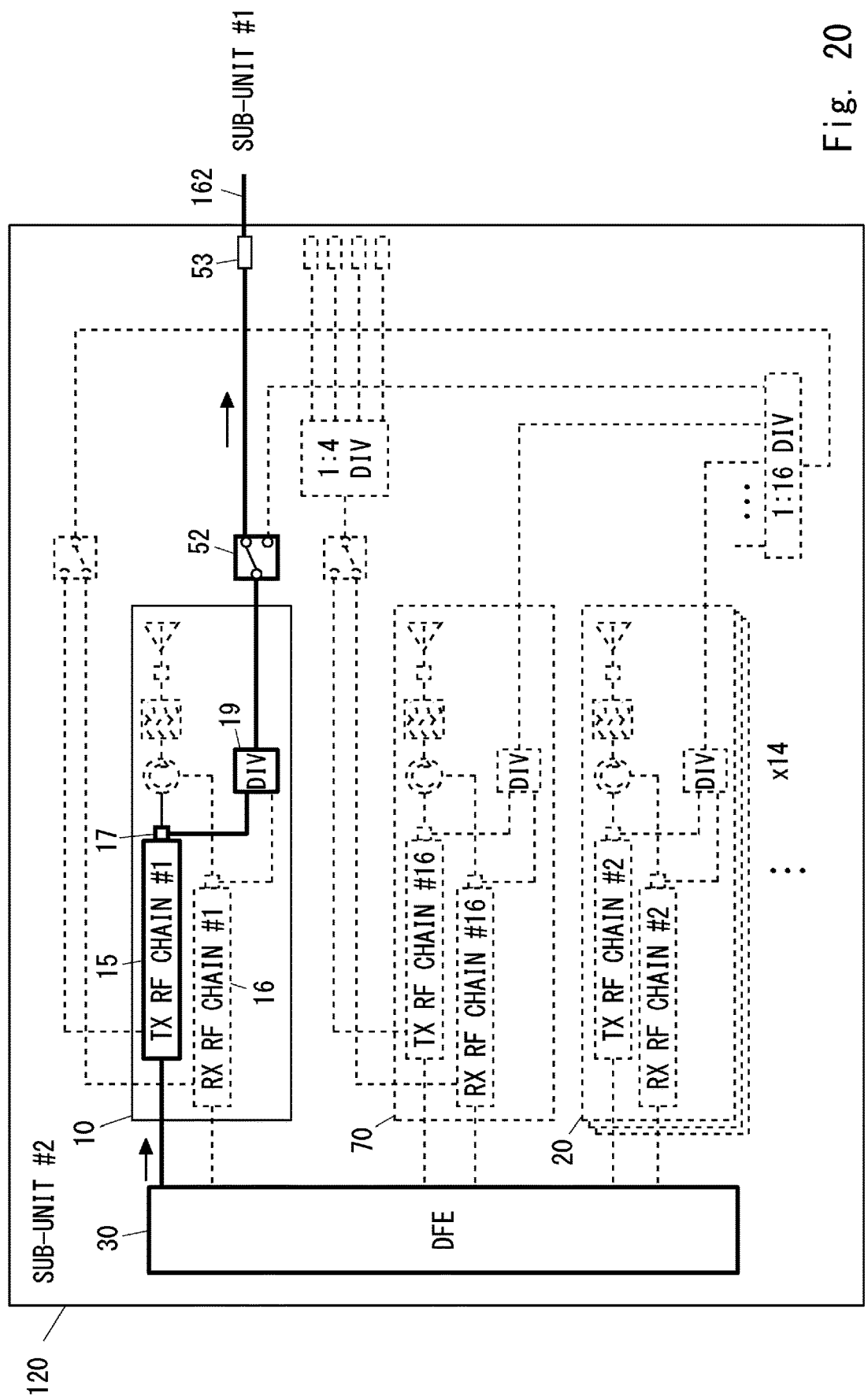
FIG. 20 shows an example of a signal path in an inter-subunit transmission calibration of an active antenna system according to an example embodiment.

The path shown in FIG. 20 with bold lines represents the signal path of the second subunit 120 used during inter-subunit transmission calibration. The signal path shown in FIG. 20 is identical to that shown in FIG. 9. Specifically, a calibration signal generated by the DFE 30 of the subunit 120 is sent to the transmitter RF chain 15 (i.e., the representative transmitter RF chain of the subunit 120) and output to the RF line 162, according to the control of the controller 150. The signal paths of the third and fourth subunits 130 and 140 used during inter-subunit transmission calibration are similar to that in FIG. 20.

The correction factors may be referred to as calibration factors, calibration weights, or offsets. For example, in inter-subunit transmission calibration, the controller 150 may calculate the calibration weights according to any of the specific examples described in the first example embodiment with reference to Equations (2) through (7). In addition, the controller 150 may calculate the total calibration weights according to any of the specific examples described in the first example embodiment with reference to Equations (8) through (9).

Figure 21:
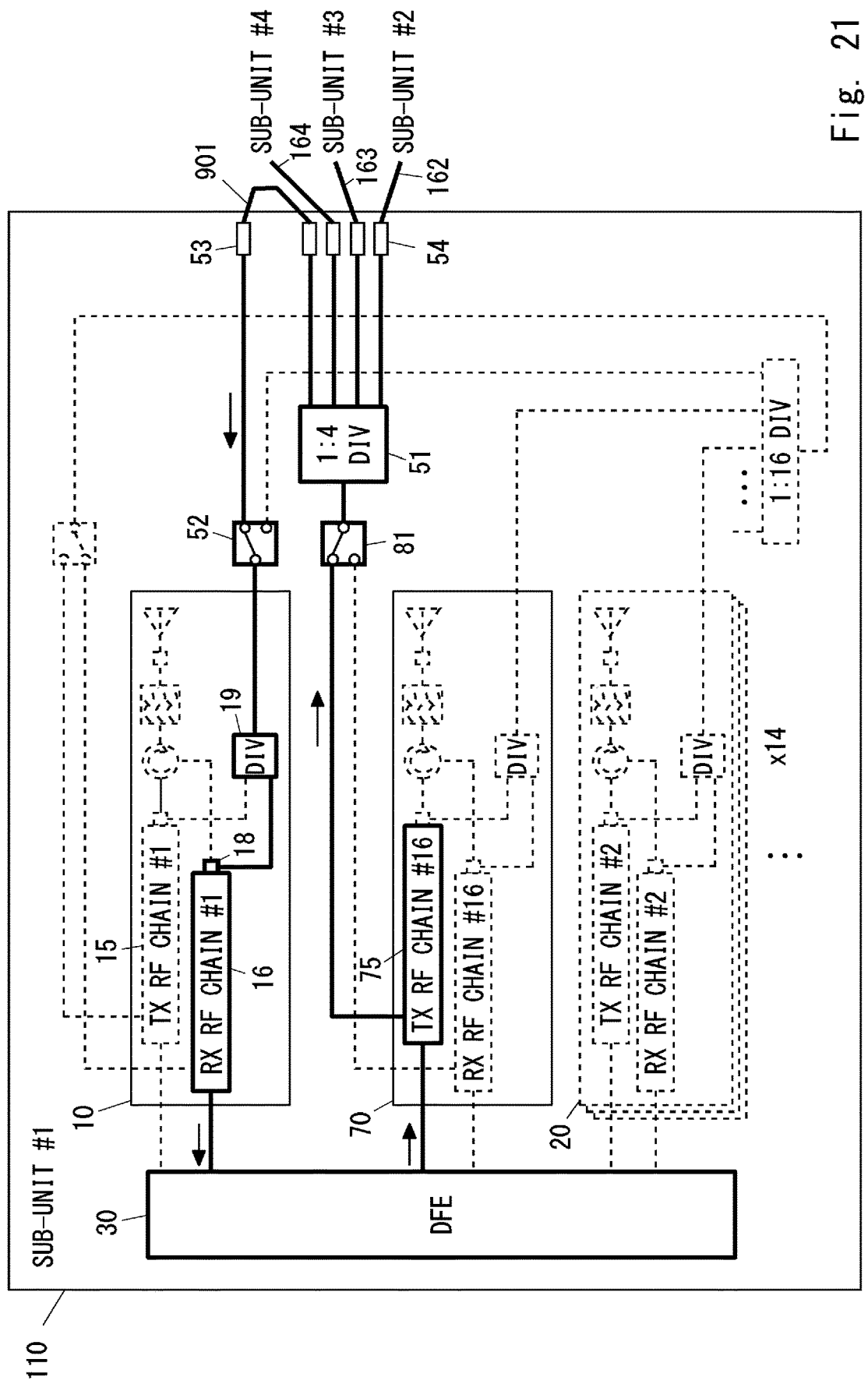
FIG. 21 shows an example of a signal path in an inter-subunit reception calibration of an active antenna system according to an example embodiment.

The path shown in FIG. 21 with bold lines represents the signal path of the first subunit 110 used during inter-subunit reception calibration. The signal path shown in FIG. 21 is basically identical to that shown in FIG. 14. FIG. 21 differs from FIG. 14, however, in that the transmitter in the transmitter RF chain 75, not the transmitter RF chain 15, transmits a calibration signal. The calibration signal transmitted by the transmitter in the transmitter RF chain 75 is sent out to the line 901 outside the circuit board of the first subunit 110 and then folded back into that circuit board and fed to the representative receiver RF chain 16 of the first subunit 110. In addition, this calibration signal is supplied via the RF lines 162-164 to the representative receiver RF chains of the second through fourth subunits 120, 130, and 140.

Figure 22:
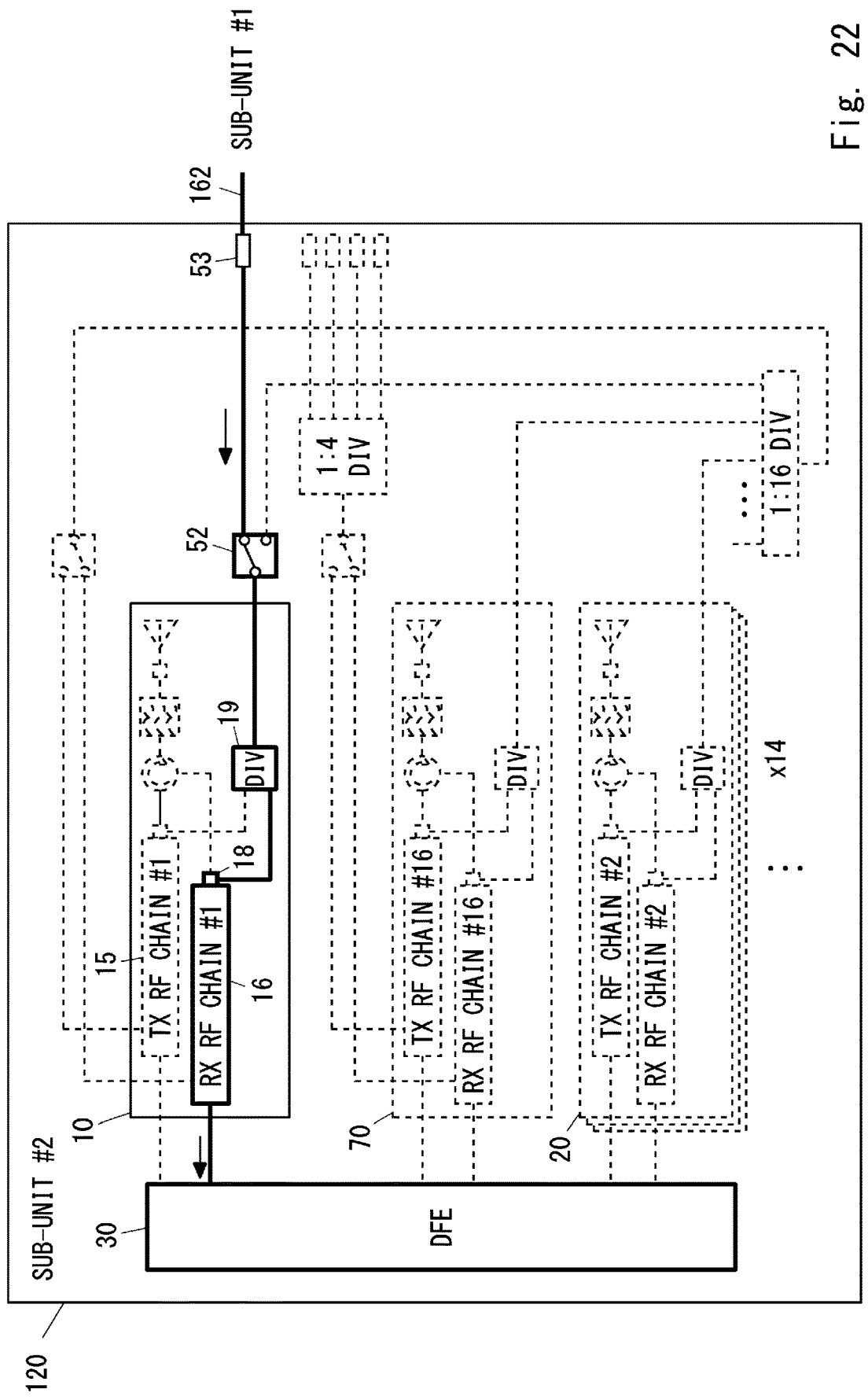
FIG. 22 shows an example of a signal path in an inter-subunit reception calibration of an active antenna system according to an example embodiment.

The path shown in FIG. 22 with bold lines represents the signal path of the second subunit 120 used during inter-subunit reception calibration. The signal path shown in FIG. 22 is identical to that shown in FIG. 11. Specifically, the receiver RF chain 16 (i.e., the representative receiver RF chain of the subunit 120) receives the calibration signal from the first subunit 110, according to the control of the controller 150. The signal paths of the third and fourth subunits 130 and 140 used during inter-subunit reception calibration are similar to that in FIG. 11.

In the examples in FIG. 21 and FIG. 22, the DFE 30 of each subunit detects the received calibration signal. Based on the results of the calibration signal reception, the controller 150 calculates correction factors (or offsets or weights) to remove (or compensate for or correct) mismatches in the amplitude and phase relationships among the four representative receiver RF chains.

For example, the controller 150 may calculate the calibration weights in inter-subunit reception calibration in a manner similar to the case of transmission calibration described in the first example embodiment with reference to equations (2) through (7). The controller 150 may also calculate the total calibration weights in reception calibration in a manner similar to the transmission calibration case described in the first example embodiment with reference to equations (8) through (9).

In this example embodiment, the receiver used for calibration signal reception (e.g., the receiver in the receiver RF chain 16) in the intra-subunit transmission calibration of the subunit 110 is different from the receiver used for calibration signal reception (e.g., the receiver in the receiver RF chain 76) in the inter-subunit transmission calibration. Similarly, the transmitter used for calibration signal transmission (e.g., the transmitter in the transmitter RF chain 15) in the intra-subunit reception calibration of the subunit 110 is different from the transmitter used for calibration signal transmission (e.g., the transmitter in the transmitter RF chain 75) in the inter-subunit reception calibration.

Fifth Example Embodiment

This example embodiment provides for fallback operation when an amplifier in a transceiver RF chain has failed or is unavailable. The example configuration of the AAS 100 in this example embodiment may be the same as that described in any of the first four embodiments.

If an amplifier (e.g., driver amplifier 505 or HPA 506 in FIG. 5A) in the reference transmitter RF chain 15 of the in-subunit transmission calibration has failed, the controller 150 uses one of the other transmitter RF chains 25 in that subunit as an alternative reference transmitter RF chain. The controller 150 continues to use the receiver in the receiver RF chain 16 associated with the transmitter RF chain 15, in which its amplifier has failed, to receive calibration signals from all of the other transmitter RF chains 25 in the intra-subunit transmission calibration.

Figure 23:
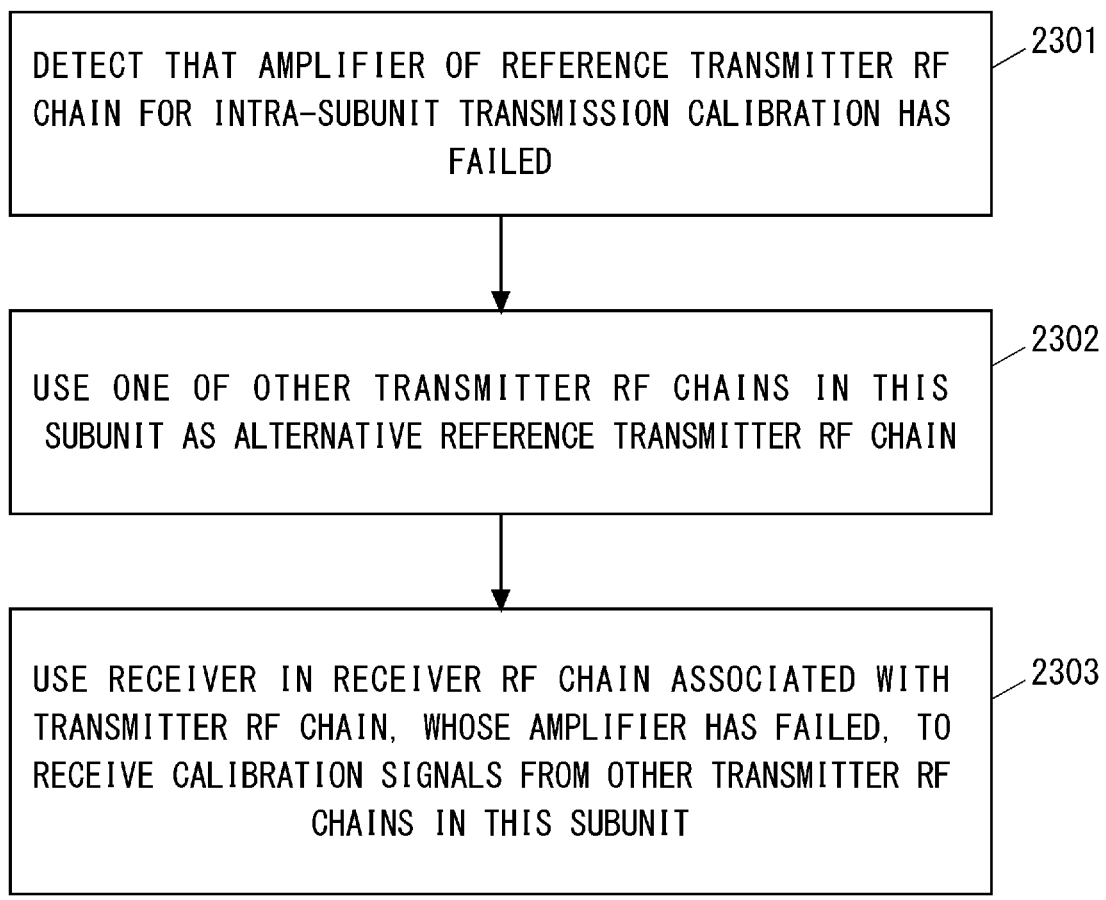
FIG. 23 is a flowchart showing an example of an intra-subunit transmission calibration procedure for an active antenna system according to an example embodiment.

FIG. 23 illustrates adjustments made by the controller 150 when an amplifier in the reference transmitter RF chain 15 of intra-subunit transmission calibration has failed. In step 2301, the controller 150 detects that an amplifier of the reference transmitter RF chain 15 for the intra-subunit transmission calibration has failed. For example, the controller 15 may detect that the reception level at the receiver (e.g., the receiver of the receiver RF chain 16) that receives calibration signals in the intra-subunit transmission calibration is below a certain level, thereby detecting a transmission amplifier failure, i.e., a failure or anomaly of that transmission system. In step 2302, the controller 150 uses one of the other transmitter RF chains 25 in the subunit as an alternative reference transmitter RF chain. In step 2303, the controller 150 uses the receiver in the receiver RF chain 16 associated with the transmitter RF chain 15, in which its amplifier has failed, to receive calibration signals from the other transmitter RF chains 25 in that subunit.

If an amplifier (e.g., LNA 525 in FIG. 5A) in the reference receiver RF chain 16 of the intra-subunit reception calibration has failed, then the controller 150 uses one of the other receiver RF chains 26 in that subunit as an alternative reference receiver RF chain. The controller 150 continues to use the transmitter in the transmitter RF chain 15 associated with the receiver RF chain 16, in which its amplifier has failed, to transmit a calibration signal to all of the other receiver RF chains 26 in the intra-subunit reception calibration.

Figure 24:
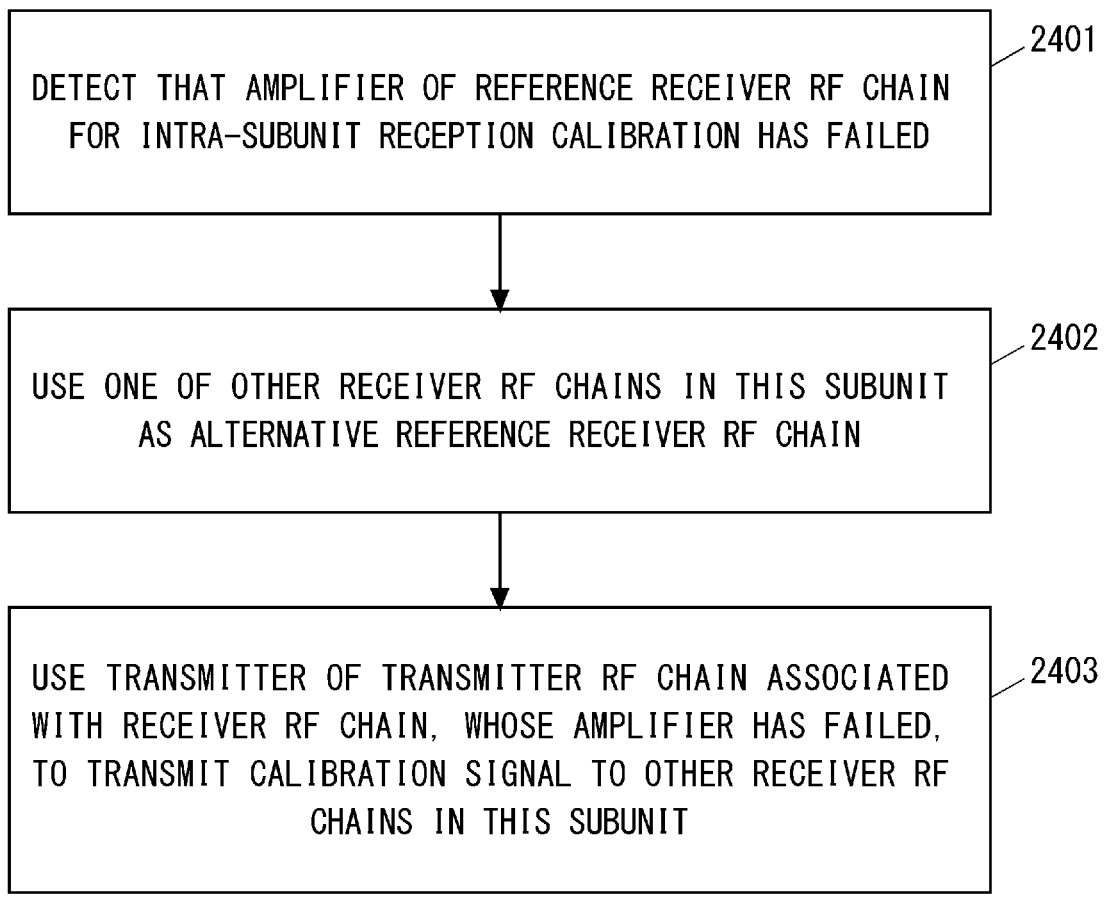
FIG. 24 is a flowchart showing an example of an intra-subunit reception calibration procedure for an active antenna system according to an example embodiment.

FIG. 24 shows adjustments made by the controller 150 in the event of a failure of an amplifier in the reference receiver RF chain 16 of intra-subunit reception calibration. In step 2401, the controller 150 detects that an amplifier in the reference receiver RF chain 16 for the intra-subunit reception calibration has failed. For example, the controller 15 may detect that the reception level at the receiver of the reference receiver RF chain 16 of a calibration signal in the intra-subunit reception calibration is below a certain level, thereby detecting a failure of the low-noise amplifier for reception, i.e., a failure or anomaly of that reception system. In step 2402, the controller 150 uses one of the other receiver RF chains 26 in the subunit as an alternative reference receiver RF chain. In step 2403, the controller 150 uses the transmitter of the transmitter RF chain 15 associated with the receiver RF chain 16, in which its amplifier has failed, to transmit a calibration signal to the other receiver RF chains 26 in that subunit.

If an amplifier in the representative transmitter RF chain 15 of the first subunit 110 for inter-subunit transmission calibration has failed, then the controller 150 uses one of the other transmitter RF chains 25 in that subunit 110 as an alternative representative transmitter RF chain. The controller 150 continues to use, in the inter-subunit transmission calibration, the receiver in the receiver RF chain 16 associated with the transmitter RF chain 15, in which its amplifier has failed, to receive calibration signals from the alternative representative transmitter RF chain and the representative transmitter RF chains of the other subunits.

Similarly, if an amplifier in the representative transmitter RF chain 15 of the second subunit 120 for inter-subunit transmission calibration has failed, then the controller 150 uses one of the other transmitter RF chains 25 in that subunit 120 as an alternative representative transmitter RF chain.

Figure 25:
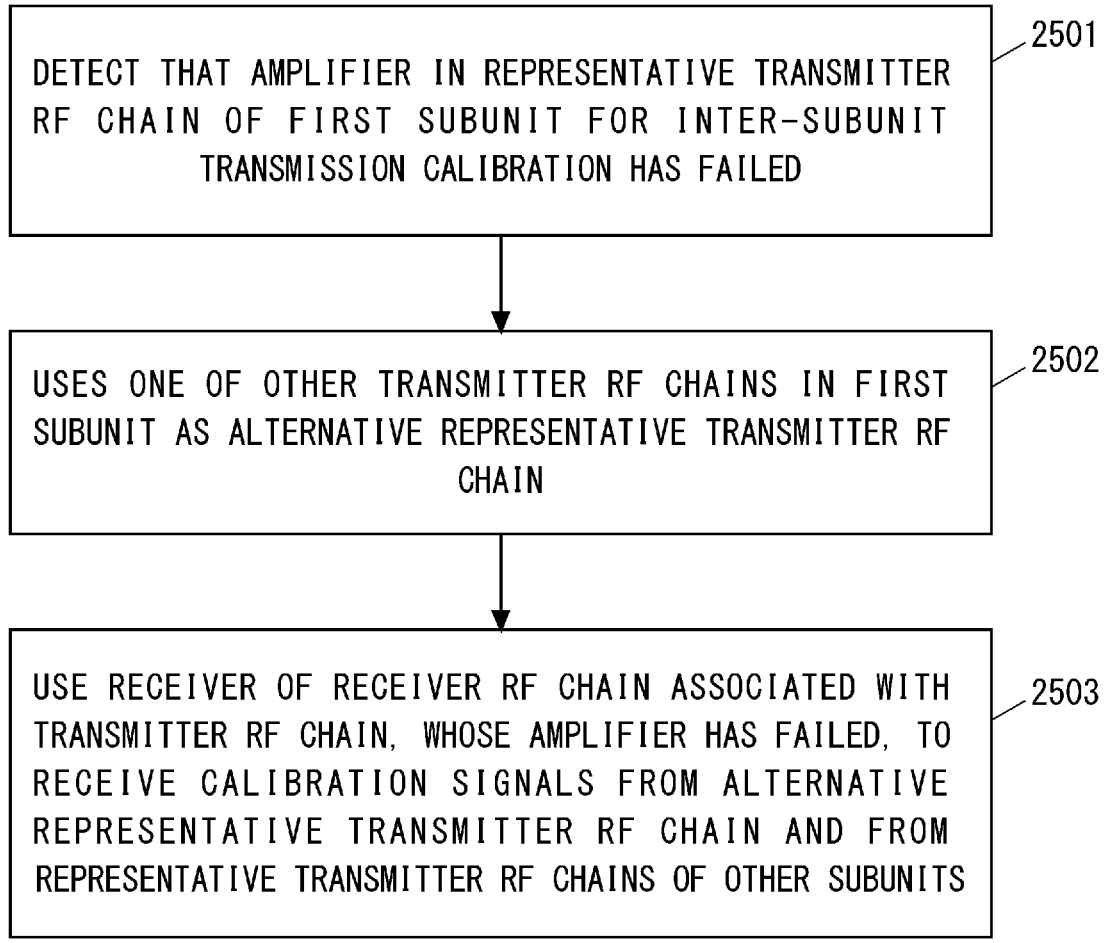
FIG. 25 is a flowchart showing an example of an inter-subunit transmission calibration procedure for an active antenna system according to an example embodiment.

FIG. 25 shows adjustments made by the controller 150 in the event of a failure of an amplifier in the representative transmitter RF chain 15 of inter-subunit transmission calibration. In step 2501, the controller 150 detects that an amplifier in the representative transmitter RF chain 15 of the first subunit 110 for the inter-subunit transmission calibration has failed. In step 2502, the controller 150 uses one of the other transmitter RF chains 25 in that subunit 110 as an alternative representative transmitter RF chain. In step 2503, the controller 150 uses the receiver of the receiver RF chain 16 associated with the transmitter RF chain 15, whose amplifier has failed, to receive calibration signals from the alternative representative transmitter RF chain and from the representative transmitter RF chains of the other subunits.

If an amplifier in the representative receiver RF chain 16 of the first subunit 110 for inter-subunit reception calibration has failed, then the controller 150 uses one of the other receiver RF chains 26 in that subunit 110 as an alternate representative receiver RF chain. The controller 150 continues to use, in inter-subunit reception calibration, the transmitter in the transmitter RF chain 15 associated with the receiver RF chain 16, whose amplifier has failed, to transmit a calibration signal to the alternative representative receiver RF chain and the representative receiver RF chains of the other subunits.

Similarly, if the amplifier in the representative receiver RF chain 16 of the second subunit 120 for inter-subunit reception calibration has failed, then the controller 150 uses one of the other receiver RF chains 26 in that subunit 120 as an alternative representative receiver RF chain.

Figure 26:
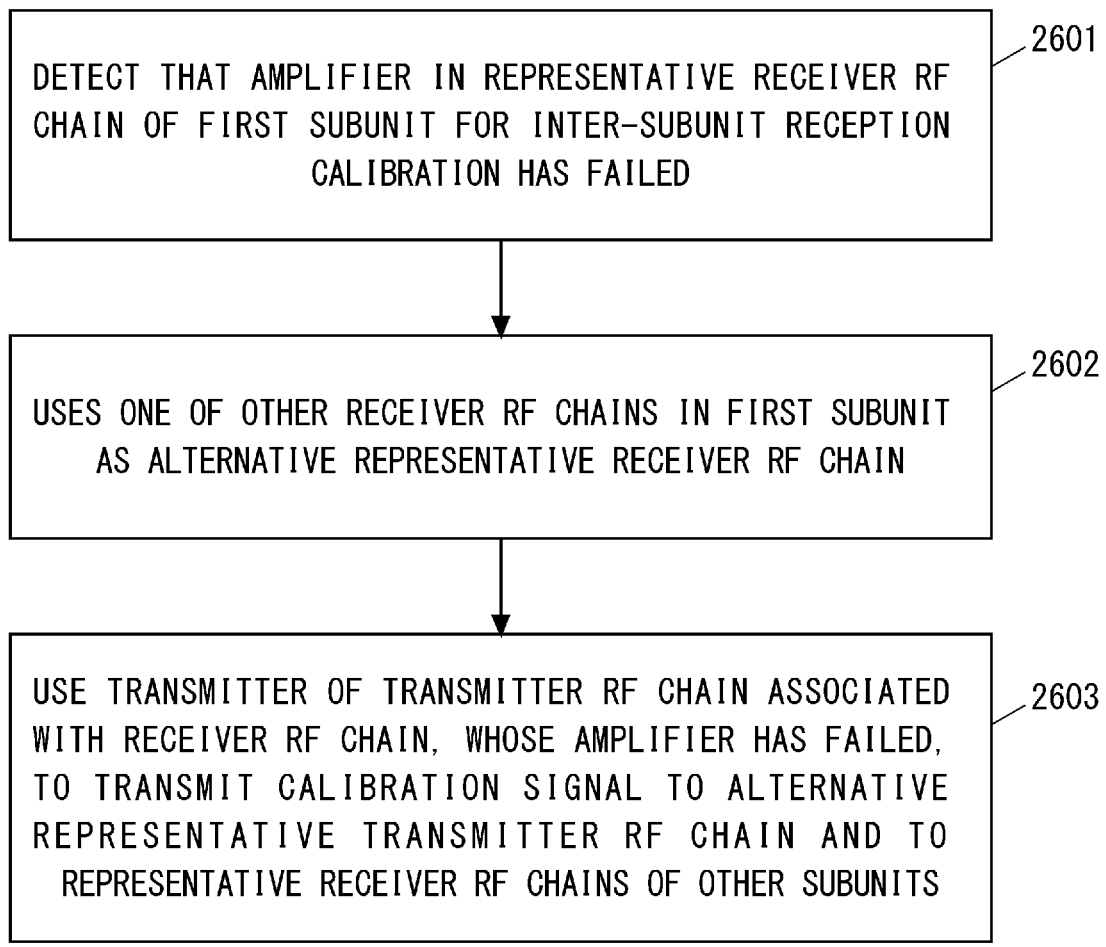
FIG. 26 is a flowchart showing an example of an inter-subunit reception calibration procedure for an active antenna system according to an example embodiment.

FIG. 26 shows adjustments made by the controller 150 in the event of a failure of an amplifier in the representative receiver RF chain 16 of inter-subunit reception calibration. In step 2601, the controller 150 detects that an amplifier in the representative receiver RF chain 16 of the first subunit 110 for inter-subunit reception calibration has failed. In step 2602, the controller 150 uses one of the other receiver RF chains 26 in that subunit 110 as an alternative representative receiver RF chain. In step 2603, the controller 150 uses the transmitter of the transmitter RF chain 15 associated with the receiver RF chain 16, whose amplifier has failed, to transmit a calibration signal to the alternative representative transmitter RF chain and to the representative receiver RF chains of the other subunits.

Figure 27:
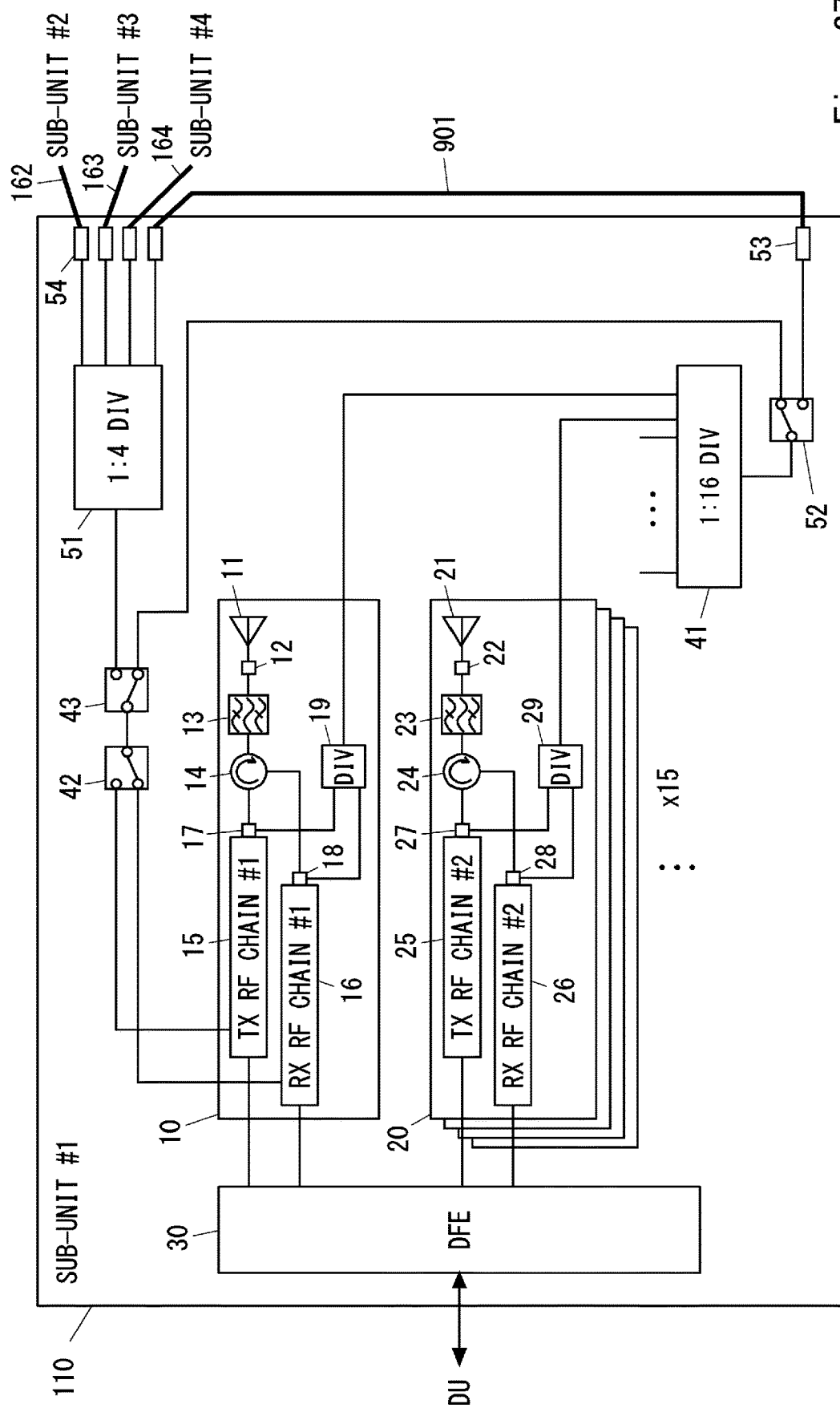
FIG. 27 shows a configuration example of a subunit in an active antenna system according to an example embodiment.
Figure 28:
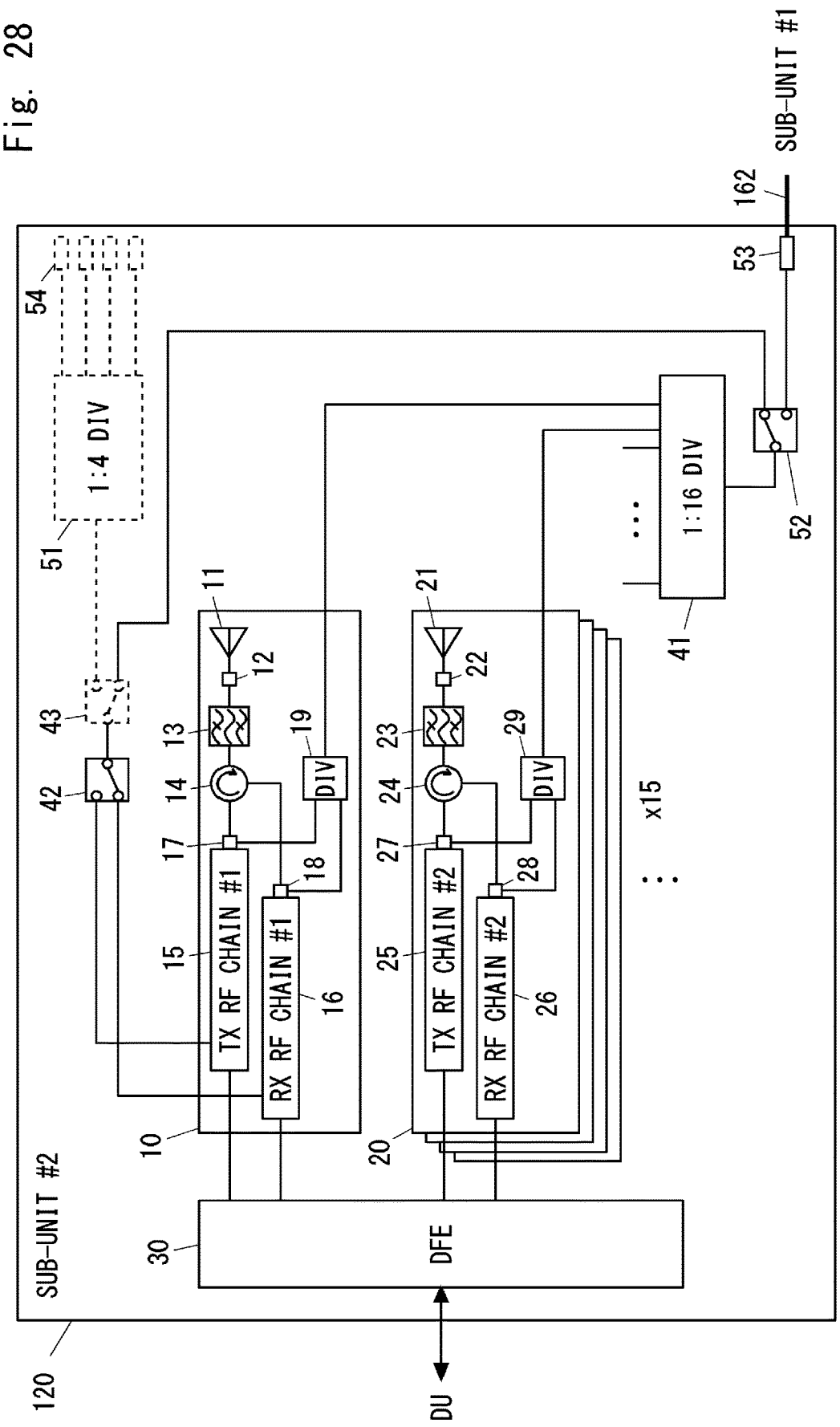
FIG. 28 shows a configuration example of a subunit in an active antenna system according to an example embodiment.

The following paragraphs describe improvements to the subunit configuration to allow for the fallback operations in the event of amplifier failures described with reference to FIGS. 23 to 26. FIG. 27 shows an example configuration of the first subunit 110 and FIG. 28 shows an example configuration of the second subunit 120. If the AAS 100 has three or more subunits, the configuration of the third and subsequent subunits (e.g., subunits 130 and 140) may be identical to that of the second subunit 120. As shown in FIGS. 27 and 28, all subunits may have the same configuration, except for the connection relationship between the subunits and the RF lines 162-164.

Comparing FIG. 27 with FIG. 12, FIG. 27 differs from FIG. 12 in that the placement of the switch 52 has been moved from one of the 16 output ports of the 16-way divider network 41 to the input port of the network 41. This allows the output of any of the 16 transmitter RF chains to be used for inter-subunit transmission calibration. In addition, any of the 16 receiver RF chains can be provided with a calibration signal for inter-subunit reception calibration.

Similarly, according to the arrangement of the switch 52 shown in FIG. 28, the output of any of the 16 transmitter RF chains can be transmitted to the first subunit 110 for inter-subunit transmission calibration. In addition, any of the 16 receiver RF chains can be supplied with a calibration signal from the first subunit 110 for inter-subunit reception calibration.

Note that, FIGS. 27 and 28 show a variation of the subunit configuration example (FIG. 12) described in the third example embodiment. Likewise, in the subunit configuration example of the second example embodiment (FIG. 3 and FIG. 4), the placement of the switch 52 may be moved from one of the 16 output ports of the 16-way divider network 41 to the input port of the network 41.

Figure 29:
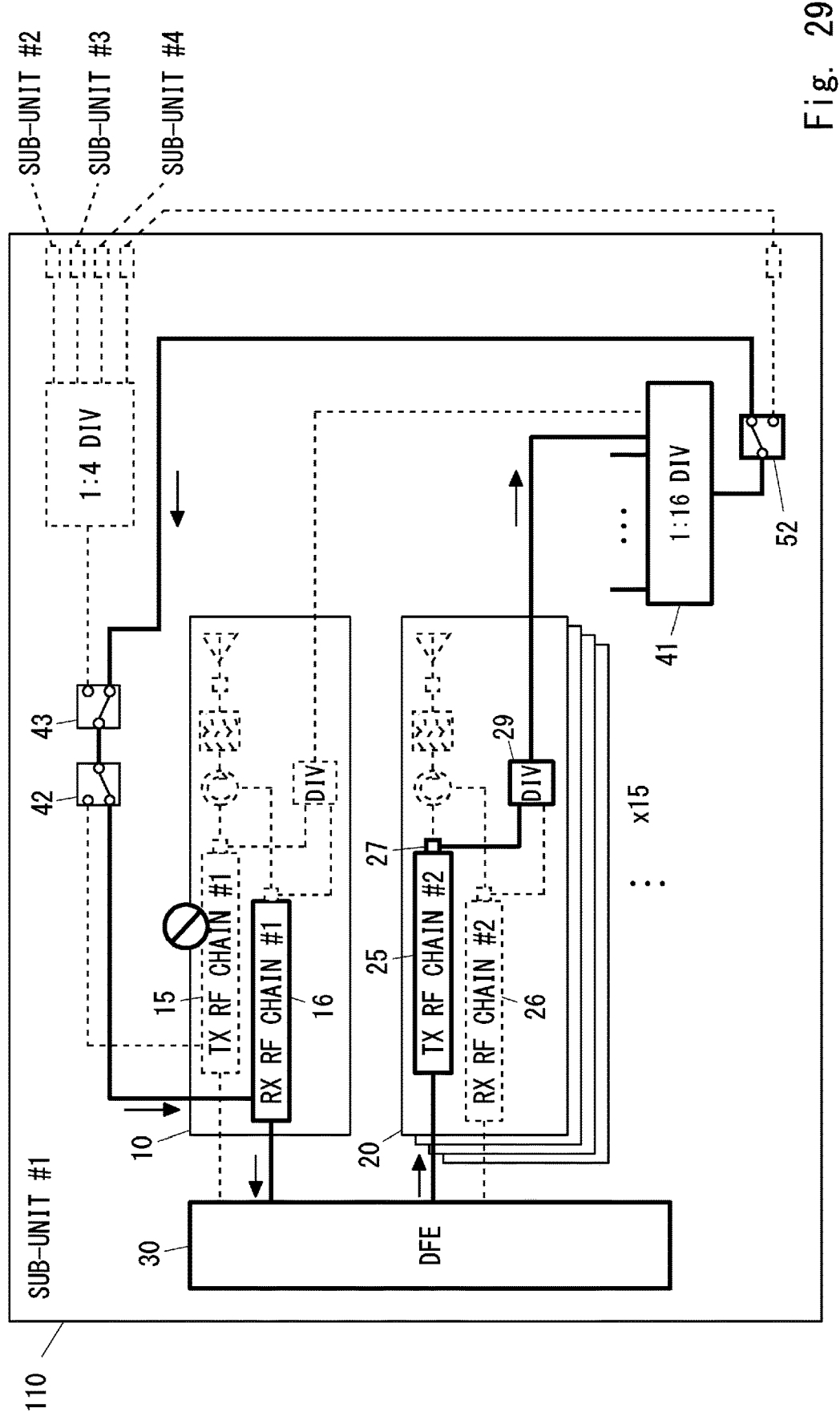
FIG. 29 shows an example of a signal path in an intra-subunit transmission calibration of an active antenna system according to an example embodiment.

The path shown in FIG. 29 with bold lines indicates the signal path used during intra-subunit transmission calibration of the first subunit 110. If an amplifier in the reference transmitter RF chain 15 has failed, then one of the other transmitter RF chains 25 is chosen as the alternative reference transmitter RF chain. The reception calibration signals transmitted from the alternative reference transmitter RF chain 25 and the other 14 transmitter RF chains are received by the receiver in the receiver RF chain 16 via the 16-way divider network 41.

Figure 30:
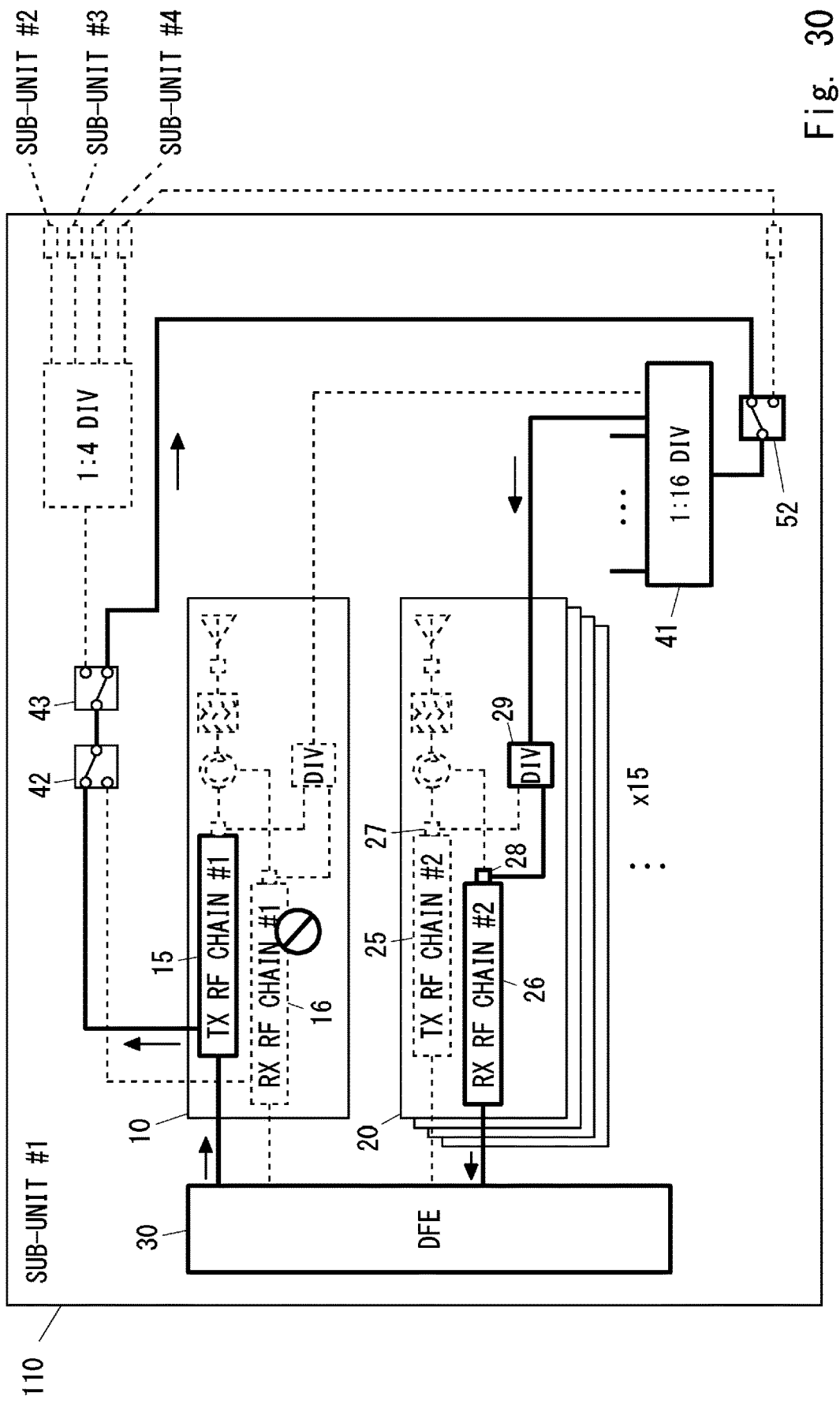
FIG. 30 shows an example of a signal path in an intra-subunit transmission calibration of an active antenna system according to an example embodiment.

The path shown in FIG. 30 with bold lines indicates the signal path used during intra-subunit reception calibration of the first subunit 110. If an amplifier in the reference receiver RF chain 16 has failed, one of the other receiver RF chains 26 is chosen as an alternative reference receiver RF chain. The calibration signal transmitted from the transmitter RF chain 15 is received by the alternative reference receiver RF chain 26 and the other 14 receiver RF chains via the 16-way divider network 41.

Figure 31:
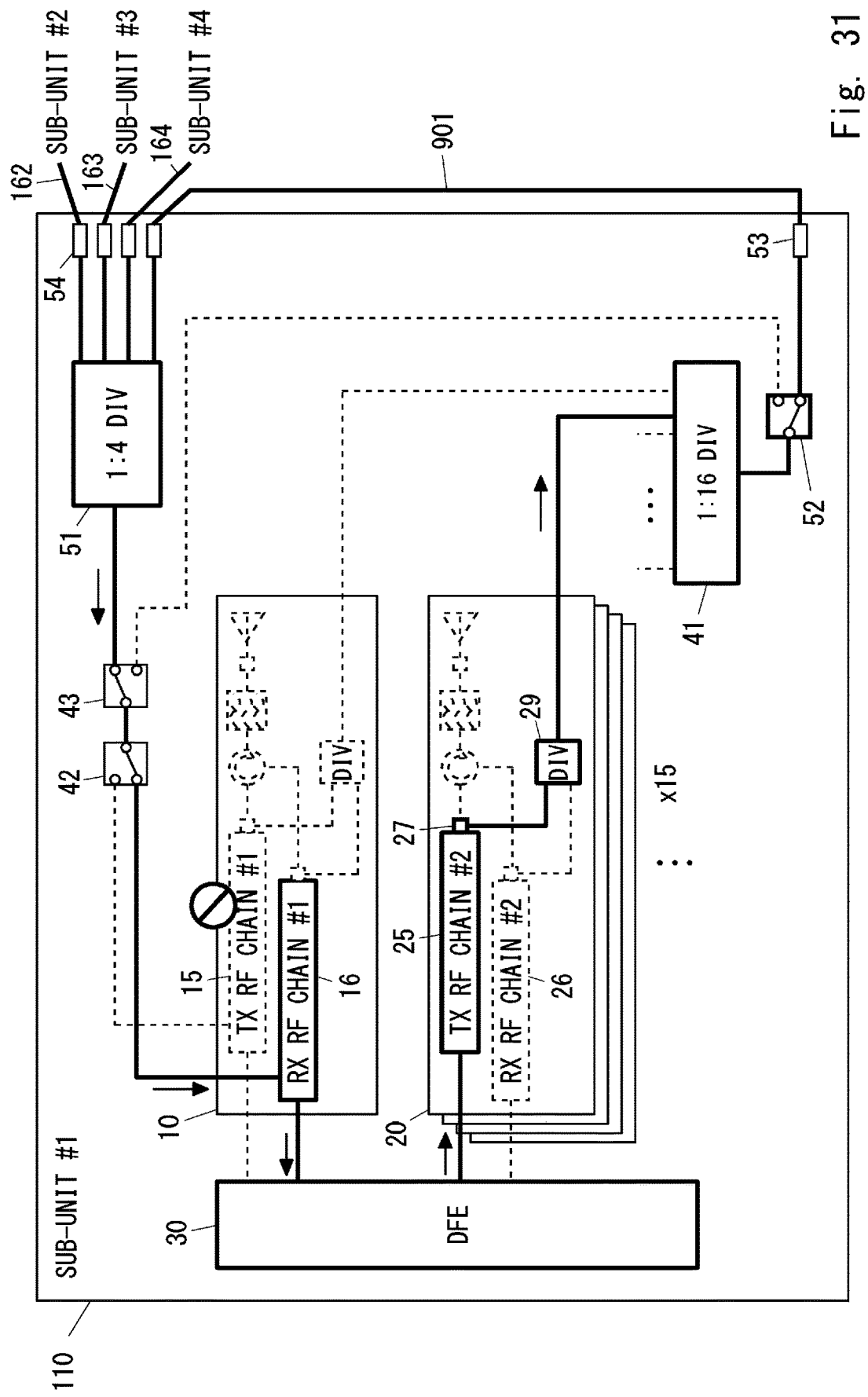
FIG. 31 shows an example of a signal path in an inter-subunit transmission calibration of an active antenna system according to an example embodiment.

The path shown in FIG. 31 with bold lines represents the signal path of the first 110 subunit used during inter-subunit transmission calibration. If an amplifier in the representative transmitter RF chain 15 has failed, then one of the other transmitter RF chains 25 is chosen as an alternative representative transmitter RF chain. The calibration signal transmitted from the alternative representative transmitter RF chain 25 is fed through the 4-way divider network 51 to the receiver in the receiver RF chain 16. Similarly, the calibration signals from the representative transmitter RF chains of the second through fourth subunits 120, 130, and 140 are also fed into the receiver of the receiver RF chain 16 via the 4-way divider network 51.

Figure 32:
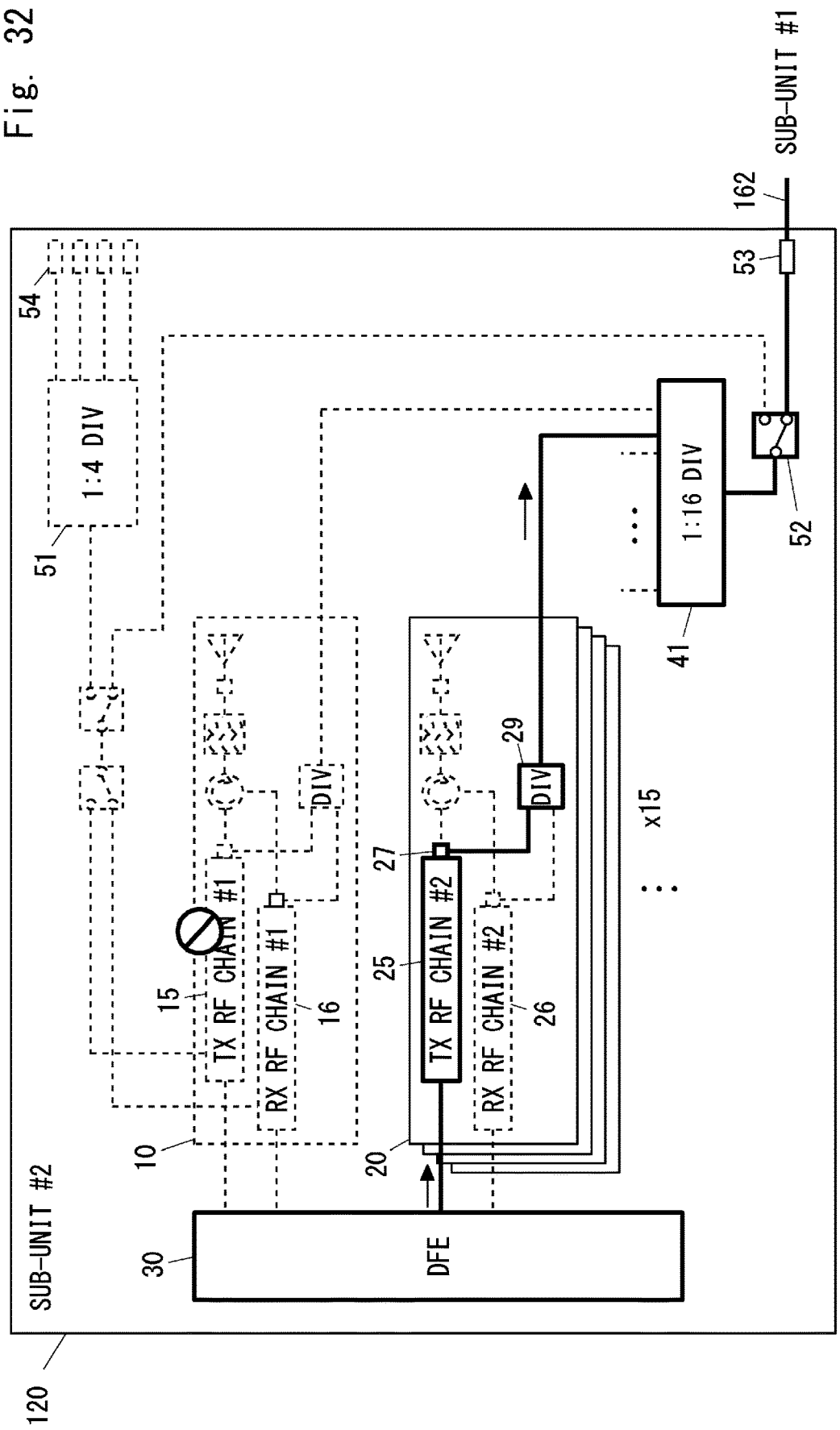
FIG. 32 shows an example of a signal path in an inter-subunit transmission calibration of an active antenna system according to an example embodiment.

The path shown in FIG. 32 with bold lines represents the signal path of the second subunit 120 used during inter-subunit transmission calibration. If an amplifier in the representative transmitter RF chain 15 of the second subunit 120 has failed, one of the other transmitter RF chains 25 is chosen as an alternative representative transmitter RF chain. The calibration signal transmitted from the alternative representative transmitter RF chain 25 is sent to the first subunit 110.

Figure 33:
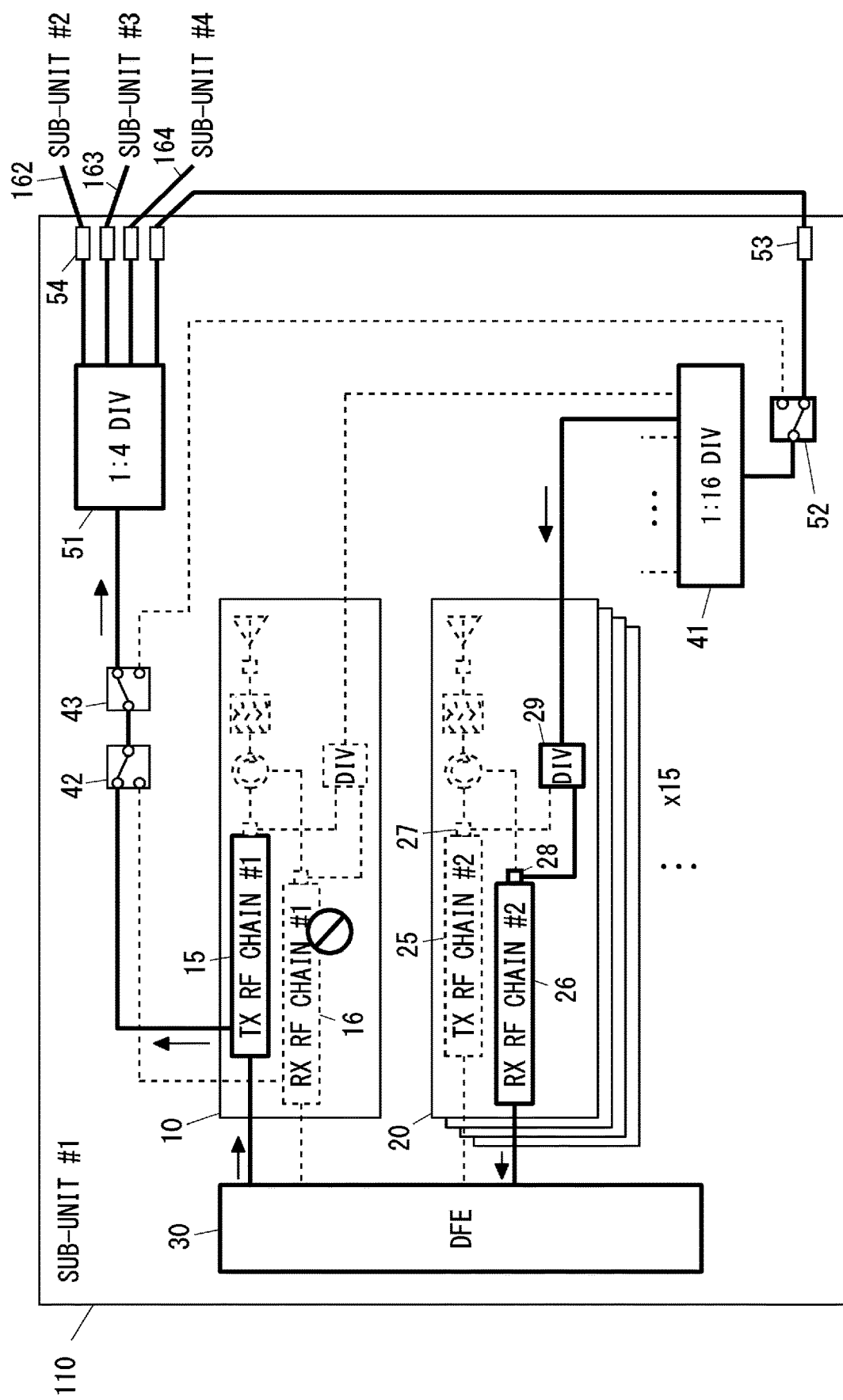
FIG. 33 shows an example of a signal path in an inter-subunit reception calibration of an active antenna system according to an example embodiment.

The path shown in FIG. 33 with bold lines represents the signal path of the first subunit 110 used during inter-subunit reception calibration. If an amplifier in the representative receiver RF chain 16 of the first subunit 110 has failed, one of the other receiver RF chains 26 is chosen as an alternative representative receiver RF chain. The alternative representative receiver RF chain 26 receives the calibration signal transmitted from the transmitter in the transmitter RF chain 15.

Figure 34:
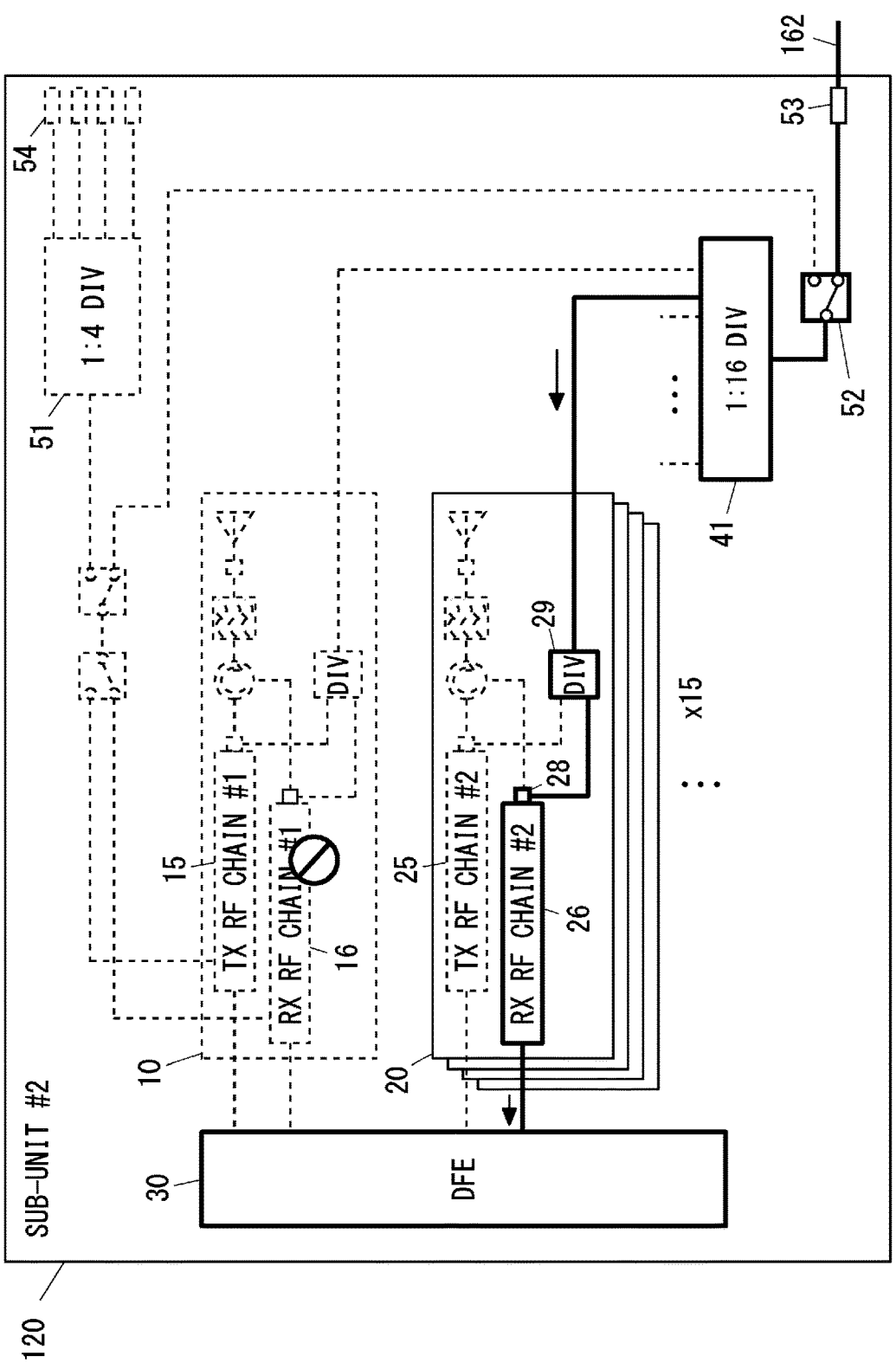
FIG. 34 shows an example of a signal path in an inter-subunit reception calibration of an active antenna system according to an example embodiment.

The path shown in FIG. 34 with bold lines represents the signal path of the second subunit 120 used during inter-subunit reception calibration. If an amplifier in the representative receiver RF chain 16 of the second subunit 120 has failed, one of the other receiver RF chains 26 is chosen as an alternative representative receiver RF chain. The alternative representative receiver RF chain 26 receives the calibration signal transmitted from the transmitter of the transmitter RF chain 15 of the first subunit 110.

Figure 35:
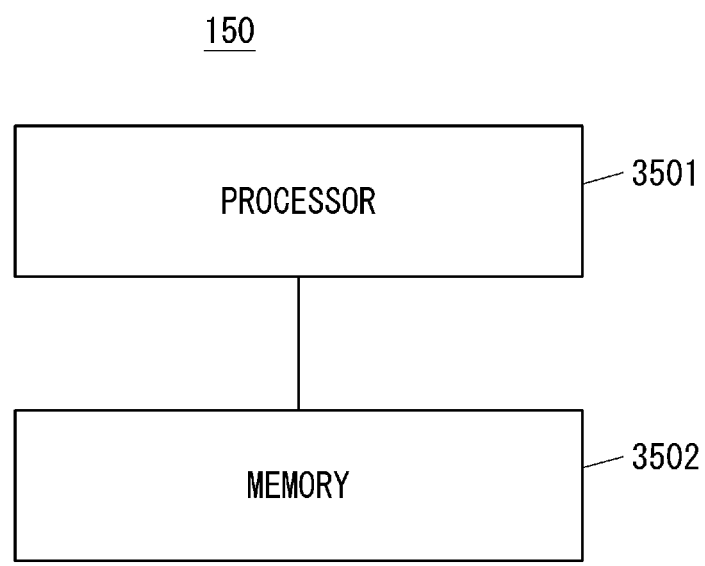
FIG. 35 shows a configuration example of a controller according to an example embodiment.

FIG. 35 shows an example configuration of the controller 150 of the example embodiments described above. The controller 150 includes a processor 3501 and a memory 3502. The processor 3501 may include a plurality of processors. The memory 3502 may store one or more software modules (or computer programs) containing a set of instructions and data for processing by the controller 150 described in the above example embodiments. In some implementations, the processor 3501 may be configured to load the software modules from the memory 3502 and execute them, thereby performing the processing of the controller 150 described with reference to the drawings in the example embodiments described above.

As explained with FIG. 35, the processor contained in the controller 150 according to the example embodiments described above can execute one or more programs containing a set of instructions to cause a computer to perform the algorithm described with reference to the drawings. The program(s) contains a set of instructions (or software codes) that, when loaded into a computer, causes the computer to perform one or more of the functions described in the example embodiments. The program(s) may be stored in a non-transitory computer readable medium or a tangible storage medium. By way of example, and not limitation, non-transitory computer readable media or tangible storage media can include a random-access memory (RAM), a read-only memory (ROM), a flash memory, a solid-state drive (SSD) or other memory technologies, CD-ROM, digital versatile disk (DVD), Blu-ray (registered mark) disc or other optical disk storage, magnetic cassettes, magnetic tape, magnetic disk storage or other magnetic storage devices. The program(s) may be transmitted on a transitory computer readable medium or a communication medium. By way of example, and not limitation, transitory computer readable media or communication media can include electrical, optical, acoustical, or other form of propagated signals.

An example advantage according to the above-described example embodiments is to provide an apparatus, method, and program to enable calibration suitable for a product architecture in which subunits, each having multiple antenna elements and multiple RF chains, are manufactured and combined to form a single AAS.

The above-described example embodiment is merely examples of the application of the technical ideas obtained by the inventors. These technical ideas are not limited to the above-described example embodiment and various modifications can be made thereto.

The whole or part of the example embodiments disclosed above can be described as, but not limited to, the following supplementary notes.

(Supplementary Note 1)

An active antenna system comprising
first and second subunits; and
a controller, wherein
the first subunit comprises:
  a first set of antenna elements;
  a first set of transmitter Radio Frequency (RF) chains coupled to the first set of antenna elements;
  a first set of receiver RF chains coupled to the first set of antenna elements; and
  a first digital front end coupled to the first set of transmitter RF chains and the first set of receiver RF chains,
the second subunit comprises:
  a second set of antenna elements;
  a second set of transmitter RF chains coupled to the second set of antenna elements;
  a second set of receiver RF chains coupled to the second set of antenna elements; and
  a second digital front end coupled to the second set of transmitter RF chains and the second set of receiver RF chains, and
the controller is configured to perform:
  a first transmission calibration to compensate for relative differences in amplitude and phase among transmitter RF chains in the first set of transmitter RF chains;
  a second transmission calibration to compensate for relative differences in amplitude and phase among transmitter RF chains in the second set of transmitter RF chains; and
  a third transmission calibration to compensate for relative differences in amplitude and phase between a first representative transmitter RF chain in the first set of transmitter RF chains and a second representative transmitter RF chain in the second set of transmitter RF chains.

(Supplementary Note 2)

The active antenna system according to Supplementary Note 1, wherein the controller is configured to perform:
  a first reception calibration to compensate for relative differences in amplitude and phase among receiver RF chains in the first set of receiver RF chains;
  a second reception calibration to compensate for relative differences in amplitude and phase among receiver RF chains in the second set of receiver RF chains; and
  a third reception calibration to compensate for relative differences in amplitude and phase between a first representative receiver RF chain in the first set of receiver RF chains and a second representative receiver RF chain in the second set of receiver RF chains.

(Supplementary Note 3)

The active antenna system according to Supplementary Note 1 or 2, wherein the controller is configured to:
  in the first transmission calibration, use a first receiver included in one of the first sets of receiver RF chains to receive calibration signals from the first set of transmitter RF chains;
  in the second transmission calibration, use a second receiver included in one of the second sets of receiver RF chains to receive calibration signals from the second set of transmitter RF chains; and
  in the third transmission calibration, use a third receiver included in one of the first set of receiver RF chains to receive calibration signals from the first representative transmitter RF chain and the second representative transmitter RF chain.

(Supplementary Note 4)

The active antenna system according to Supplementary Note 3, wherein
the third receiver is the same as the first receiver.

(Supplementary Note 5)

The active antenna system according to Supplementary Note 3, wherein
the third receiver is different from the first receiver.

(Supplementary Note 6)

The active antenna system according to Supplementary Note 3 or 4, wherein the first subunit is configured such that in the third transmission calibration, the calibration signal transmitted from the first representative transmitter RF chain is input to the third receiver in a circuit board of the first subunit without going through a line outside the circuit board.

(Supplementary Note 7)

The active antenna system according to Supplementary Note 3 or 5, wherein the first subunit is configured such that in the third transmission calibration, the calibration signal transmitted from the first representative transmitter RF chain is sent out on a line outside a circuit board of the first subunit and then folded back into the circuit board and input to the third receiver.

(Supplementary Note 8)

The active antenna system according to Supplementary Note 2, wherein the controller is configured to:
  in the first reception calibration, use a transmitter included in one of the first set of transmitter RF chains to transmit a calibration signal to the first set of receiver RF chains;
  in the second reception calibration, use a transmitter included in one of the second set of transmitter RF chains to transmit a calibration signal to the second set of receiver RF chains; and
  in the third reception calibration, using a transmitter included in one of the first set of transmitter RF chains to transmit a calibration signal to the first representative receiver RF chain and the second representative receiver RF chain.

(Supplementary Note 9)

The active antenna system according to Supplementary Note 8, wherein a transmitter RF chain used to transmit the calibration signal in the first reception calibration comprises a first transmitter, a first amplifier connected to the output of the first transmitter, and a first RF switch located at the output of the first amplifier,
  wherein the first RF switch is configured to switch between a signal line connected to one or more of the first set of antenna elements and a signal line for calibration.

(Supplementary Note 10)

The active antenna system according to Supplementary Note 8 or 9, wherein a transmitter RF chain used to transmit the calibration signal in the second reception calibration comprises a second transmitter, a second amplifier connected to the output of the second transmitter, and a second RF switch located at the output of the second amplifier, and the second RF switch is configured to switch between a signal line connected to one or more of the second set of antenna elements and a signal line for calibration.

(Supplementary Note 11)

The active antenna system according to any one of Supplementary Notes 1 to 10, wherein the first representative transmitter RF chain in the third transmission calibration is the same as a reference transmitter RF chain in the first transmission calibration, and the reference transmitter RF chain is used as a reference in determining a correction factor or offset for each transmitter RF chain other than the reference transmitter RF chain to compensate for the relative differences in amplitude and phase.

(Supplementary Note 12)

The active antenna system according to any one of Supplementary Notes 1 to 11, wherein the controller is configured to, if an amplifier in a reference transmitter RF chain for the first transmission calibration has failed, use another transmitter RF chain in the first set of transmitter RF chains as an alternative reference transmitter RF chain.

(Supplementary Note 13)

The active antenna system according to Supplementary Note 12, wherein the controller is configured to use a receiver in a receiver RF chain associated with the transmitter RF chain in which the amplifier thereof has failed, to receive calibration signals from other transmitter RF chains in the first set of transmitter RF chains in the first transmission calibration.

(Supplementary Note 14)

The active antenna system according to Supplementary Note 2, wherein the controller is configured to, if an amplifier in a reference receiver RF chain for the first reception calibration has failed, use another receiver RF chain in the first set of receiver RF chains as an alternative reference receiver RF chain.

(Supplementary Note 15)

The active antenna system according to Supplementary Note 14, wherein the controller is configured to use a transmitter in a transmitter RF chain associated with the receiver RF chain in which the amplifier thereof has failed, to transmit a calibration signal to other receiver RF chains in the first set of receiver RF chains in the first reception calibration.

(Supplementary Note 16)

The active antenna system according to any one of Supplementary Notes 1 to 15, wherein the controller is configured to, if an amplifier in the first representative transmitter RF chain for the third transmission calibration has failed, use another transmitter RF chain in the first set of transmitter RF chains as an alternative first representative transmitter RF chain.

(Supplementary Note 17)

The active antenna system according to Supplementary Note 16, wherein the controller is configured to use a receiver in a receiver RF chain associated with the transmitter RF chain in which the amplifier thereof has failed, to receive calibration signals from the alternative first representative transmitter RF chain and the second representative transmitter RF chain in the third transmission calibration.

(Supplementary Note 18)

The active antenna system according to any one of Supplementary Notes 1 to 17, wherein the controller is configured to, if an amplifier in the second representative transmitter RF chain for the third transmission calibration has failed, use another transmitter RF chain in the second set of transmitter RF chains as an alternative second representative transmitter RF chain.

(Supplementary Note 19)

The active antenna system according to Supplementary Note 2, wherein the controller is configured to, if an amplifier in the first representative receiver RF chain for the third reception calibration has failed, use another receiver RF chain in the first set of receiver RF chains as an alternative first representative receiver RF chain.

(Supplementary Note 20)

The active antenna system according to Supplementary Note 19, wherein the controller is configured to use a transmitter in a transmitter RF chain associated with the receiver RF chain in which the amplifier thereof has failed, to transmit a calibration signal to the alternative first representative receiver RF chain and the second representative receiver RF chain in the third reception calibration.

(Supplementary Note 21)

The active antenna system according to any one of Supplementary Notes 2, 19, and 20, wherein the controller is configured to, if an amplifier in the second representative receiver RF chain for the third reception calibration has failed, use another receiver RF chain in the second set of receiver RF chains as an alternative second representative receiver RF chain.

(Supplementary Note 22)

The active antenna system according to any one of Supplementary Notes 1 to 21, wherein the first and second subunits are implemented on respective circuit boards.

(Supplementary Note 23)

The active antenna system according to any one of Supplementary Notes 1 to 22, further comprising a single enclosure housing the first and second subunits and the controller.

(Supplementary Note 24)

The active antenna system according to Supplementary Note 23, further comprising an RF line connecting the first subunit and the second subunit within the enclosure.

(Supplementary Note 25)

A method performed by a controller of an active antenna system, the method comprising:

performing a first transmission calibration to compensate for relative differences in amplitude and phase among a plurality of transmitter radio frequency (RF) chains in a first subunit of the active antenna system;

performing a second transmission calibration to compensate for relative differences in amplitude and phase among a plurality of transmitter RF chains in a second subunit of the active antenna system; and performing a third transmission calibration to compensate for relative differences in amplitude and phase between a first representative transmitter RF chain in the plurality of transmitter RF chains of the first subunit and a second representative transmitter RF chain in the plurality of transmitter RF chains of the second subunit.

(Supplementary Note 26)

A computer program for causing a controller of an active antenna system to perform a method, wherein the method comprises:

performing a first transmission calibration to compensate for relative differences in amplitude and phase among a plurality of transmitter radio frequency (RF) chains in a first subunit of the active antenna system;
performing a second transmission calibration to compensate for relative differences in amplitude and phase among a plurality of transmitter RF chains in a second subunit of the active antenna system; and
performing a third transmission calibration to compensate for relative differences in amplitude and phase between a first representative transmitter RF chain in the plurality of transmitter RF chains of the first subunit and a second representative transmitter RF chain in the plurality of transmitter RF chains of the second subunit.

The invention claimed is:
1. An active antenna system comprising
first and second subunits; and
a controller, wherein
the first subunit comprises:
 a first set of antenna elements;
 a first set of transmitter Radio Frequency (RF) chains coupled to the first set of antenna elements;
 a first set of receiver RF chains coupled to the first set of antenna elements; and
 a first digital front end coupled to the first set of transmitter RF chains and the first set of receiver RF chains,
the second subunit comprises:
 a second set of antenna elements;
 a second set of transmitter RF chains coupled to the second set of antenna elements;
 a second set of receiver RF chains coupled to the second set of antenna elements; and
 a second digital front end coupled to the second set of transmitter RF chains and the second set of receiver RF chains, and
the controller is configured to perform:
 a first transmission calibration to compensate for relative differences in amplitude and phase among transmitter RF chains in the first set of transmitter RF chains;
 a second transmission calibration to compensate for relative differences in amplitude and phase among transmitter RF chains in the second set of transmitter RF chains; and
 a third transmission calibration to compensate for relative differences in amplitude and phase between a first representative transmitter RF chain in the first set of transmitter RF chains and a second representative transmitter RF chain in the second set of transmitter RF chains.

2. The active antenna system according to claim 1, wherein the controller is configured to perform:
 a first reception calibration to compensate for relative differences in amplitude and phase among receiver RF chains in the first set of receiver RF chains;
 a second reception calibration to compensate for relative differences in amplitude and phase among receiver RF chains in the second set of receiver RF chains; and
 a third reception calibration to compensate for relative differences in amplitude and phase between a first representative receiver RF chain in the first set of receiver RF chains and a second representative receiver RF chain in the second set of receiver RF chains.

3. The active antenna system according to claim 2, wherein the controller is configured to:

in the first reception calibration, use a transmitter included in one of the first set of transmitter RF chains to transmit a calibration signal to the first set of receiver RF chains;
 in the second reception calibration, use a transmitter included in one of the second set of transmitter RF chains to transmit a calibration signal to the second set of receiver RF chains; and
 in the third reception calibration, using a transmitter included in one of the first set of transmitter RF chains to transmit a calibration signal to the first representative receiver RF chain and the second representative receiver RF chain.

4. The active antenna system according to claim 3, wherein a transmitter RF chain used to transmit the calibration signal in the first reception calibration comprises a first transmitter, a first amplifier connected to the output of the first transmitter, and a first RF switch located at the output of the first amplifier, and
 the first RF switch is configured to switch between a signal line connected to one or more of the first set of antenna elements and a signal line for calibration.

5. The active antenna system according to claim 2, wherein the controller is configured to, if an amplifier in a reference receiver RF chain for the first reception calibration has failed, use another receiver RF chain in the first set of receiver RF chains as an alternative reference receiver RF chain.

6. The active antenna system according to claim 5, wherein the controller is configured to use a transmitter in a transmitter RF chain associated with the receiver RF chain in which the amplifier thereof has failed, to transmit a calibration signal to other receiver RF chains in the first set of receiver RF chains in the first reception calibration.

7. The active antenna system according to claim 2, wherein the controller is configured to, if an amplifier in the first representative receiver RF chain for the third reception calibration has failed, use another receiver RF chain in the first set of receiver RF chains as an alternative first representative receiver RF chain.

8. The active antenna system according to claim 7, wherein the controller is configured to use a transmitter in a transmitter RF chain associated with the receiver RF chain in which the amplifier thereof has failed, to transmit a calibration signal to the alternative first representative receiver RF chain and the second representative receiver RF chain in the third reception calibration.

9. The active antenna system according to claim 1, wherein the controller is configured to:
 in the first transmission calibration, use a first receiver included in one of the first sets of receiver RF chains to receive calibration signals from the first set of transmitter RF chains;
 in the second transmission calibration, use a second receiver included in one of the second sets of receiver RF chains to receive calibration signals from the second set of transmitter RF chains; and
 in the third transmission calibration, use a third receiver included in one of the first set of receiver RF chains to receive calibration signals from the first representative transmitter RF chain and the second representative transmitter RF chain.

10. The active antenna system according to claim 9, wherein the third receiver is the same as the first receiver.
11. The active antenna system according to claim 9, wherein the third receiver is different from the first receiver.

12. The active antenna system according to claim 9, wherein the first subunit is configured such that in the third transmission calibration, the calibration signal transmitted from the first representative transmitter RF chain is input to the third receiver in a circuit board of the first subunit without going through a line outside the circuit board.

13. The active antenna system according to claim 9, wherein the first subunit is configured such that in the third transmission calibration, the calibration signal transmitted from the first representative transmitter RF chain is sent out on a line outside a circuit board of the first subunit and then folded back into the circuit board and input to the third receiver.

14. The active antenna system according to claim 1, wherein the first representative transmitter RF chain in the third transmission calibration is the same as a reference transmitter RF chain in the first transmission calibration, and
the reference transmitter RF chain is used as a reference in determining a correction factor or offset for each transmitter RF chain other than the reference transmitter RF chain to compensate for the relative differences in amplitude and phase.

15. The active antenna system according to claim 1, wherein the controller is configured to, if an amplifier in a reference transmitter RF chain for the first transmission calibration has failed, use another transmitter RF chain in the first set of transmitter RF chains as an alternative reference transmitter RF chain.

16. The active antenna system according to claim 15, wherein the controller is configured to use a receiver in a receiver RF chain associated with the transmitter RF chain in which the amplifier thereof has failed, to receive calibration signals from other transmitter RF chains in the first set of transmitter RF chains in the first transmission calibration.

17. The active antenna system according to claim 1, wherein the controller is configured to, if an amplifier in the first representative transmitter RF chain for the third transmission calibration has failed, use another transmitter RF chain in the first set of transmitter RF chains as an alternative first representative transmitter RF chain.

18. The active antenna system according to claim 17, wherein the controller is configured to use a receiver in a receiver RF chain associated with the transmitter RF chain in which the amplifier thereof has failed, to receive calibration signals from the alternative first representative transmitter RF chain and the second representative transmitter RF chain in the third transmission calibration.

19. A method performed by a controller of an active antenna system, the method comprising:
    performing a first transmission calibration to compensate for relative differences in amplitude and phase among a plurality of transmitter radio frequency (RF) chains in a first subunit of the active antenna system;
    performing a second transmission calibration to compensate for relative differences in amplitude and phase among a plurality of transmitter RF chains in a second subunit of the active antenna system; and
    performing a third transmission calibration to compensate for relative differences in amplitude and phase between a first representative transmitter RF chain in the plurality of transmitter RF chains of the first subunit and a second representative transmitter RF chain in the plurality of transmitter RF chains of the second subunit.

20. A non-transitory computer readable medium storing a computer program for causing a controller of an active antenna system to perform a method, wherein the method comprises:
    performing a first transmission calibration to compensate for relative differences in amplitude and phase among a plurality of transmitter radio frequency (RF) chains in a first subunit of the active antenna system;
    performing a second transmission calibration to compensate for relative differences in amplitude and phase among a plurality of transmitter RF chains in a second subunit of the active antenna system; and
    performing a third transmission calibration to compensate for relative differences in amplitude and phase between a first representative transmitter RF chain in the plurality of transmitter RF chains of the first subunit and a second representative transmitter RF chain in the plurality of transmitter RF chains of the second subunit.

\* \* \* \* \*